(12) United States Patent  (10) Patent No.: US 9,007,020 B2
Prosser et al.  (45) Date of Patent: Apr. 14, 2015

(54) CHARGING SERVICE VEHICLES WITH BATTERY AND GENERATOR SOURCES

(75) Inventors: Ronald D. Prosser, Huntington Beach, CA (US); Stephen R. Taddeo, Long Beach, CA (US); Stephen P. Israel, Long Beach, CA (US); David L. Edgar, Los Alamitos, CA (US); Carl J. Allendorph, Pasadena, CA (US)

(73) Assignee: Green Charge Networks, Santa Clara, CA (US)

( * ) Notice: Subject to any disclaimer, the term of this patent is extended or adjusted under 35 U.S.C. 154(b) by 384 days.

(21) Appl. No.: 13/480,388

(22) Filed: May 24, 2012

(65) Prior Publication Data

US 2012/0299544 A1 Nov. 29, 2012

Related U.S. Application Data

(60) Provisional application No. 61/489,849, filed on May 25, 2011, provisional application No. 61/489,879, filed on May 25, 2011, provisional application No. 61/493,970, filed on Jun. 6, 2011, provisional application No. 61/494,878, filed on Jun. 8, 2011, provisional application No. 61/497,216, filed on Jun. 15, 2011.

(51) Int. Cl.
  *H02J 7/00* (2006.01)
  *B60L 11/18* (2006.01)
  *B60L 1/00* (2006.01)

(52) U.S. Cl.
  CPC .............. *H02J 7/0054* (2013.01); *Y02T 90/168* (2013.01); *Y04S 30/12* (2013.01); *H02J 7/0055* (2013.01);

(Continued)

(58) Field of Classification Search
  USPC .......................................... 320/104, 107, 109
  See application file for complete search history.

(56) References Cited

U.S. PATENT DOCUMENTS 5,283,513 A  2/1994 Fujita et al.
5,315,831 A  5/1994 Goode (Continued)

FOREIGN PATENT DOCUMENTS

GB  2460500 A  12/2009
JP  2000102102 A  4/2000

OTHER PUBLICATIONS

JPO machine translation of JP 2000-102102 (Original JP document published Apr. 7, 2000).

*Primary Examiner* — Sun Lin
(74) *Attorney, Agent, or Firm* — Richard C. Galati; Holland & Hart LLP

(57) ABSTRACT

Charging service vehicles with battery and generator sources are disclosed. The service vehicle is a vehicle having electric vehicle (EV) charging equipment, removably mounted battery module(s) or a battery module connection point, and an alternator or generator transported by the vehicle. The alternator or generator is configured to provide power to the battery module or to the charging equipment. Battery modules used may be quick-disconnecting or have their discharge monitored and controlled by an onboard controller device, and in some cases are automotive SLI batteries. Some embodiments have connection points that can be configured as charging points to recharge battery modules on the vehicle or as discharging points to provide power to the EV charging equipment. These features are beneficial to extend the utility of batteries in a service vehicle, provide additional power for EV charging, and to efficiently utilize vehicle electronics and generation capability.

20 Claims, 32 Drawing Sheets

(52) U.S. Cl.
CPC ......... *B60L 11/1809* (2013.01); *B60L 11/1822* (2013.01); *Y02T 10/7005* (2013.01); *Y02T 10/7072* (2013.01); *Y02T 10/7016* (2013.01); *Y02T 90/124* (2013.01); *Y02T 10/7011* (2013.01); *Y02T 90/14* (2013.01); *B60L 1/006* (2013.01); *B60L 11/1818* (2013.01); *B60L 11/1824* (2013.01); *B60L 11/1864* (2013.01); *B60L 11/1877* (2013.01); *B60L 2200/36* (2013.01); *B60L 2230/12* (2013.01); *B60L 2230/16* (2013.01); *B60L 2230/30* (2013.01); *B60L 2230/34* (2013.01)

(56) References Cited

U.S. PATENT DOCUMENTS

| | | | |
|---|---|---|---|
| 5,548,200 | A | 8/1996 | Nor et al. |
| 5,927,938 | A | 7/1999 | Hammerslag |
| 6,504,344 | B1 | 1/2003 | Adams |
| 7,178,565 | B2 | 2/2007 | Eichelberger |
| 7,256,516 | B2 | 8/2007 | Buchanan |
| 7,602,143 | B2 | 10/2009 | Capizzo |
| 8,022,666 | B2 | 9/2011 | Li |
| 8,279,041 | B2 | 10/2012 | Stocker et al. |
| 8,299,754 | B2 * | 10/2012 | Hayashigawa et al. ....... 320/109 |
| 8,538,694 | B2 | 9/2013 | Conway |
| 2008/0053716 | A1 | 3/2008 | Scheucher |
| 2008/0119965 | A1 | 5/2008 | McCrary |
| 2008/0245587 | A1 | 10/2008 | Sastry |
| 2009/0133733 | A1 | 5/2009 | Retti |
| 2009/0252994 | A1 | 10/2009 | Livingston |
| 2010/0071979 | A1 | 3/2010 | Heichal |
| 2010/0141206 | A1 | 6/2010 | Agassi |
| 2010/0181129 | A1 | 7/2010 | Hamidi |
| 2010/0185357 | A1 | 7/2010 | Mizumachi |
| 2010/0201482 | A1 | 8/2010 | Robertson |
| 2010/0230188 | A1 | 9/2010 | Nguyen |
| 2010/0250043 | A1 | 9/2010 | Scheucher |
| 2010/0291427 | A1 | 11/2010 | Zhou |
| 2011/0025267 | A1 | 2/2011 | Kamen et al. |
| 2011/0029157 | A1 | 2/2011 | Muzaffer |
| 2011/0055037 | A1 | 3/2011 | Hayashigawa |
| 2011/0115425 | A1 | 5/2011 | Olsson |
| 2011/0174875 | A1 | 7/2011 | Wurzer |
| 2012/0005031 | A1 | 1/2012 | Jammer |
| 2012/0005125 | A1 | 1/2012 | Jammer |
| 2012/0109409 | A1 | 5/2012 | Hara |
| 2012/0109519 | A1 | 5/2012 | Uyeki |
| 2012/0212174 | A1 | 8/2012 | Ishikawa et al. |
| 2012/0271758 | A1 | 10/2012 | Jammer |

\* cited by examiner

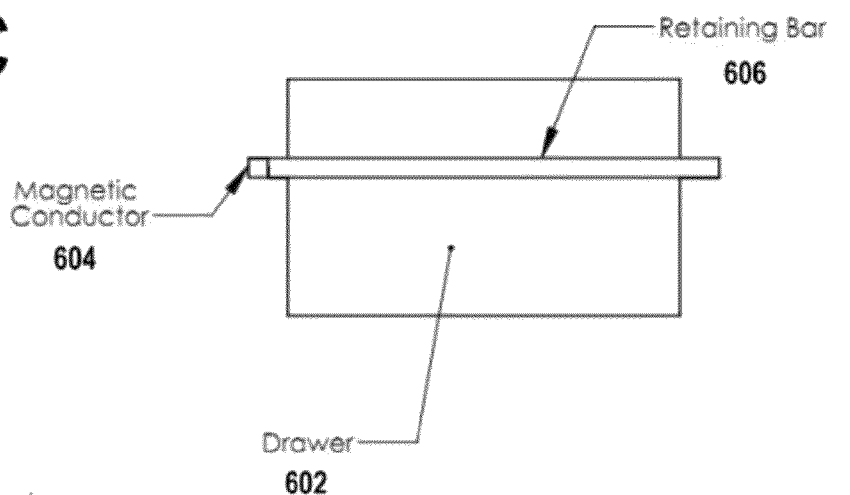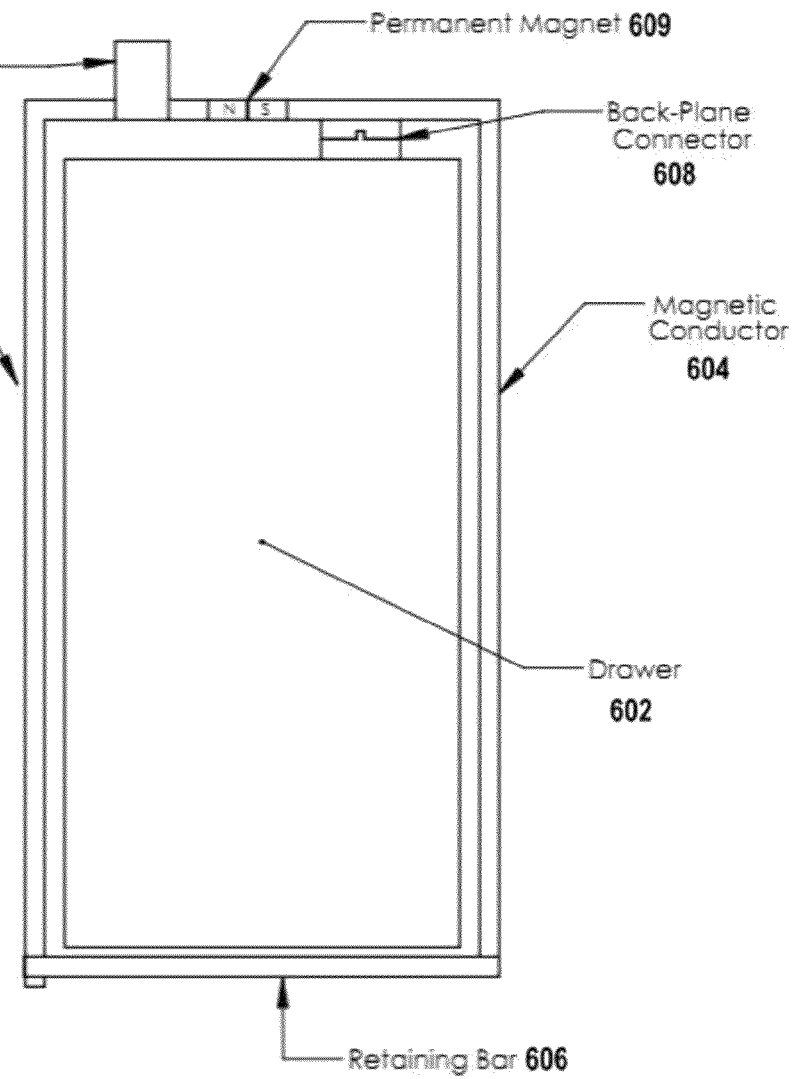

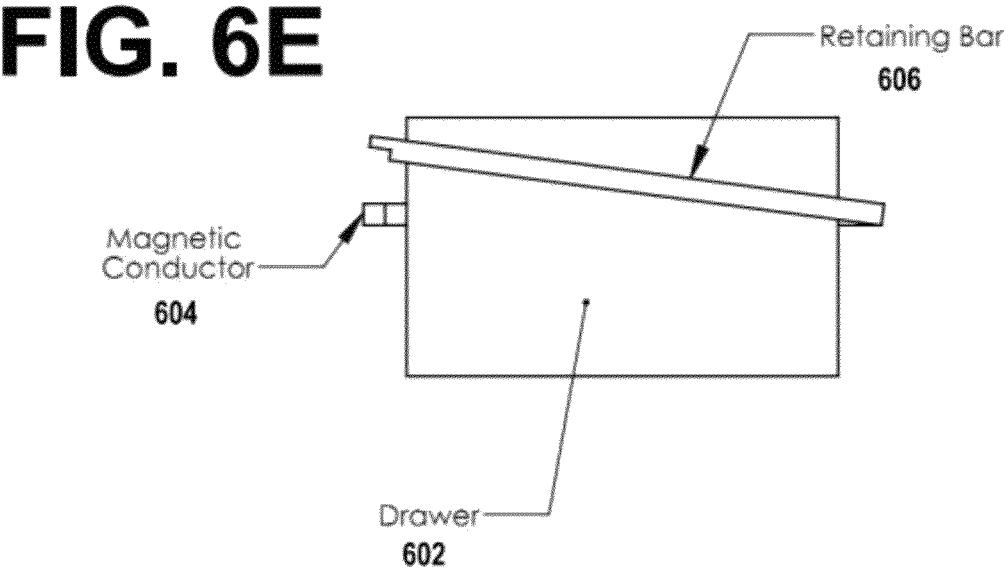
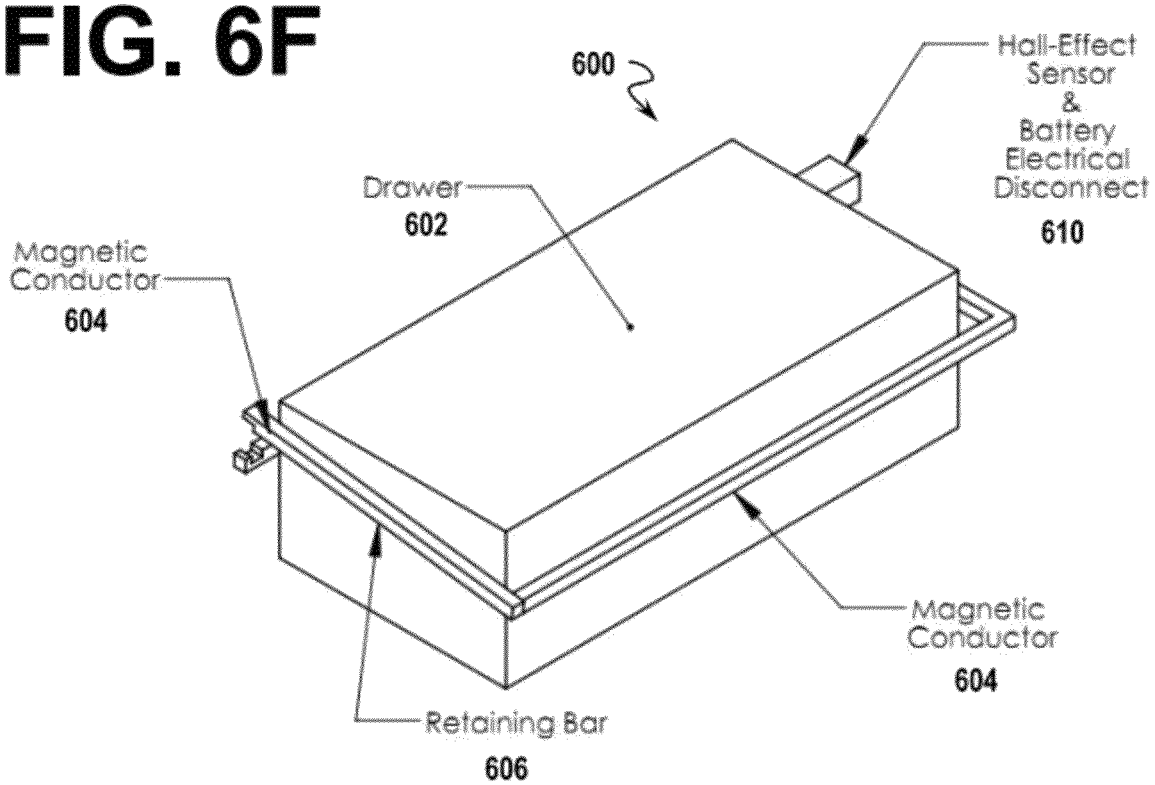

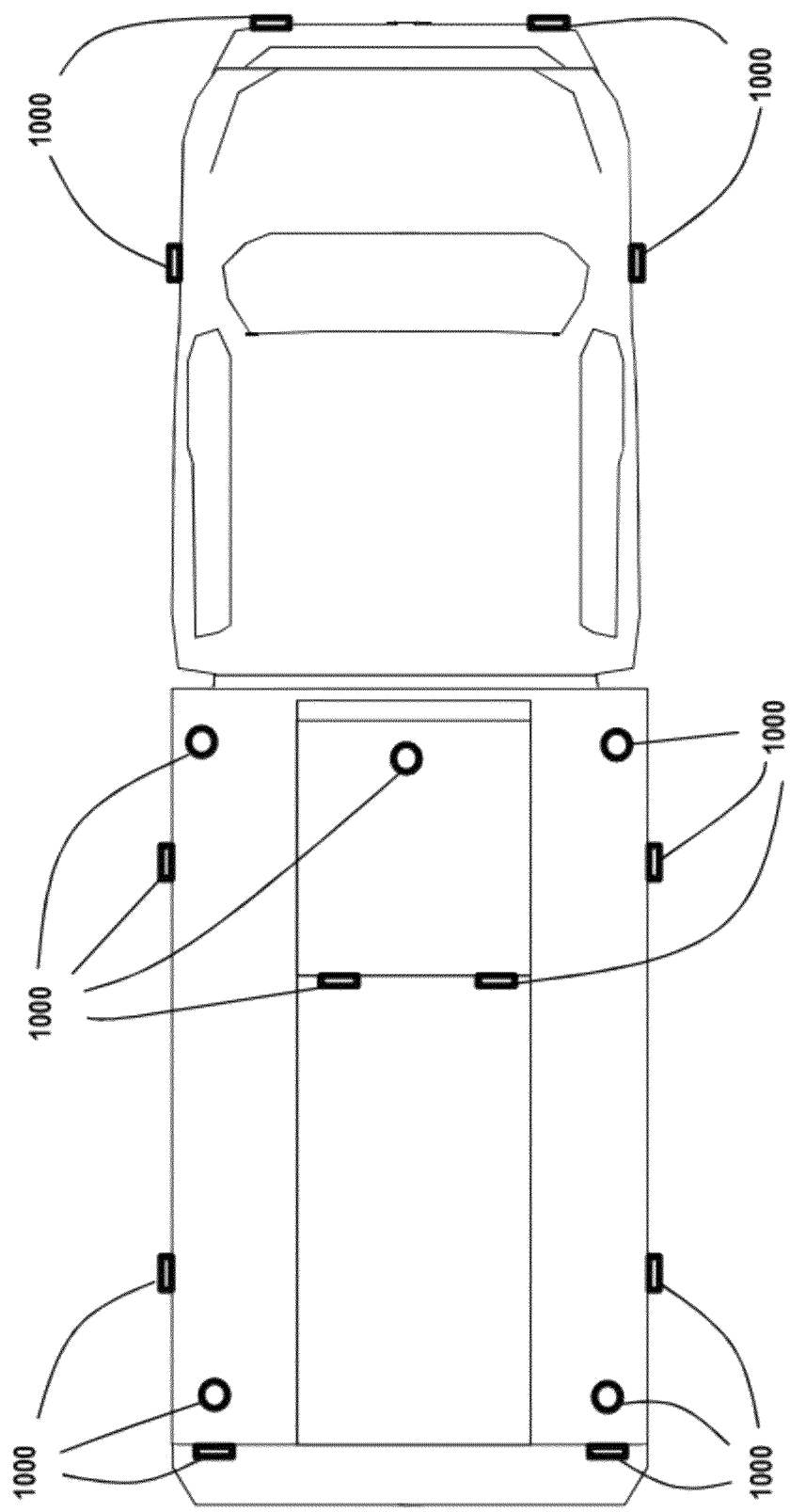

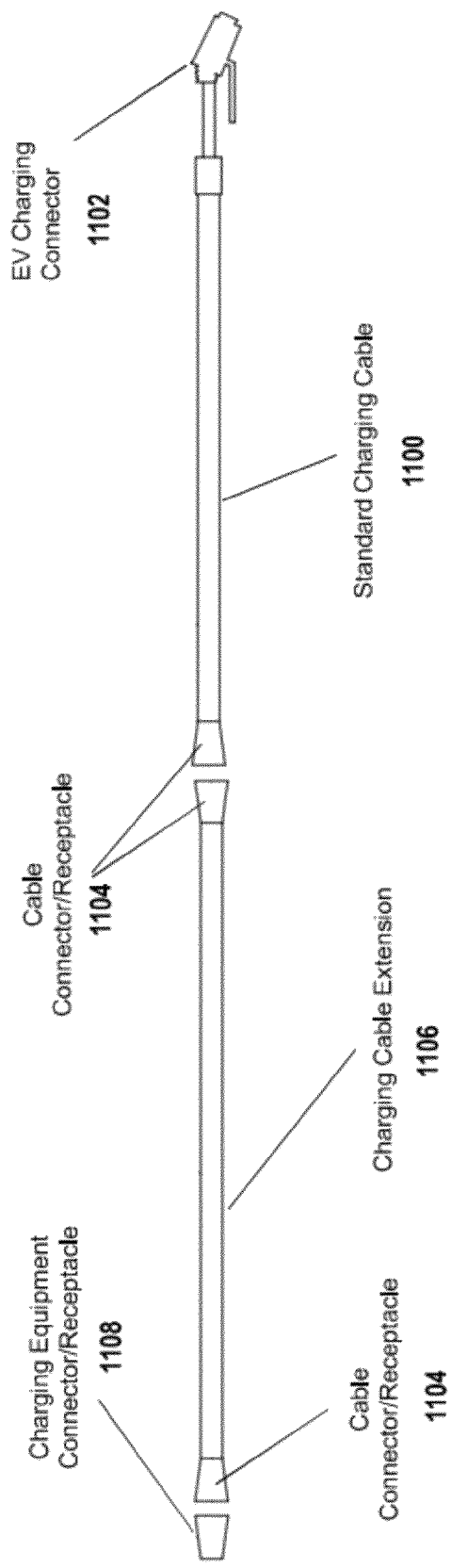
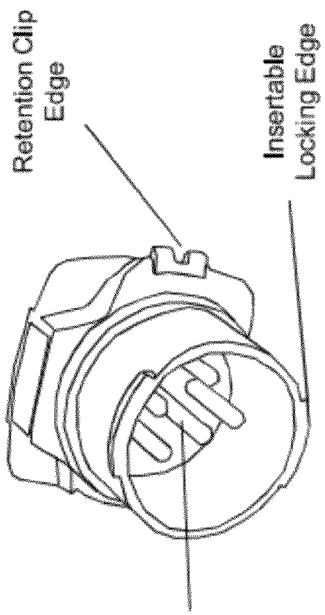
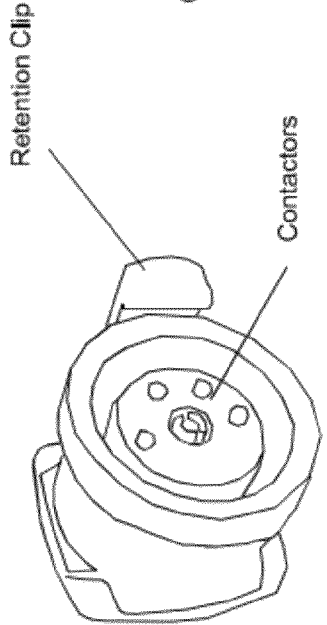

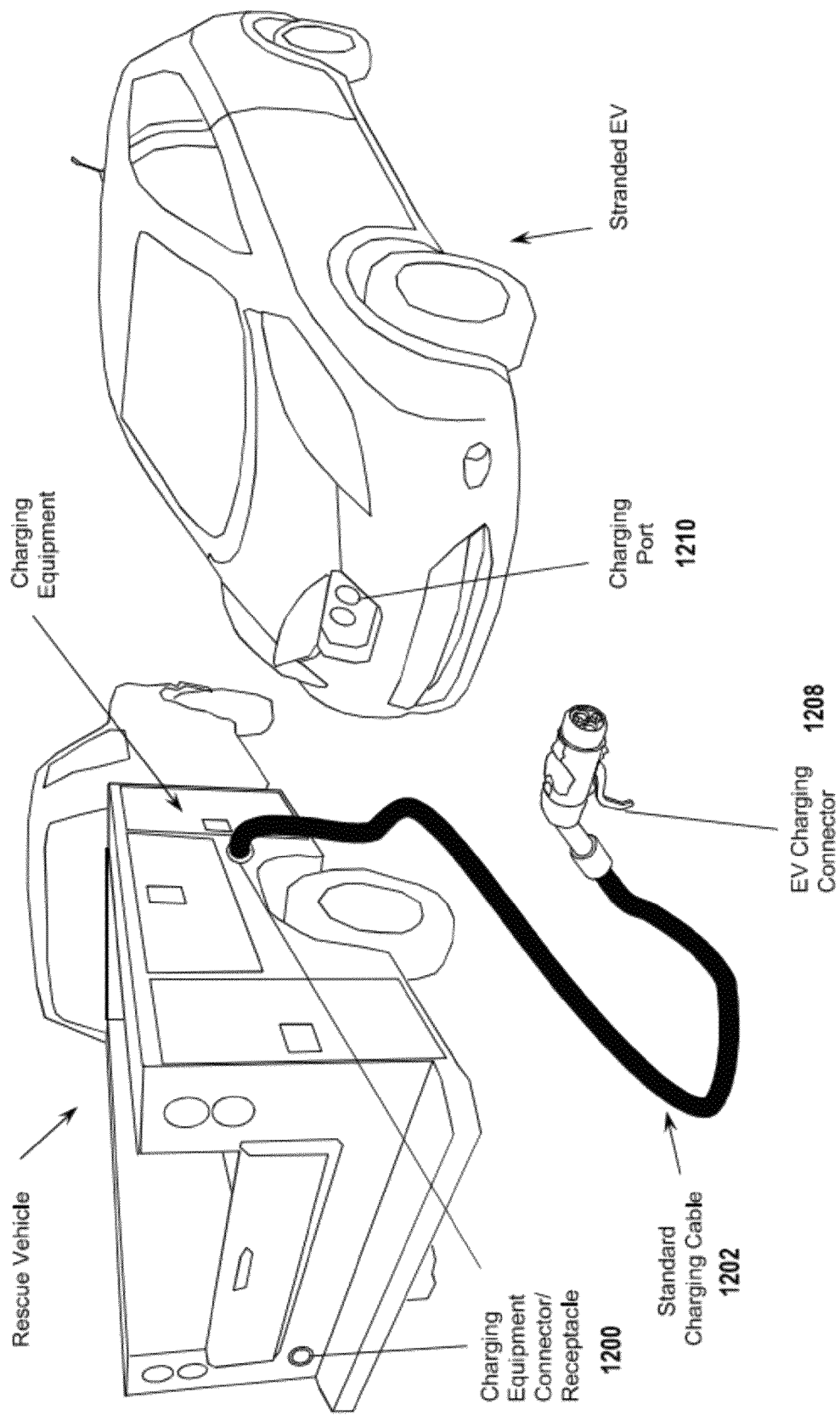

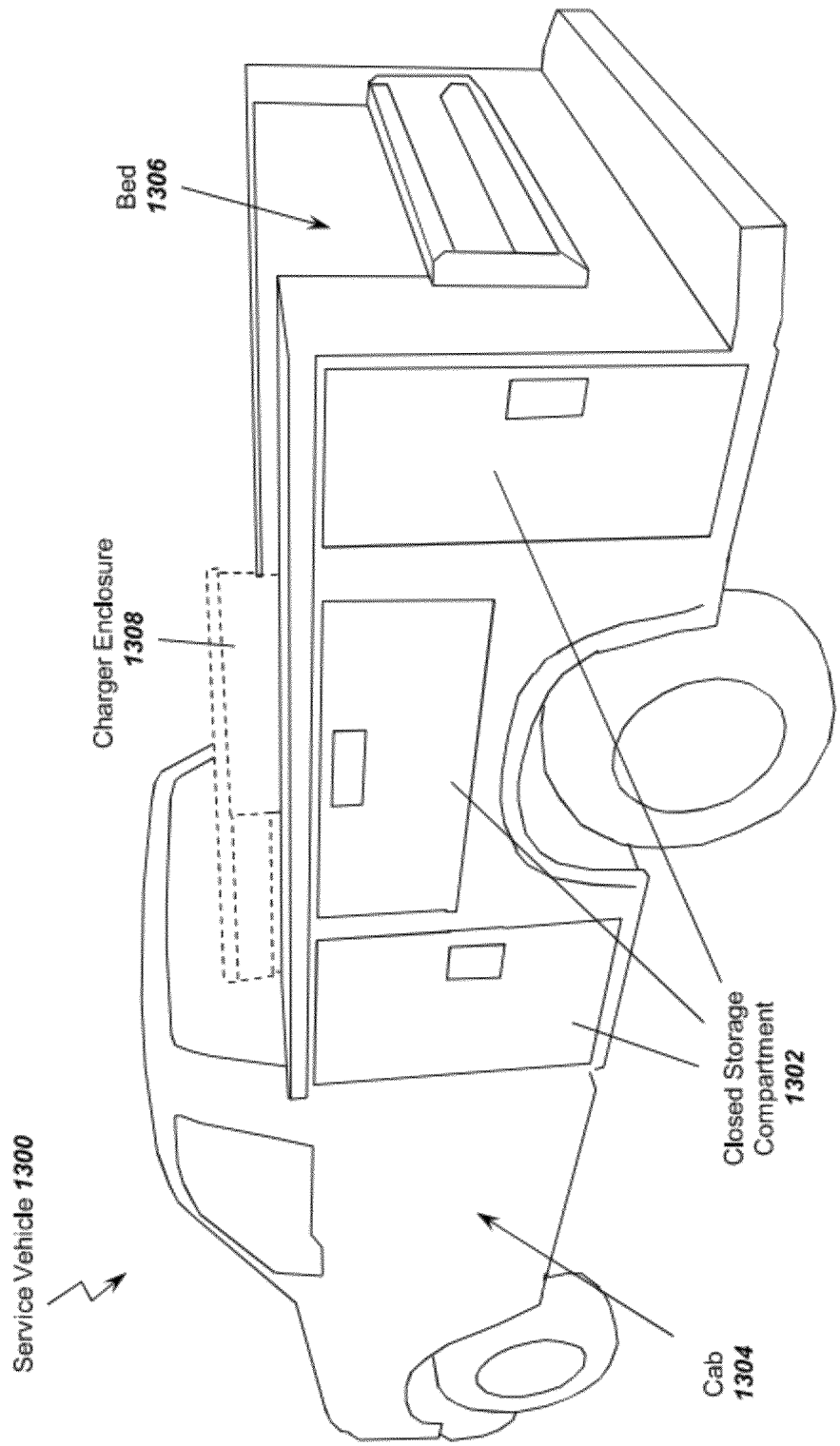

CHARGING SERVICE VEHICLES WITH BATTERY AND GENERATOR SOURCES

CROSS-REFERENCE TO RELATED APPLICATIONS

Priority is claimed to the following related U.S. Provisional Patent Applications, which are hereby incorporated by reference in their entirety: (1) Ser. No. 61/489,849, filed May 25, 2011, (2) Ser. No. 61/489,879, filed May 25, 2011, (3) Ser. No. 61/493,970, filed Jun. 6, 2011, (4) Ser. No. 61/494,878, filed Jun. 8, 2011, and (5) Ser. No. 61/497,216, filed Jun. 15, 2011.

BACKGROUND

The present invention is directed to the fields of roadside assistance, electric vehicle charging, modular energy storage systems, and related fields.

In recent years, the popularity and affordability of electric vehicles (EVs) such as battery-powered EVs, hybrid gasoline-electric EVs (or HEVs), and other vehicles having motors and engines powered by electrical energy has grown dramatically. As these vehicles gain more market penetration and presence, there will be a need for increased on-the-road-services for EVs, such as providing a "boost charge" to the EV, similar to how service vehicles provide a motorist with a gallon of gasoline to get them to the next fueling station today. One of the challenges in providing these services will be the numerous differing standards used in the batteries of electric vehicles that are coming to market, since their various battery chemistries, capacities, and dimensions make the range and charging requirements of each vehicle quite different. For example, small EVs will only need a small amount of energy to allow them to travel safely to a dedicated service or charging area, but large electric vehicles will require a relatively large charge of energy to reach a service area due to their larger energy consumption rates.

Furthermore, vehicles involved in roadside assistance will be compelled to recharge or refill their boost charging equipment, resulting in losses due to inefficiency and downtime. Recharging energy storage takes time, so although batteries and chargers are improving in their ability to accomplish this in less time, this process will always set a lower limit on the time interval between uses of a battery-based EV-recharging rescue vehicle with built-in energy storage.

Removable batteries are common in electrical equipment, and even some EVs have removable batteries to provide motive power to the vehicle. One of the challenges in using removable batteries is the danger to operators that arises from the high powered connectors for the batteries. Some inventors use plastic shrouds or robotic battery manipulation for personal protection from exposed electrodes or simply use no protection at all, leaving the operator and equipment at risk. These systems can make it dangerous to use and store a battery-powered EV charging system. Some systems with removable batteries insert a "dead" power supply or other electronic device into a "live" backplane. This configuration is not ideal since it doesn't allow for the de-activation of a "live" battery tray during handling without some human intervention, like opening a switch or removing a fuse, and since humans can forget to take these safety measures there is a greater risk of personal injury in these systems. Some systems envision large battery swap-out stations for EV batteries instead of recharging them while in the EV. The EV batteries swapped out therein can be approximately 25 kWh in capacity, can weigh 500 pounds or more, and require robotic devices to remove and install them. They also typically have a multi-person crew. This is expensive, and the proprietary nature of the swappable battery designs leads to difficulties in compatibility of vehicle systems and swapping stations.

Another challenge in this field relates to how to minimize the size and weight of the battery and the balance of the onboard systems of the rescue vehicle's onboard electrical generation system. This optimization makes it more efficient to recharge an energy store for repeated uses over relatively short time intervals. Sizing an onboard battery pack for the most demanding, worst-case stranded vehicle is impractical and expensive. Some assistance solutions use permanently installed batteries which occupy the battery housing at all times and can only be removed with labor-intensive and time-consuming effort. Permanently installed batteries render the host vehicle completely dependent on said batteries both in charging time and charging frequency, since it takes time for a charging event to complete, and the batteries require a resting period between recharges to prevent overheating. Large batteries are also expensive and heavy so a generator system having them is burdensome and oversized when charging events are relatively infrequent when compared to other activities of a rescue vehicle.

Near-term future deployments of rescue vehicles are likely to initially require minimal electrical storage capability due to the limited market penetration of EVs. However with increased EV market penetration it will become increasingly important to gracefully grow rescue vehicle electrical capability to meet customer demand without needlessly expending large capital outlays for battery systems before such larger systems are required by the marketplace. Even if charging systems are designed with removable batteries and quick disconnects, swapping them out between one location and another can raise challenges for operators. Operators may need to rapidly respond to an emergency situation while on heavy trafficked road, and there are many potential safety-related issues associated with moving high-energy battery modules.

BRIEF SUMMARY

Various embodiments of the invention disclosed herein provide a roadside assistance and rescue vehicle charging system (which system may be alternately referred to herein as an Adaptable Multifunction Emergency EV Charging System or "AMEECS") and related systems and methods that allow the charging system to charge EVs in need. An EV rescue vehicle of one such embodiment has a set of a modular batteries (which modules may be alternately referred to herein as Rescue Operation Battery Modules or "ROBM") which may be linked together to form a high-capacity battery, such as a high-capacity 12-volt battery bank, having much larger energy storage capacity than the onboard battery of a traditional roadside assistance vehicle or tow truck. The battery modules are used to provide power to an EV charging station that is transported by the vehicle.

The modular features of the battery system allow service providers to anticipate and adapt to future growth of the rescue vehicle's onboard recharging capacity by allowing the user to add additional battery modules and thereby increase capacity of the energy storage. In some embodiments, future battery module additions may be placed inside an enclosure of the charging system of the rescue vehicles or may be stowed elsewhere on the vehicle.

In some embodiments the battery modules are linked to the rescue vehicle or charging system with quick-disconnecting links and contactors. Such quick-disconnecting apparatuses provide safety by preventing users from electrical shock exposure or arcing due to improper removal of the battery modules. In some embodiments the battery modules in a vehicle have electrical and mechanical disconnects so that, after one or more stranded EVs are charged, depleted batteries can be quickly replaced with fully charged batteries when they are available. A quick disconnect system minimizes the need to wait for the charging system's battery module to be recharged either at a charging location or by using the onboard organic charging system/alternator and enables more efficient redeployment of the rescue vehicle.

In some embodiments battery modules are sized to comply with individual lifting recommendations, such as Occupational Safety and Health Administration (OSHA) recommendations, to allow a rescue vehicle operator to manually lift them and install them in a vehicle, but in some embodiments the modules may be larger in size. Therefore, in some embodiments, this means that the OSHA-approved National Institute for Occupational Safety and Health (NIOSH) lifting guidelines are followed. In many cases these rescue vehicle battery modules are housed, charged and deployed from enclosures (which may be unstaffed) that are conveniently located for rescue vehicles to resupply when their battery modules are depleted. Additionally, some embodiments of the invention include a system of resupplying vehicles that deliver modules as needed to service vehicles to keep the service vehicles operational.

In some embodiments the rescue vehicle's onboard battery system is configured to provide energy for normal rescue vehicle functions and electrical equipment but also has adequate capacity to provide a boost charge to a stranded EV. In these embodiments the built-in, inherent, or "organic" electrical system of the vehicle (e.g., a commercial truck or van) is modified by adding connections to the charging system and battery modules. In some of these embodiments, battery modules are used to supplement the energy supplied by the organic electrical energy storage of the vehicle. In some embodiments the vehicle's alternator or other electrical generation device will work with the modular battery system to power the charger or recharge the battery modules at some rate. In yet further embodiments the battery modules are recharged by a connection to an electricity distribution grid while carried by the rescue vehicle or when stored at a grid-connected battery charging station.

Some embodiments of the invention allow the battery modules to be recharged remotely and/or separately from the rescue vehicle's onboard charging system, such as at a warehouse or other facility. In effect, this system de-couples the time required for charging an onboard energy storage system from the minimum time required between EV service events performed by rescue vehicles. In these embodiments, instead of having to wait for batteries to recharge, the lower limit is constrained only by how long it takes to disconnect a discharged battery module and reconnect a charged module. In this embodiment any exposed electrodes are de-energized as long as they are accessible to human hands.

Battery modules in a rescue vehicle may be discharged sequentially or simultaneously. Sequential discharging means fewer batteries are dealt with daily since only certain modules will need recharging after a day of assisting EVs instead of all batteries being partially discharged, but sequential discharging means the batteries are subjected to deeper discharges before they are replaced.

Embodiments of the invention using battery modules allow rescue vehicles to follow economic incentives to be out and ready to serve customers as many hours of the day as possible so that they can maximize turnover of successful assignments. Running out of electrical charge and having to return to a home base charging station to recharge onboard energy storage is time consuming, and therefore reduces the number of operations each rescue vehicle can achieve. In some embodiments the rescue vehicles run on diesel and do not have large battery modules.

Additional embodiments describe quick disconnectable battery modules and enclosures that provide safety to users while providing accessibility to components by using relays and disconnects to energize battery modules when they are securely positioned. Some embodiments use deliverable automotive batteries as a power source of charging equipment, or charge the deliverable batteries using an alternator or generator on the service vehicle while the batteries are transported by the vehicle. Battery modules may be subject to charging and discharging while on the vehicle in accordance with reservation and prioritization systems and methods employed by a system controller on the vehicle.

Some embodiments include service vehicles having ports for connection of charging cables positioned on the service vehicle for accessibility and efficiency. The charging cables may be segmented to allow extension of the cables to greater distances and to allow a single user to be able to move the cables longer distances while being OSHA recommendation-compliant.

Additional and alternative features, advantages, and embodiments of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In addition to the novel features and advantages mentioned above, other objects and advantages of the present invention will be readily apparent from the following descriptions of the drawings and exemplary embodiments.

FIG. 6C is a front plan view of a quick-disconnect system with a battery module drawer installed and a retaining bar closed according to an embodiment of the present invention.

FIG. 6D is a top plan view of a quick-disconnect system with a battery module drawer installed according to an embodiment of the present invention.

FIG. 6E is front plan view of a quick-disconnect system with a battery module drawer installed and a retaining bar open according to an embodiment of the present invention.

FIG. 6F is an isometric view of a quick-disconnect system with a battery module drawer installed and a retaining bar open according to an embodiment of the present invention.

FIG. 10B shows a top perspective view of a rescue vehicle and identifies a number of potential sites on the vehicle where a charging cable connection port may be located.

FIG. 11A shows a side view of exemplary charging equipment connectors and cables.

FIG. 11B shows a perspective view of an exemplary female cable connector and/or charging equipment connector.

FIG. 11C shows a perspective view of an exemplary male cable connector and/or charging equipment connector.

FIG. 12A is a diagram of a rescue vehicle with a charging cable and connectors and an EV.

FIG. 13A shows a side perspective view of a service vehicle with storage capability according to an embodiment of the invention.

DETAILED DESCRIPTION

Vehicle-Mounted EV Charging System

Some embodiments of the invention may be referred to as an Adaptable Multifunction Emergency EV Charging System ("AMEECS"). The AMEECS is designed to carry enough energy in a chemical battery pile and, potentially, in onboard gasoline, diesel or other fuel, to recharge an EV. Preferably, the EV is charged with sufficient kilowatt-hours permit the EV to get out of a roadway and/or get to a suitable charging station.

Figure 1A:
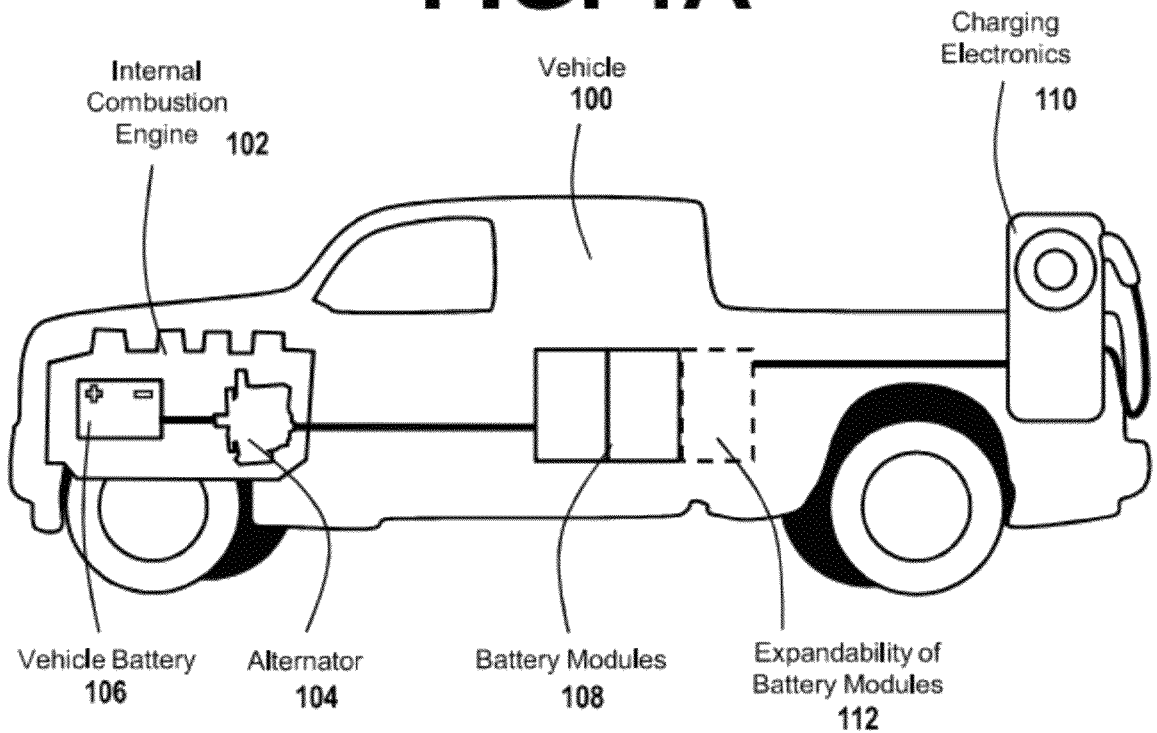
FIG. 1A shows a vehicle with a charging system powered by battery modules according to an embodiment of the present invention.

FIGS. 1A, 1B, 1C, and 1D show various examples of a vehicle-mounted EV charging system according to embodiments of the present invention. The system of FIG. 1A is a vehicle 100 that is used to assist stranded EVs that has an internal combustion engine 102. The vehicle 100 may run on gasoline, diesel, or another standard fuel. The vehicle engine 102 has an alternator 104 used to provide electricity to the vehicle systems and to recharge the vehicle battery 106, which may be a standard 12-volt type. In some embodiments, the alternator 104 may be a generic electricity generator powered by the engine 102 of the vehicle or an output from the engine such as through a power take-off. This vehicle has additional battery modules 108 (e.g., Rescue Operation Battery Modules or "ROBM") connected to the electrical system of the vehicle, and the battery modules 108, vehicle battery 106, and/or the alternator 104 of the vehicle are the power source for the charging electronics 110 used for recharging EV batteries. The battery modules are preferably configured to be expandable (as indicated by module 112), so that a user can insert more battery modules into the system to increase overall storage capacity or instantaneous available output power from the charging electronics 110 by using more modules 108 at once. In this embodiment, the battery modules 108 essentially act as an oversized vehicle battery, and can therefore also provide energy to the vehicle electrical system (e.g., starter, lights, etc.) and can be recharged by the vehicle's alternator 104.

In some embodiments the modules 108 are discharged according to a predetermined sequence, and in other embodiments, the modules 108 are discharged simultaneously. If the modules 108 are discharged according to a sequence, discharged modules may be exchanged for fully charged modules with less work required since fewer modules need to be exchanged. However, the circuitry may be less expensive and complicated, and the time for recharging may be reduced when the modules discharge simultaneously, so simultaneous discharging may also be a feature of some embodiments.

The charging electronics 110 include electric vehicle supply equipment (EVSE), indicators, EV connectors, step-up transformers or DC-DC converters for converting the battery voltage to the desired EV charging voltage, and/or inverters or other DC-AC converters to provide the proper current to the EVs being charged. Some embodiments use a 12-volt charge system of the service vehicle along with a small battery pack (e.g., ROBM) to charge an EV using a step-up transformer in order to comply with the TEPCO® CHAdeMO specification, the SAE J1772 specification, or other similar vehicle battery charging interface.

Figure 1B:
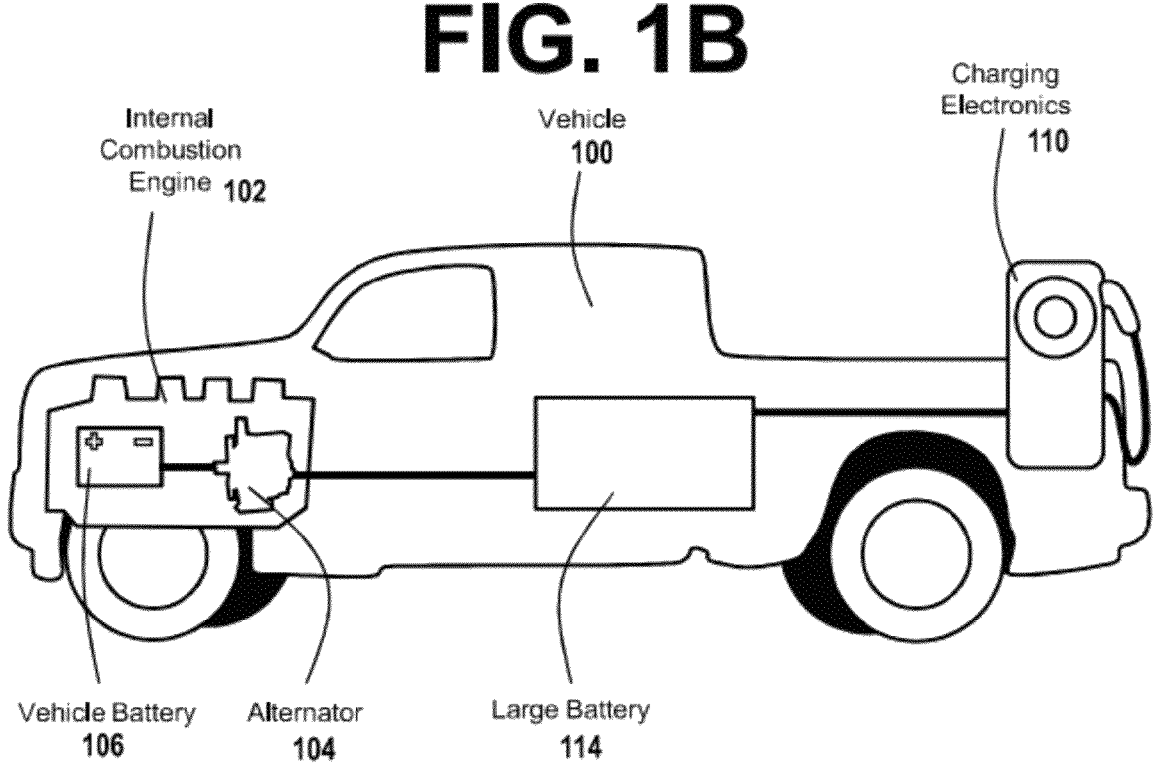
FIG. 1B shows a vehicle with a charging system powered by a large battery module according to another embodiment of the present invention.

FIG. 1B shows a similar system to FIG. 1A, but the interchangeable battery modules 108 are replaced by a large battery 114 that is designed to be changed as a whole instead of in parts. The large battery has high capacity and supplements the vehicle battery 106 in providing energy to the vehicle electrical system and to the charging electronics 110. This large battery 114 can be recharged by the alternator, and may also need to be recharged by external means if a substantial charge is required. A vehicle having a large battery 114 in place of interchangeable battery modules 108 may have reduced maintenance requirements due to the lower number of batteries in total and may be more efficient in charging using the electronics 110 due to needing fewer inefficient connections between the large battery 114 and the electronics 110. The large battery 114 may be comprised of an array of smaller batteries, but these batteries do not feature quick-disconnects, individual lifting requirement compliance, and other modular features that allow the interchangeable battery modules 108 to be exchanged with fresh modules when the batteries are depleted. These features make the large battery 114 more permanently installed than the interchangeable battery modules 108 while still providing power to the charging electronics 110 and being charged by an alternator 104. The large battery 114 is also integrated into electrical systems of the vehicle 100 and supplements and replicates the functions of the vehicle battery 106 in supplying energy to the other vehicle electrical systems such as lighting, powered windows, engine starter, and other electricity-consuming systems and devices of the vehicle.

Figure 1C:
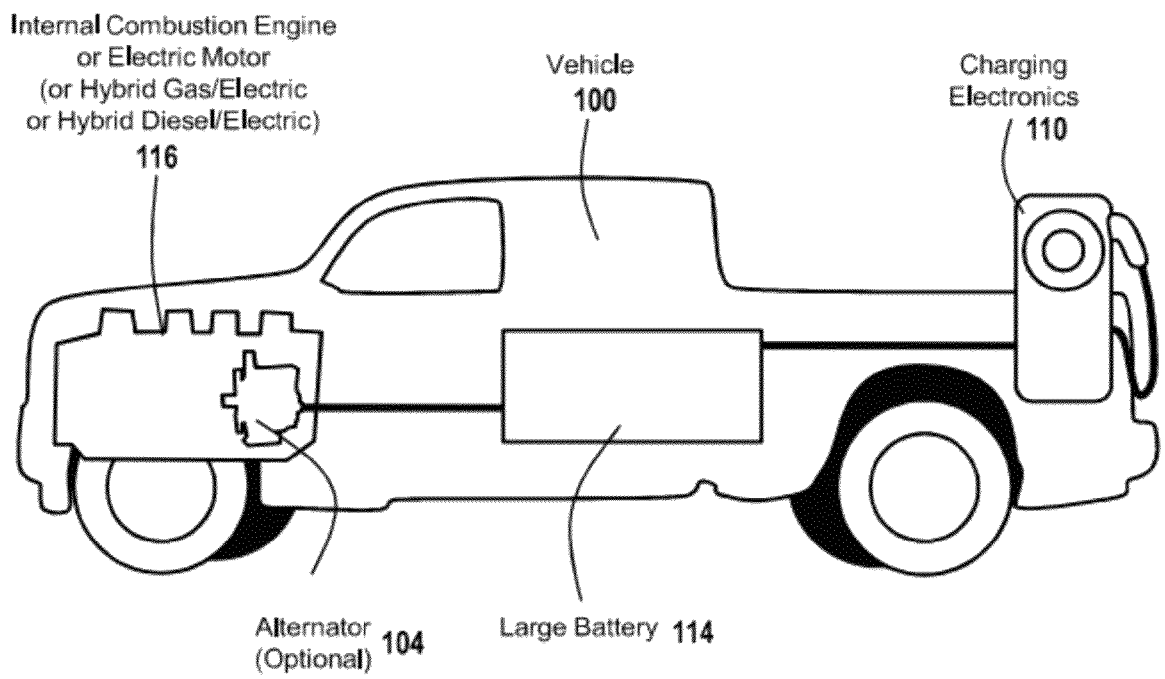
FIG. 1C shows a vehicle with a charging system powered by a large battery module according to yet another embodiment of the present invention where the vehicle may use an electric or hybrid motor or engine without a vehicle battery, or the large battery is used as the vehicle battery, and an alternator is optionally also included.

FIG. 1C shows another vehicle-mounted EV charging system. In this embodiment the large battery 114 is the vehicle battery, and no additional vehicle battery (e.g., 106) is provided to the vehicle. Instead of merely supplementing or replicating the functions of the vehicle battery as in FIG. 1B, the large battery 114 in this embodiment replaces the vehicle battery altogether. Thus, this alternative vehicle 100 has an electric motor or hybrid internal combustion/electric engine 116, where at least the electrical portion of the propulsion system is powered by the large battery 114 for locomotion of the vehicle 100. The rescue vehicle 100 is therefore itself an EV or partially electric vehicle that uses its storage battery as the reserve energy storage for charging other EVs using the charging electronics 110 that are linked to the large battery 114. This storage battery can be supplemented by battery modules in a manner similar to how battery modules are added to the 12-volt standard vehicle batteries in FIG. 1A. The vehicle 100 may also have onboard generation capabilities, such as an alternator 104, that are used to recharge the large battery 114 using the fuel-based portion of the engine or hybrid engine 116.

Figure 1D:
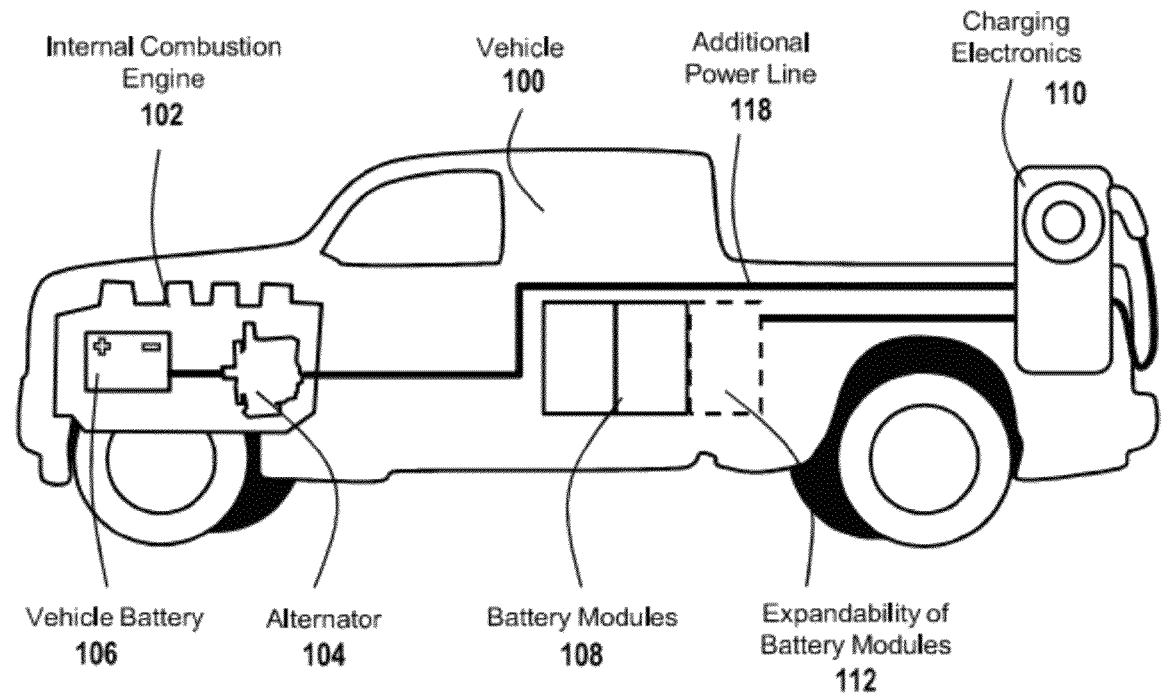
FIG. 1D shows a vehicle with a charging system powered by battery modules and a vehicle alternator/generator according to yet another embodiment of the present invention.

FIG. 1D illustrates another embodiment with battery modules 108 where the battery modules 108 provide energy to the charging electronics 110 and the alternator 104/vehicle battery 106 provides energy to the charging electronics 110 along a separate power line 118. Thus, when the charging electronics 110 are used to recharge an EV, the alternator 104 may be used to provide additional energy to the charging electronics 110 along the additional power line 118 when desired. This embodiment may also connect the alternator 104 to the battery modules 108 to recharge them while the vehicle is in motion if the connection between those parts is included. In this embodiment, it may be preferable to exchange the alternator for a higher-power generator operated by a power source such as a power take-off when available in order to provide more support to the charging electronics 110.

Spare Battery Module Management

Figure 2A:
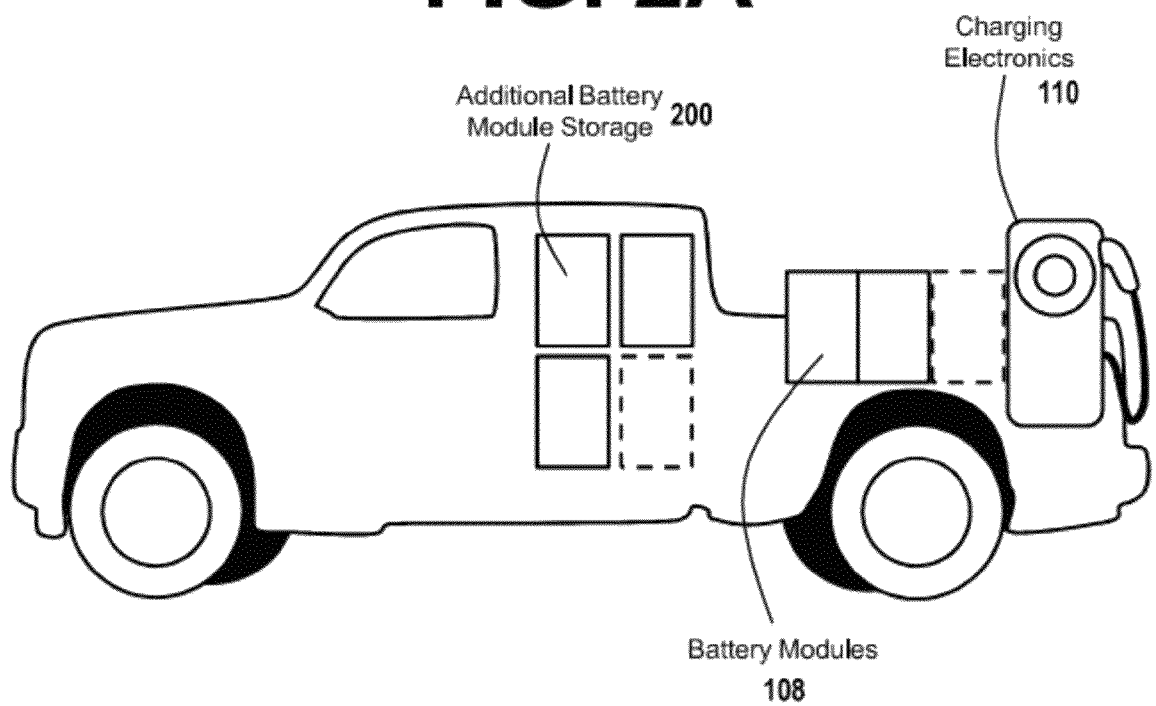
FIG. 2A shows a vehicle with a charging system powered by battery modules disconnected from the electrical system of the vehicle wherein the vehicle has additional battery module storage according to another embodiment of the present invention.

FIG. 2A shows another embodiment of the vehicle charging system. As shown here, the charging electronics 110 and battery modules 108 may be isolated from the vehicle's electrical system. In other embodiments, connection to the electrical system is also contemplated (see, e.g., FIG. 2B). In either case, these vehicles provide additional battery module storage 200, wherein the additional or spare battery modules 200 are transported by the vehicle without being electrically connected to power lines between the vehicle engine and charging electronics 110 like the other battery modules 108.

Figure 2B:
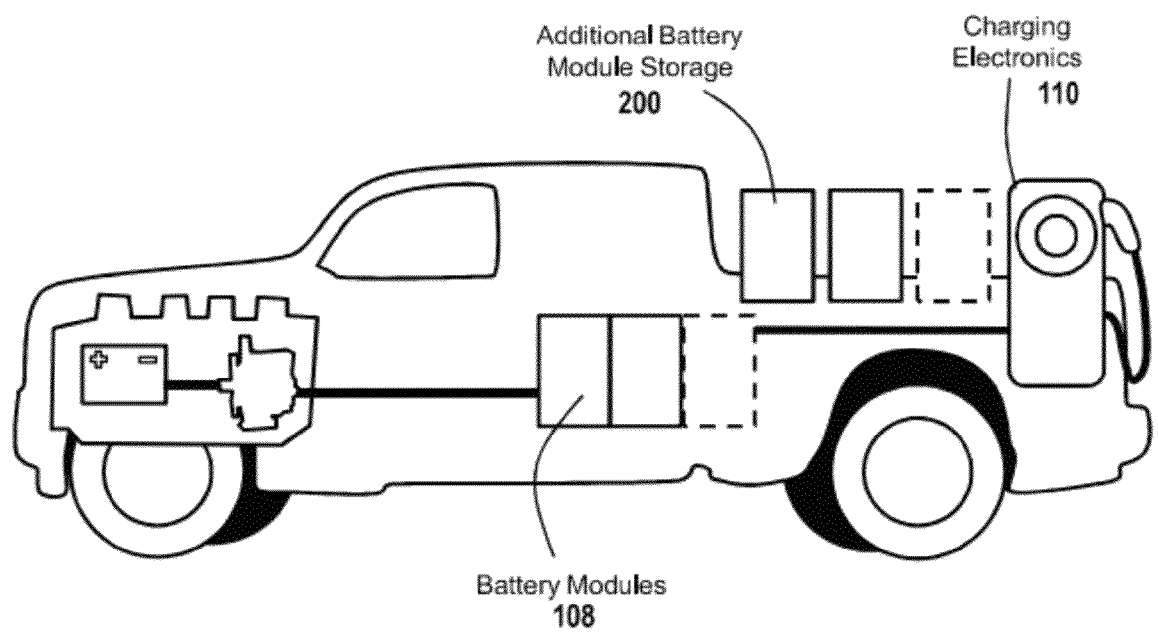
FIG. 2B shows a vehicle with a charging system powered by battery modules connected to the electrical system of the vehicle wherein the vehicle has additional battery module storage according to yet another embodiment of the present invention.

FIGS. 2A and 2B show vehicles with capacity to transport or store additional battery modules 200. When they store additional modules 200, this configuration allows the vehicle operator to simultaneously connect as many modules at once as required to the charging electronics for higher power requirement scenarios, swap in or swap out modules when other modules are depleted, provide modules to other parties such as other vehicle operators, or charge the additional battery modules with the vehicle's electrical system while the other modules are isolated or are busy charging an EV battery.

In some embodiments, spare battery modules 200 can be carried on the rescue vehicle, delivered to the rescue vehicle, or can be made available at a battery swap-out station. Additional spare electrical battery modules can be carried onboard the rescue vehicle. See, for example, FIGS. 2A, 2B, 2C, 2D, and 3, where additional battery modules are shown being stored on a vehicle. This configuration enables the possibility of greater average electrical capacity for the rescue vehicles and provides a means to gracefully increase that overall total as demand for rescue missions increases over time. Since the battery modules are interchangeable, they can serve to gracefully increase the electrical capacity of the rescue vehicle (such as its charging capacity) without significant infrastructure cost. In some cases the size or number of battery modules may increase or decrease over time as mission requirements evolve, but quick disconnect points on the vehicle will remain substantially in the same configuration. Quick disconnect features of battery modules are discussed in more detail below.

Figure 2C:
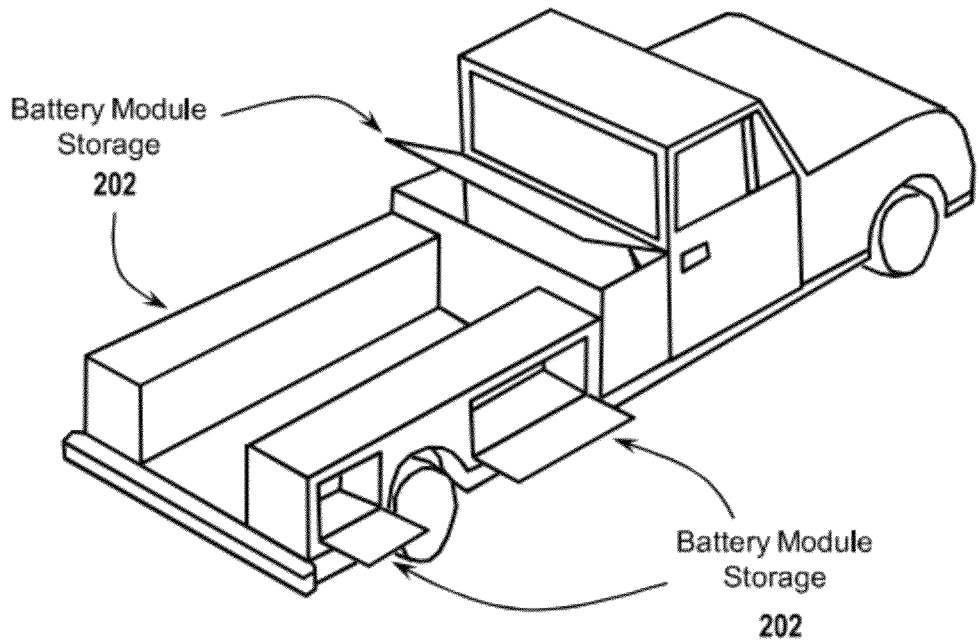
FIG. 2C shows a perspective view of a vehicle with compartments for battery storage trays and additional battery storage indicated.
Figure 2D:
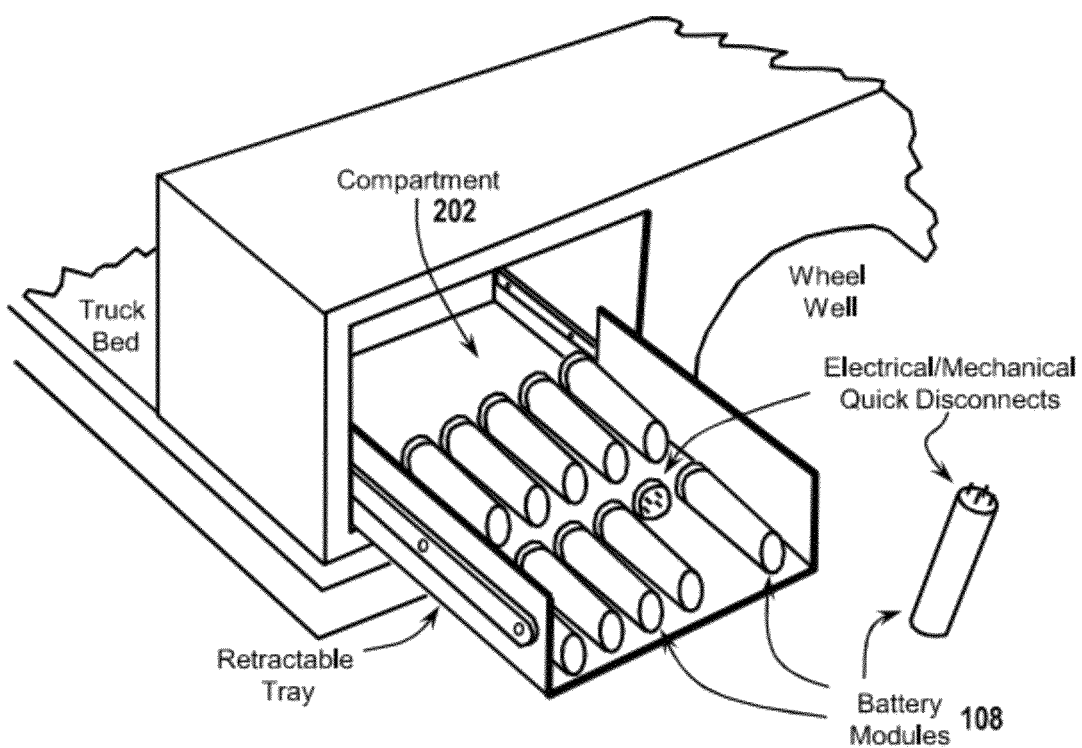
FIG. 2D shows a perspective view of a vehicle section with a compartment for battery storage and replaceable battery modules connected according to an embodiment of the present invention.

The modular feature of the battery system allows for future growth of the rescue vehicle's onboard battery capacity. Future battery module additions may be placed inside the rescue vehicle's charging enclosure or may be stowed elsewhere on the vehicle. This defers capital investment in expensive batteries until market demand warrants that investment. Spare battery modules may in some cases be located in the rescue truck main box/enclosure, a storage rack, or at other locations on the vehicle. FIGS. 2C and 2D show that storage compartments 202 for battery trays or modular racks may be located on the rescue vehicle in some embodiments. FIG. 2D is an example of a battery management tray apparatus. The battery modules/cells are stowed on a retractable battery tray and have quick-disconnects for easy replacement. Battery wiring is not shown in FIG. 2D.

Figure 3:
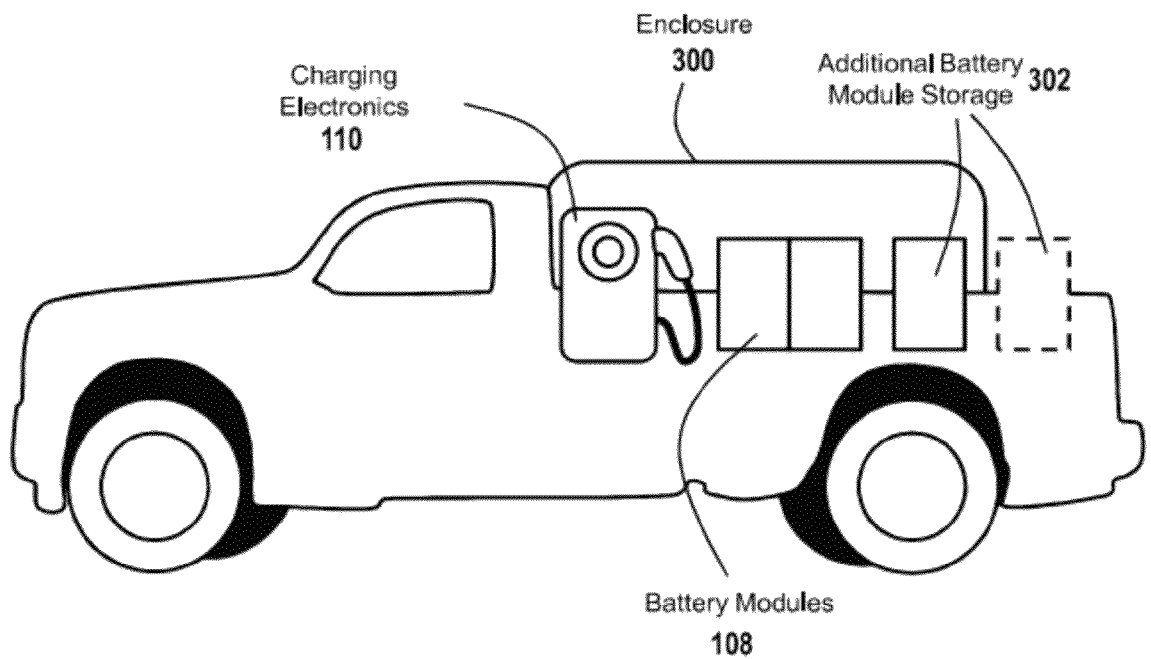
FIG. 3 shows a vehicle with a charging system and enclosure according to yet another embodiment of the present invention.

FIG. 3 depicts another embodiment of the charging system mounted in a vehicle. Here, an enclosure 300 keeps the battery modules 108 and charging electronics 110 under common protection, and optionally has space for additional battery module storage 302 inside and/or outside the enclosure 300. The embodiments discussed in connection with FIGS. 1A through 2B may also incorporate enclosures to protect the equipment borne by the vehicle which may or may not have storage capability.

Battery Module/ROBM Resupply Vehicles and Delivery

Rescue vehicle operators and administrators have an economic incentive to maximize turnover of successful missions and as such want to be out on the road and ready to serve the maximum number of hours per day. Among other problems, running out of electrical charge and having to return to a "home base" or other charging location to recharge a built-in or large battery takes time and reduces the number of recharging operations each vehicle can achieve. Some embodiments of the invention provide that rescue vehicle battery modules may be resupplied in the field by a battery resupply vehicle. A resupply vehicle of these embodiments is in communication with rescue vehicles and provides replacement battery modules for depleted batteries.

Figure 4:
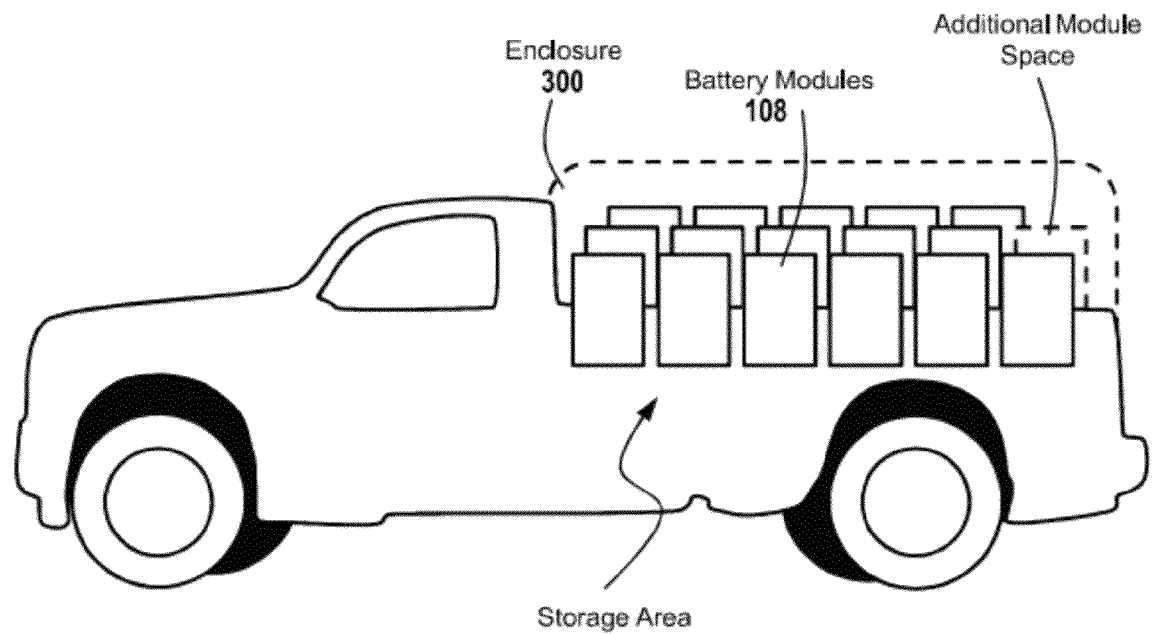
FIG. 4 shows a vehicle for transporting battery modules according to an embodiment of the present invention.

FIG. 4 is a depiction of a dedicated resupply vehicle according to an embodiment of the invention. Battery modules 108 are stored in the vehicle and are transported to rescue vehicles or battery module roadside swap-out locations or battery charging stations. The vehicle can store various types of battery modules 108 if its delivery destinations use different types of batteries (see also FIG. 5C). The resupply vehicle's onboard electrical system can be utilized to provide charge to the battery modules 108 in order to keep them at full charge at the time of delivery. In some embodiments the resupply vehicle carries other EV rescue-related equipment, handheld devices capable of providing EV operators with essential information, and/or communication links.

In some embodiments a smart controller optimizes the routes of the rescue vehicles and of resupply actions. In some embodiments resupply action may be initiated at the time the rescue vehicle identifies that it is being routed to a stranded EV. In other embodiments the controller optimizes based on rescue vehicle location, resupply vehicle location, traffic, onboard ROBM status, rescue call volume, and other factors. It may also wait until a predetermined number of stranded EVs have been serviced by the same rescue vehicle or until the rescue vehicle's onboard system indicates that it is "low" or out of available energy storage, then dispatch battery modules to replenish the storage of the rescue vehicle.

Figure 5A:
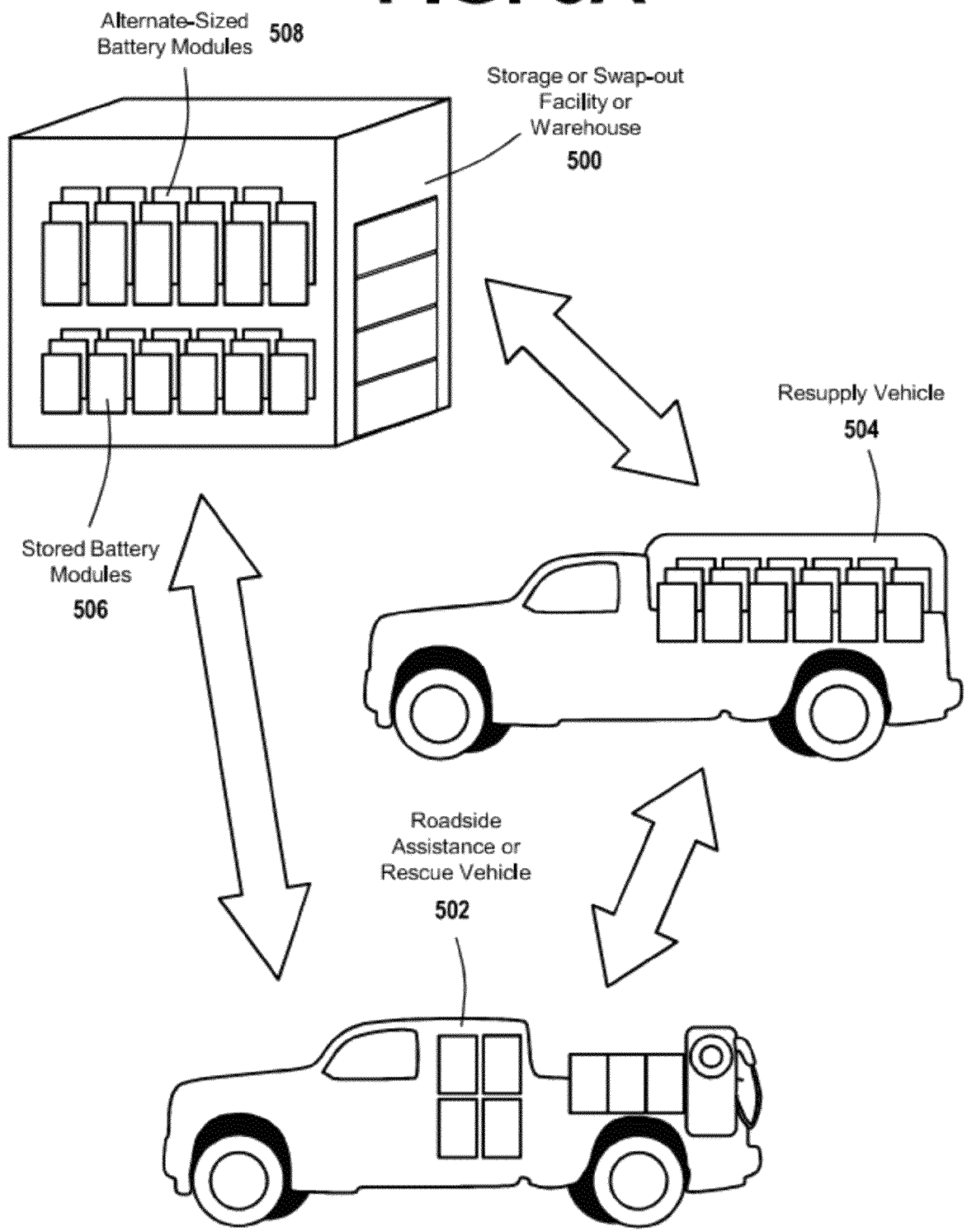
FIG. 5A is a diagram of the relationship between a storage facility, resupply vehicle, and roadside assistance or rescue vehicle according to an embodiment of the present invention.
Figure 5B:
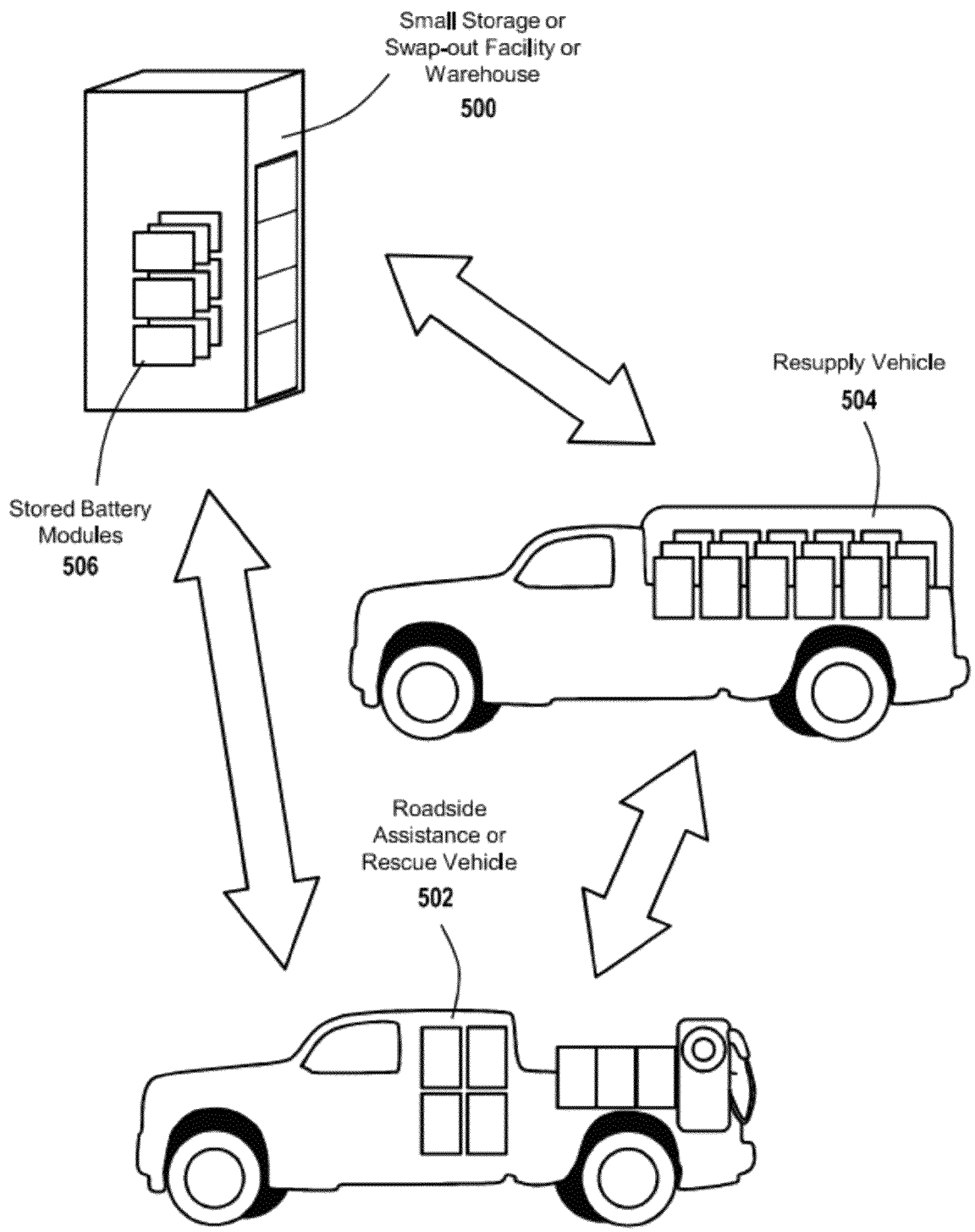
FIG. 5B is a diagram of the relationship between another storage facility, resupply vehicle, and roadside assistance or rescue vehicle according to an embodiment of the present invention.

FIGS. 5A and 5B illustrate the relationship between battery module storage facilities 500, rescue vehicles 502, and resupply vehicles 504. The modules 506 and/or 508 may be exchanged between the storage facilities 500 and the resupply vehicles 504, between the resupply vehicles 504 and the rescue vehicles 502, and/or between the facilities 500 and the rescue vehicles 502.

Some embodiments would allow the resupply vehicle 504 to provide multiple battery modules 506 and/or 508 to one or more rescue vehicles 502 during a single delivery trip. Other embodiments would permit the rescue vehicles 502 to act as resupply vehicles when they have enough battery modules to respond to another rescue vehicle's need for modules 506 and/or 508. See, for example, FIG. 5C, wherein a rescue vehicle 502 is shown transferring modules 506 and/or 508 to other rescue vehicles 510.

In additional embodiments, a smart controller routes the resupply vehicle 504 to an optimal roadside battery swap-out station 500 or to an optimal central battery module recharging station 500 to keep the battery modules 506 and/or 508 of the fleet at full capacity for the maximum length of time.

In additional embodiments, a system of quick disconnects is utilized to facilitate fast and efficient battery module change out from the resupply vehicle 504 and these battery modules 506 and/or 508 may be sized to meet Occupational Safety and Health Administration (OSHA) recommendations or other safety or regulatory lifting requirements for manually exchanging the modules.

Figure 5C:
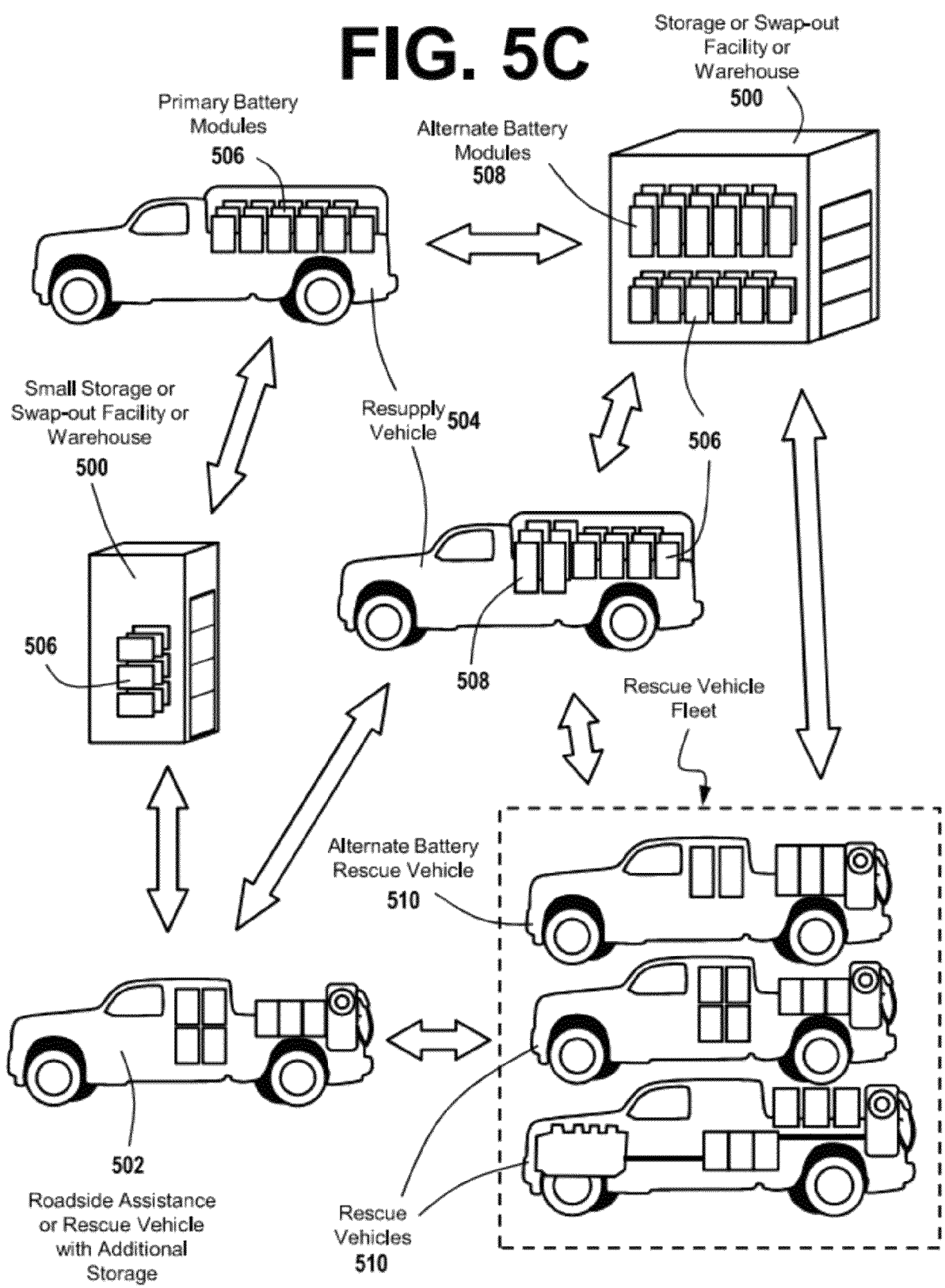
FIG. 5C is a diagram of the relationship between multiple storage facilities, resupply vehicles, and roadside assistance or rescue vehicles according to an embodiment of the present invention.

FIG. 5C shows the relationship between the resupply vehicles 504, the rescue vehicles 502 and 510, and the storage facilities 500. Resupply vehicles 504 transfer and/or recharge battery modules 506 and/or 508 and provide them to rescue vehicles 502 or storage facilities 500. Different resupply vehicles 504 may be necessary to provide different types of batteries (e.g., 506 or 508) to rescue vehicles 502 and 510 or storage facilities 500, since in some embodiments not all of the facilities/vehicles will be compatible with the same battery modules.

Lightweight/OSHA-Compliant Battery Module for Manual Removal and Reinstallation

In some embodiments, the battery modules are designed to be lightweight and/or U.S. Occupational Safety and Health Administration (OSHA) recommendation compliant, thereby allowing manual removal and installation of the modules. The modules are therefore analyzed under the National Institute for Occupational Safety and Health (NIOSH) lifting equation, where a recommended weight limit is calculated by multiplying a load constant (LC), horizontal multiplier (HM), vertical multiplier (VM), distance multiplier (DM), asymmetric multiplier (AM), frequency multiplier (FM), and coupling multiplier (CM) from a NIOSH table described in connection with the NIOSH lifting equation (last revised in 1991). To avoid lifting injuries, the recommended weight limit is at or below 3.0 as calculated by this formula. In some embodiments, this means battery modules are light enough to be carried by a user and are changed out either manually or with a labor-saving device, and if manual labor is required, the weight of the device is 42 pounds or less, and ideally 35 to 42 pounds each, in order to maximize the capacity of each module by making them as large as possible. The 35-pound lower boundary is selected according to a recommendation set by OSHA. These figures also assume that the battery modules are stored in the service vehicle in such a manner that the lifting does not take place at full arm-extension nor with the lifter's trunk twisted to a significant degree. These weight and size figures are not intended to define the absolute limits of the scope of the dimensions and weight of the battery modules, but as a preferred guideline for common embodiments of the invention.

These OSHA-recommendation-compliant embodiments are advantageous because no special lifts or other equipment are required for the quick disconnection and replacement of the onboard energy store, so the overall system has the flexibility of single-operator operation. Only the rescue vehicle driver is required to operate the system, with no additional supporting personnel or lifting equipment. Other embodiments use OSHA-compliant lifting equipment to manipulate the battery modules if the size and number of modules requires.

Battery Module Capacity Optimization

Some embodiments feature battery modules with a capacity sized to correspond with logical units of charge required to move an EV sufficient distance to reach an EV charging station. For example, consider a typical EV assistance scenario. Since typical EVs can currently travel approximately 4 miles per kWh of battery storage, and since most rescue operations can be accommodated in 12 miles, and assuming a battery size of 4 kWh would weigh approximately 85 pounds, two battery modules of approximately 42 pounds each would be used to perform this rescue recharging operation. Other similarly optimized system sizes are envisioned over time. Battery modules would be optimized to provide a boost charge to less-efficient vehicles stranded on the roadways by increasing the capacity or number of modules set to be used for those charging events. This optimization allows standardized battery modules to be used to charge EVs with a wide range of different electrical efficiencies. The rescue vehicle is therefore sized in some embodiments to carry many more battery modules than are necessary for a charging event of a single, efficient EV, so that the rescue vehicle can be dispatched to provide charge to less efficient EVs, additional EVs, and can be loaded to meet other demands of the charging assignments given.

Onboard Battery Module Charging

Some embodiments of the invention minimize the required capacity of battery modules by leveraging the rescue vehicle's onboard electrical system to provide additional charging capacity when needed. See, for example, FIGS. 1A, 1B, 1C, 1D, and 2B, where the alternator of the vehicle is used to assist in charging the battery modules. In this manner the onboard energy storage modules can be maximized beyond the physical constraints of the isolated battery capacity since recharging supplies additional energy that can then be used in rescue operations. The onboard organic charging system typically comprises the vehicle's alternator, battery, and other electrical components, but it may also include a more substantial or modified electrical system used in the normal function of the vehicle. The vehicle's electrical system may be merely involved by recharging a storage battery or battery modules, or the vehicle's system may be directly involved in providing power to the charging electronics on the vehicle.

For example, some embodiments allow battery modules to be stowed in a rack which provides a trickle charge from the rescue vehicle's alternator or another onboard energy generation device. This system ensures that fully charged batteries remain charged and can eventually recharge a battery to a normal state of full charge from a state of depletion.

Connecting and Managing Multiple Battery Modules

In some embodiments, battery modules are grouped together into clusters of modules. These clusters can be reconfigured into OSHA-recommendation-complaint weight groupings in some embodiments when appropriate.

In some embodiments, the battery modules (ROBM) stowed in the rescue vehicle's storage rack systems may be electrically connected to the AMEECS, charging equipment, or vehicle's electrical system. Each battery module or cluster of battery modules may have a connector switch that can be enabled or disabled, wherein when the switch is disabled, the battery module is isolated from other modules. In some embodiments these switches are opened or closed manually and in another embodiment they are controlled through use of an onboard command panel of the vehicle or module charging station. In one embodiment the command panel may be manually overridden by a manual override switch. In this manner individual battery modules or clusters do not have to be moved to a particular rack to be used or recharged. This reduction in battery module movement improves field operations efficiency and reduces exposure of operators to potential safety issues.

Some module storage locations may not have electrical connectivity and require the battery module to be moved to be utilized to support rescue operations. This condition may occur during periods of capability expansion or to address unique storage requirements.

Where practical, the systems are automated and/or provide the operator with a mechanical advantage. This facilitates installation and removal of the modules.

Figure 5D:
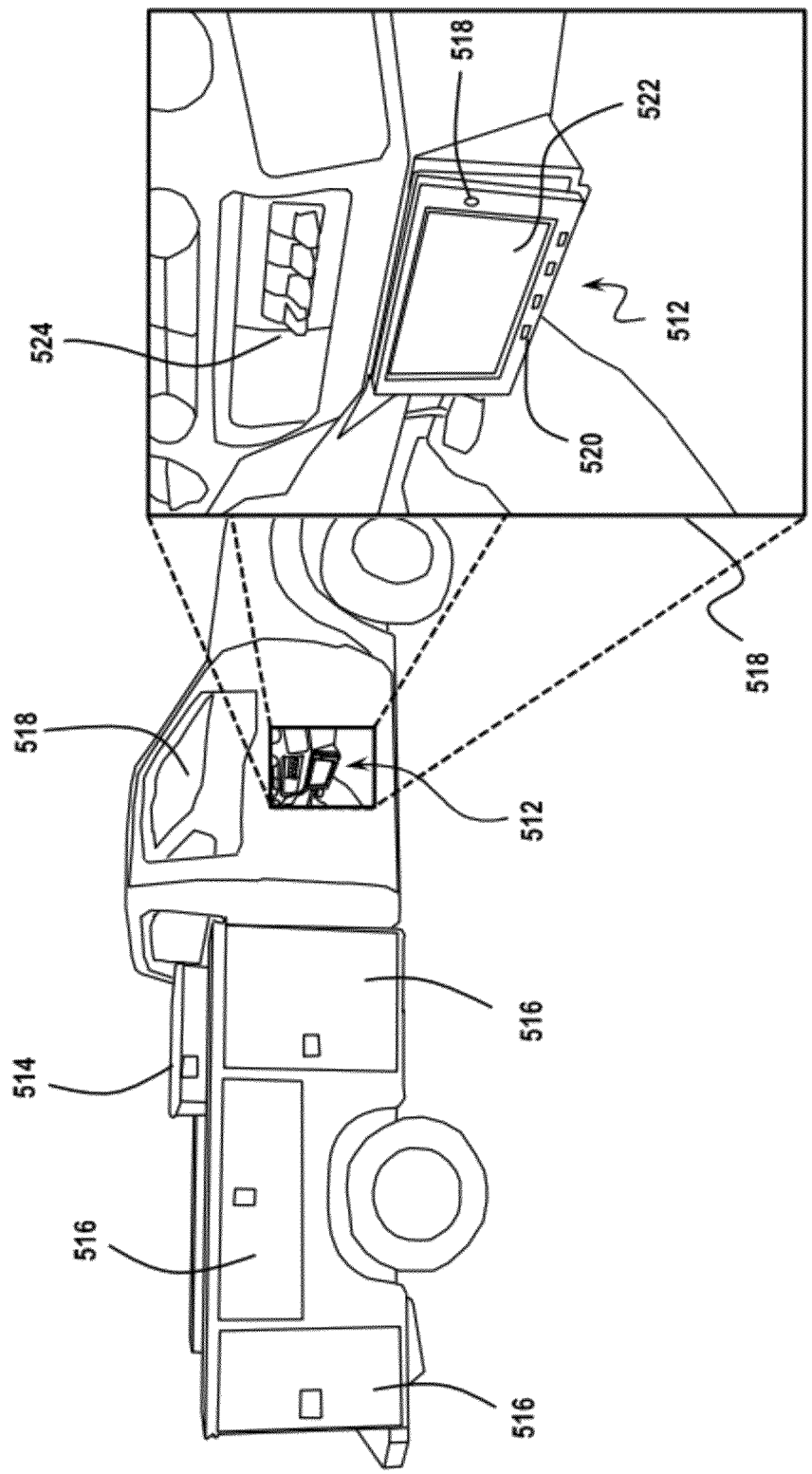
FIG. 5D shows a side perspective view of a service vehicle with detail showing the interior of the vehicle having a status display component of an embodiment of the invention.

In some embodiments, depleted battery modules are identified and displayed on an onboard controller or display. FIG. 5D shows side perspective view of a rescue vehicle having an onboard display 512 for indicating the status of onboard charging electronics 514 and battery modules stored in compartments on the vehicle 516. In this embodiment, the display 512 is located in the passenger compartment 518 of the vehicle. The onboard controller is a computer, microprocessor, or other similar programmable logic device that reads and executes instructions or code. The controller may have output connections, input connections, and displays or other elements designed for user access and interaction. The controller may be "smart," meaning the controller's functions may be automated to some extent to serve the user with minimal user input, such as by predicting and anticipating future user needs. Furthermore, controls 520 and indicators 524 of the display 512, which may be a touchscreen display 522, may allow the vehicle to send and receive information about nearby stranded EVs, instructions to or from a control center, or control the operation of the onboard charging electronics 514 or battery modules 516. The instrument panel 524 of the vehicle may also be available to the user to integrate the controller and display with other functions of the vehicle. Buttons may adjust the power, brightness, and/or contrast, navigate through menus, or input commands into the display 512. Lights may be used to indicate alternative information such as charge status or power indication, for example. In this embodiment, the display assembly 512 is positioned below the instrument panel 524 of the vehicle, but it may also be placed in other locations in the vehicle, such as, for example, above the dashboard, near the vehicle dials or other controls, integrated into a screen already installed in the vehicle (such as a global positioning system (GPS) navigation client or media control display), placed in a compartment or enclosure on the service vehicle, or placed on the exterior of the vehicle.

Figure 5E:
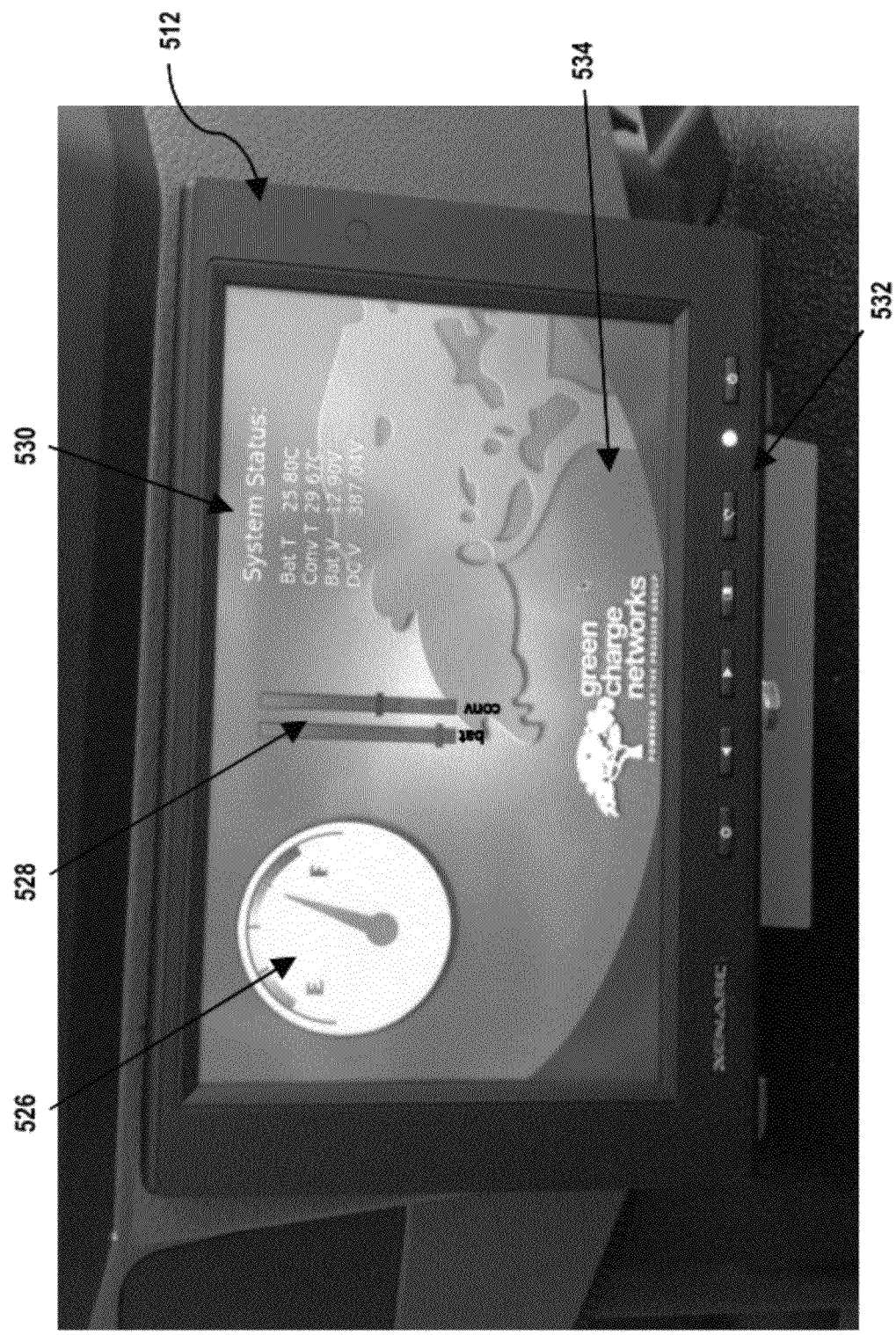
FIG. 5E shows a frontal perspective view of a status display component installed in the interior of a service vehicle with detail of the information presented on the display of an embodiment of the invention.

The display 512 may present various pieces of data to the user, as indicated in the frontal perspective view of FIG. 5E. Here, the charging system status display 512 shows a status dial 526, status gauges 528, and status text/messages 530 on an LCD screen. Buttons 532 on the status display 512 allow the user to adjust the settings of the display and/or charging equipment. For example, the buttons 532 may be used in one embodiment to adjust the amount of charge transferred to a stranded EV in a single charging event, enabling an automatic charging cutoff of energy at a predetermined energy level. Graphics 534 are also shown on the display, and may be modified to provide status information, alerts, graphs, and other system information to the service vehicle operator.

In this embodiment, the status dial 526 shows a representation of the state of charge of the battery storage of the charging station in a manner similar to a fuel gauge of a vehicle, with full state of charge of the battery modules at "F" and depleted state of charge at "E". Color coding with green near "F" and red near "E" allows a user to quickly determine the health and state of the batteries on one dial. Other charging system information may be displayed on the status dial 526, such as, for example, voltage of the batteries or converter.

The sliding gauges 528 in this embodiment show temperatures of the battery module bank and the voltage converter of the charging system, and the black bar overlaid on the gauge slides up and down to indicate temperature rises and drops, respectively. Color coding is also implemented in the gauges 528, such as with red indicating high temperature to give a quick reading to the user regarding whether temperatures are in a safe range. The gauges may also show other or additional information as the user sees fit, such as state of charge of batteries, battery health, or other important factors for charging station operation.

The status text/messages 530 show detailed information about the battery temperature, converter temperature, battery voltage, and DC voltage of the charging system. This allows more detailed information to be accessed by the user for statistical analysis or data logging. The status text 530 may display any information displayed using other indicators as well. Messages from other vehicles and control centers may also appear on the display 512 to notify the service vehicle operator of instructions or nearby needs for charging or charged battery modules.

Some embodiments use a system of coded lights (such as red, yellow, and green) at each battery module's rack storage location visible to the operator which identifies the individual battery's state of charge. This allows the user to quickly identify batteries requiring a swap out or recharge. In an alternate embodiment the state of charge of individual battery modules is displayed on meters or a control panel or display such as display 512 that is located out of the cabin area 518 of the vehicle.

Figure 5F:
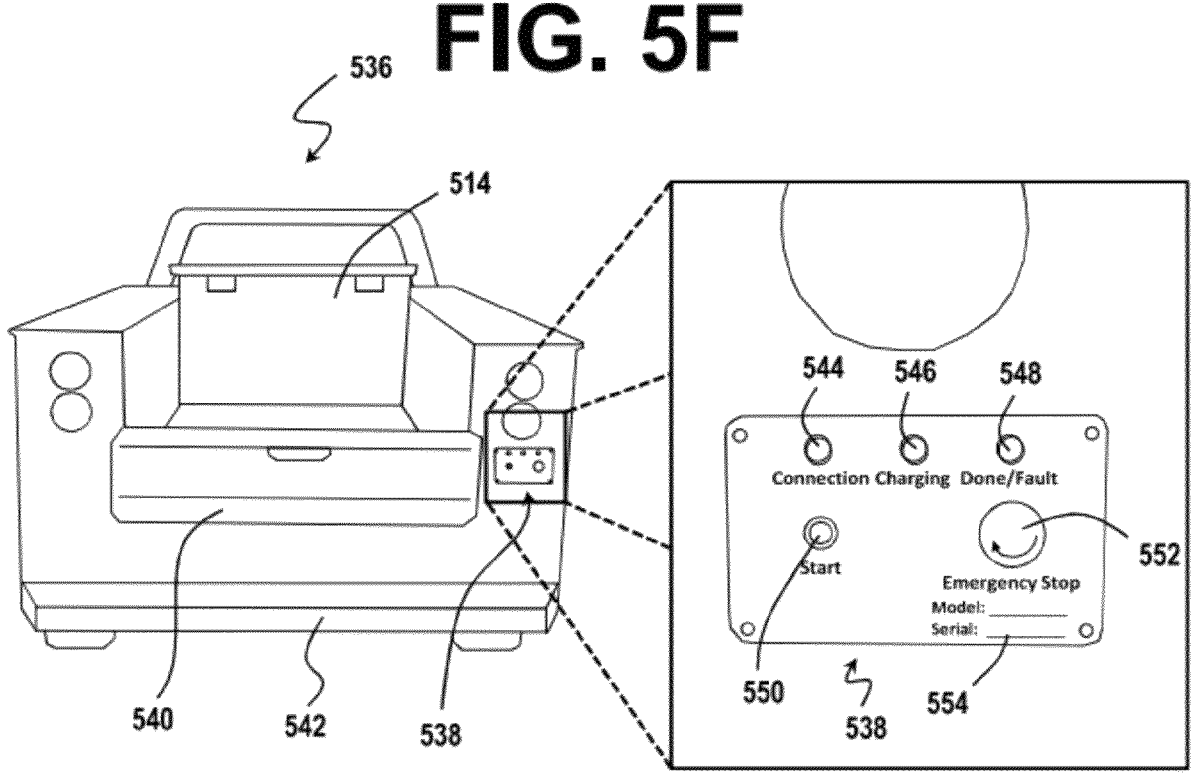
FIG. 5F shows a rear perspective view of a service vehicle with a status display component installed near the rear tailgate and bumper of the vehicle.
Figure 5G:
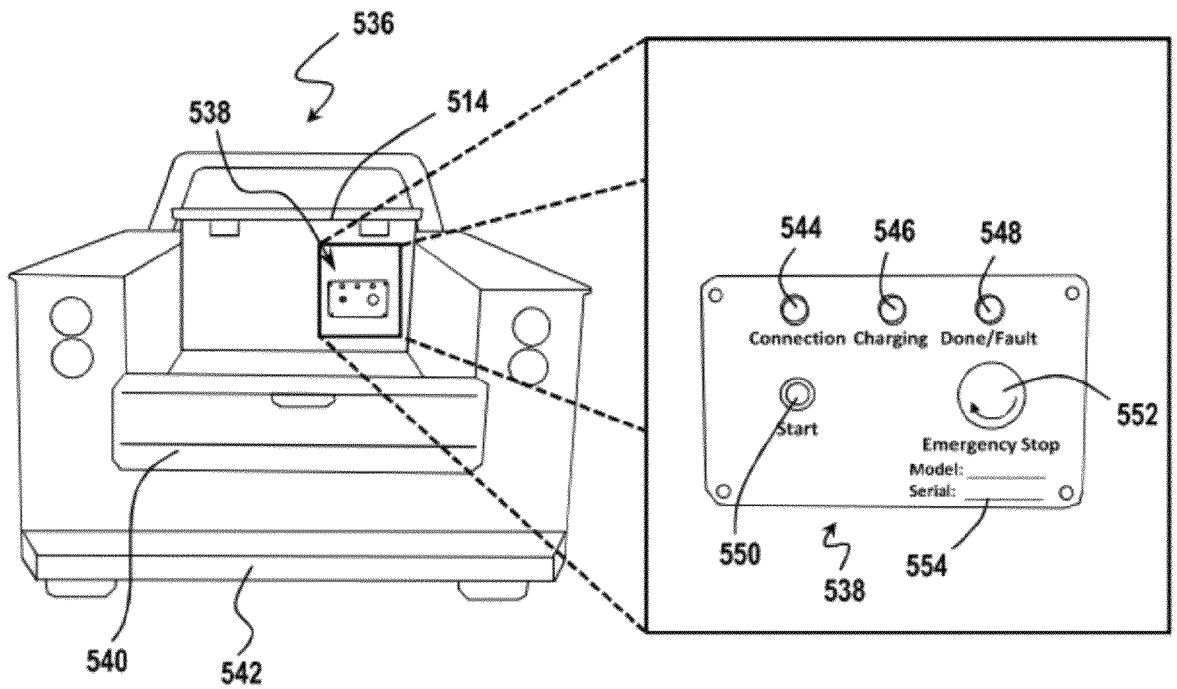
FIG. 5G shows a rear perspective view of a service vehicle with a status display component installed on the rear portion of a charging system enclosure installed on the vehicle.

FIGS. 5F and 5G show a rear perspective view of a service vehicle 536 with a status display component 538 installed. The view of FIG. 5F has a status display component 538 installed near the rear tailgate 540 and bumper 542 of the vehicle 538, and the view of FIG. 5F has a status display component 538 installed on the rear portion of a charging system enclosure 514 installed on the vehicle 536. In these embodiments, lights 544, 546, 548 indicate connection status, charging status, and done/fault status, respectively. A start button 550 and emergency stop button 552 are provided as user inputs for operation of the charging system, and other system information 554 is recorded for convenience of the user.

The lights 544, 546, and 548 may vary in size, shape, color, and signal indicated, and may be used to indicate multiple signals using a single lamp. For example, the done/fault light 548 is used to indicate when charging is done, but it can also indicate when there has been a fault in the charging system by indicating a different color, blinking pattern, brightness, etc. The start button 550 and emergency stop button 552 may be used in similar fashion by varying in size, shape, appearance, and function, and may directly or indirectly adjust the operating conditions of the charging system on the vehicle.

FIGS. 5F and 5G are an example of an exterior-mounted status display, wherein the components are weatherproofed and designed for operation in extreme and outdoor conditions and may be soiled without serious interference with operation of the charging system or display. The embodiment in FIG. 5F is advantageously positioned for being accessed while charging a stranded EV that is behind the service vehicle, or when cords and connectors for the charging system are located at the rear of the service vehicle, and the embodiment of FIG. 5G is advantageously positioned for access when the user is charging a stranded EV that is positioned to the sides of the service vehicle since he or she may look over the side of the service vehicle without having to go to either end of the service vehicle to check on the status of the charging equipment. It is noted that the display may beneficially be located at the front of the vehicle, on the sides or on the compartments of the sides of the vehicle, on top of the vehicle at any point, or within the vehicle or enclosure 514 of the charging system.

Battery Module/ROBM Resupply Facilities

In some embodiments depleted battery modules/ROBM on a rescue vehicle are changed out at resupply stations. Such resupply stations are not intended to provide batteries that power EV propulsion systems, but instead provide batteries and battery modules that are used in EV recharging stations, especially recharging stations mounted in rescue vehicles, unless the rescue vehicles themselves are incidentally propelled by energy from the battery modules which power their onboard EV recharging stations. Battery modules are not used for traction or providing motive power directly to an EV motor, but are used to provide a boost charge to stranded EVs, requiring, e.g., 4-8 kWh of charge.

In some embodiments, these stations are repositories for battery modules capable of providing a boost charge through the charging systems of the rescue vehicles. Resupply stations are normally unmanned and can be conveniently located for use by emergency rescue vehicles to respond to rescue calls in high-traffic or freeway areas. The stations may also include quick disconnect systems for the batteries to facilitate quick, efficient, and safe battery exchanges.

In some embodiments, batteries are housed in a secured recharge bin populated with level 1, 2 or 3 EV chargers at roadside stations. The chargers provide different rates of charge and can charge different types of modules depending on their power output and other electrical characteristics. See, e.g., FIGS. 5A and 5C, where a storage facility 500 stores more than one type of battery module, and, in FIG. 5C, where the rescue vehicles use different types of modules (e.g., 506 and 508). The battery modules stored in the stations may therefore also vary in size and capacity. In that case, the battery modules may be recharged and stored on shelves holding similar types of battery modules to simplify the electrical system of the facility.

In the storage area, a state of charge (SOC) indicator or additional display may show the charge status of battery modules. The battery modules' state of charge is therefore available locally but may also be provided to remote rescue vehicles via cellular, Wi-Fi, or other electronic communications transmission media. In some embodiments, rescue vehicles may reserve battery modules available at roadside resupply stations so as to provide time economies. A controller or computer at the roadside battery module exchange station can be programmed to reserve battery modules based on first come first serve, state of emergency service required, prepaid priority, or other reservation prioritization schemes. In some embodiments a controller at the station determines which module is to be charged on a rack and manages facility electrical load to avoid exceeding the facility or local grid load requirements. The battery modules may be charged in groups or phases in order to comply with overall facility loads or utility requirements and preferences. For example, the scheduling or reservation controller would not allow certain battery modules to be reserved at a location if charging those modules before they are picked up would cause the overall facility load to exceed a certain limit, such as a demand charge-inducing limit or a utility service limit or rating for the facility.

Chargers at the stations may be connected to individual or multiple batteries. Systems with level 2 and/or level 3 chargers may be configured to charge multiple battery modules sequentially or simultaneously according to rules executed by a charging controller. Larger charging systems may use multiple "hoses" or cables per charger or may utilize a bus to connect to multiple modules.

Embodiments with the smaller storage or swap out facilities 500 (as shown in FIGS. 5B and 5C) are advantageous in that the smaller facilities can be more easily distributed in a service area, thereby reducing the need for resupply vehicles since the roadside assistance vehicle operators can more readily access the battery modules stored in the smaller facilities.

In another embodiment a battery module roadside facility may provide energy storage support to an adjacent facility such as an office complex, convenience store, fast food store etc. In this way the energy management capability could at times provide a secondary service to load level a local facility or provide load relief to congested areas on the local distribution grid by discharging the stored battery modules into the electrical system of those areas when provident.

In another embodiment, the battery module roadside facility may be a mobile unit. It may have significant energy storage capability and may be connected to the grid in different areas. A facility such as this is dispatched when needed to areas having temporary high demand for electricity. This could include being dispatched to a sports arena on a weekend or to a truck stop near a freeway during peak commuting hours. The mobile system plugs into local grid power (e.g., 240-volt, 208-volt or 480-volt) at locations that are configured to accept the system. This system provides the advantage of enabling the system cost to be amortized over multiple use cases and allows more strategic positioning of roadside battery module facilities when needs are temporary.

Quick-Disconnecting Battery Modules

In some embodiments electrical energy for the AMEECS is stored in modular battery packs. In some of these embodiments each module has a mechanical quick-disconnecting apparatus to facilitate rapid and convenient change-out of discharged batteries with charged batteries. The quick-disconnect renders a battery easily swappable, and the vehicle's onboard electrical generation system is therefore not the only method of replenishing the energy store in the short interval between uses since discharged modules can be exchanged for charged modules. In other embodiments, the quick-disconnectable energy storage battery uses an electrical disconnect that does not use a mechanical switch for mechanical safety interlocking, but instead uses a fully electrical safety interlock.

The apparatus and processes described herein help to ensure that any electrodes that are exposed during equipment operation or maintenance are de-energized before they become accessible to human hands. Replacement of battery trays/drawers or otherwise accessing equipment internals necessitates an action on the part of the person performing the operation to unfasten the tray, drawer, top cover or other protective fixtures surrounding the high-powered electronics inside. Each tray can contain one or more battery module. According to these embodiments, the action required to unfasten electronics is the same action required to de-energize the electronics therein. This design helps to eliminate risks associated with forgetting to shut down the system prior to disassembly.

In one embodiment of the invention, tray fasteners for the battery modules are equipped with a magnetically conductive material such as iron or ferrite which would need to be moved out of the way to unfasten a tray or module. This in turn would break an otherwise continuous magnetic circuit. The loss of magnetic flow is detected elsewhere in the system and used as a signal to shut down (or disconnect from a contactor) the battery tray terminals. The use of the magnetic circuit affords flexibility and reliability. Flexibility is provided because the magnetic flow can be routed anywhere in the system (similarly to electric flow) and thus can be used to trigger the disconnect in places far removed from the original source. This provides convenience and practicality to the implementation of the safety interlock. Reliability is provided because magnetic continuity is easier to maintain than electric continuity; even in a small signal circuit the battery disconnect electrical circuits are easily broken or defeated by impatient operators. The magnetic flow would be required to energize the system, so that either opening the interlock or some other unforeseen failure of the magnetic path would de-energize the battery tray with equal surety. Persons with ordinary skill in the art will recognize several pre-existing methods for detecting the magnetic flow in the system and causing the battery de-energization triggered by the loss of magnetic flow.

Figure 6A:
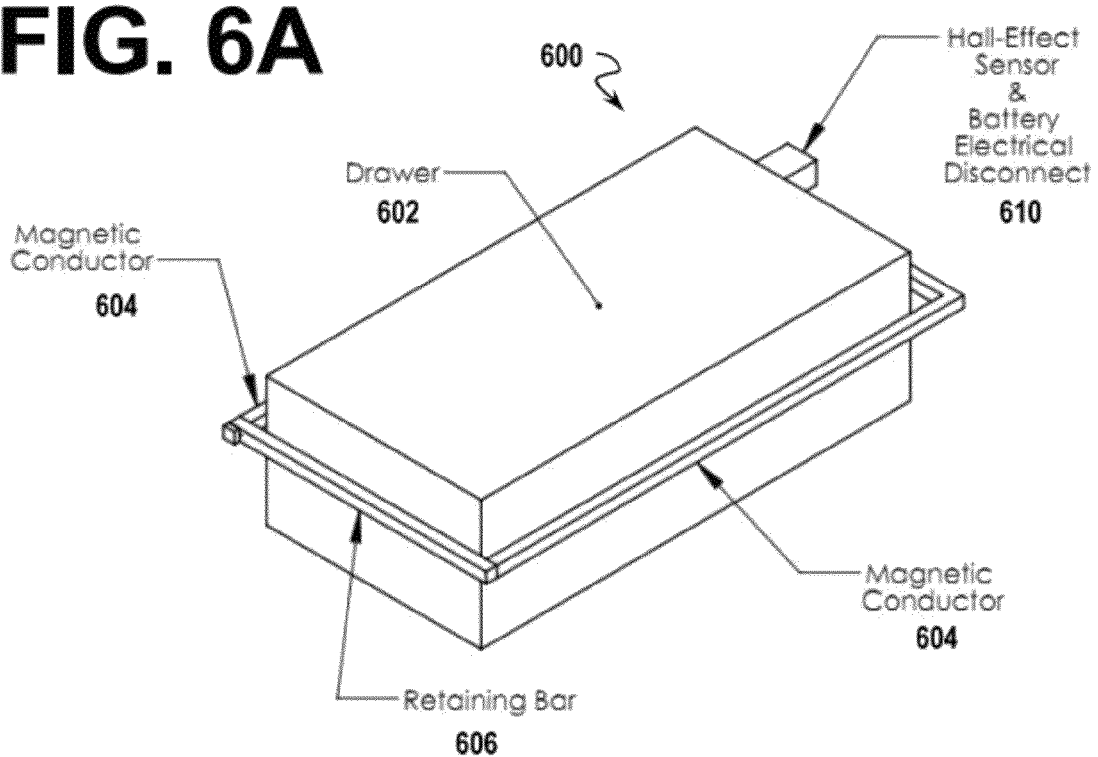
FIG. 6A is an isometric view of a quick-disconnect system with a battery module drawer installed and a retaining bar closed according to an embodiment of the present invention.
Figure 6B:
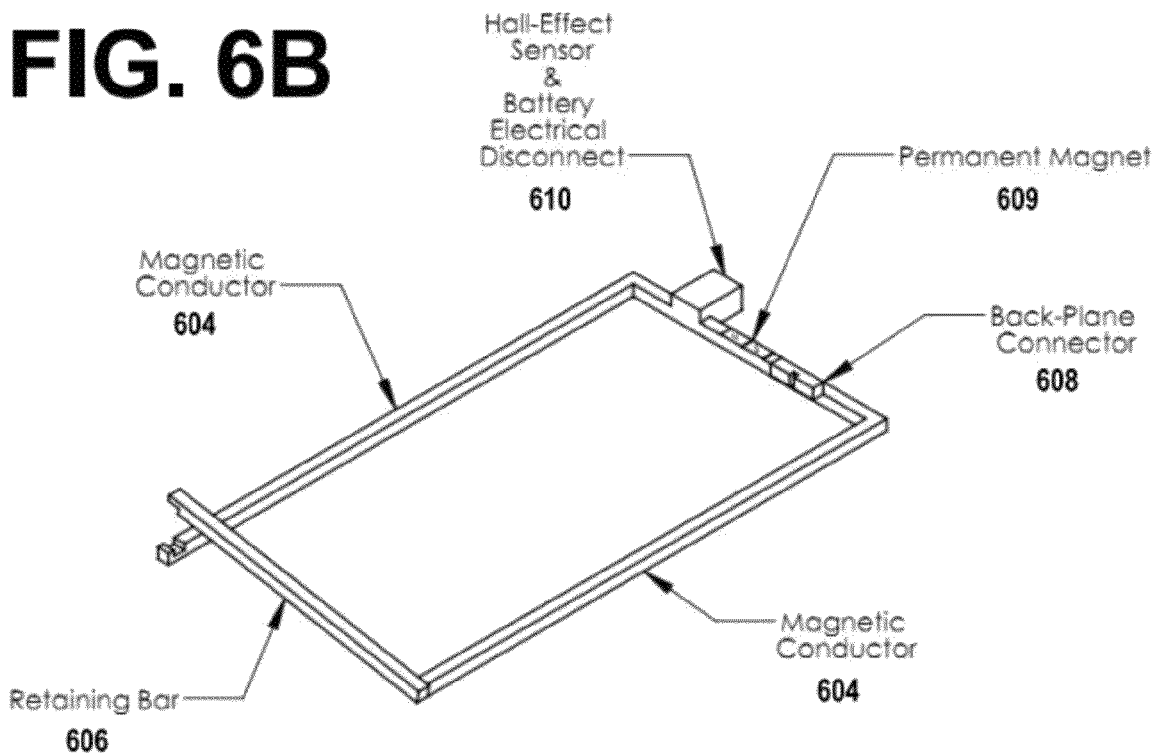
FIG. 6B is an isometric view of a quick-disconnect system with a retaining bar open according to an embodiment of the present invention.

FIGS. 6A, 6B, 6C, 6D, 6E, and 6F show various views of one possible embodiment of the present invention. These figures generally show a battery module quick disconnect apparatus and circuit 600 wherein a battery module drawer 602 is inserted into a void between magnetic conductors 604 and a retaining bar 606, and is held in place when the retaining bar 606 is brought down to close contact with a magnetic conductor 604. The battery module drawer 602 connects with a back-plane connector 608 when it is fully inserted (as shown in FIG. 6D), and electrical flow through the connector 608 is engaged when the retaining bar 606 contacts the magnetic conductor 604. In this embodiment, the magnetically-conductive retaining bar 606 closes a continuous magnetic circuit driven by a permanent magnet 609 or electromagnet and simultaneously locks the drawer 602 in place. When the retaining bar 606 is opened, sensors, such as the hall-effect sensor 610 shown, detect the loss of magnetic flow in the system and shut down (disconnect with a contactor) the battery tray back-plane connector.

Figure 7A:
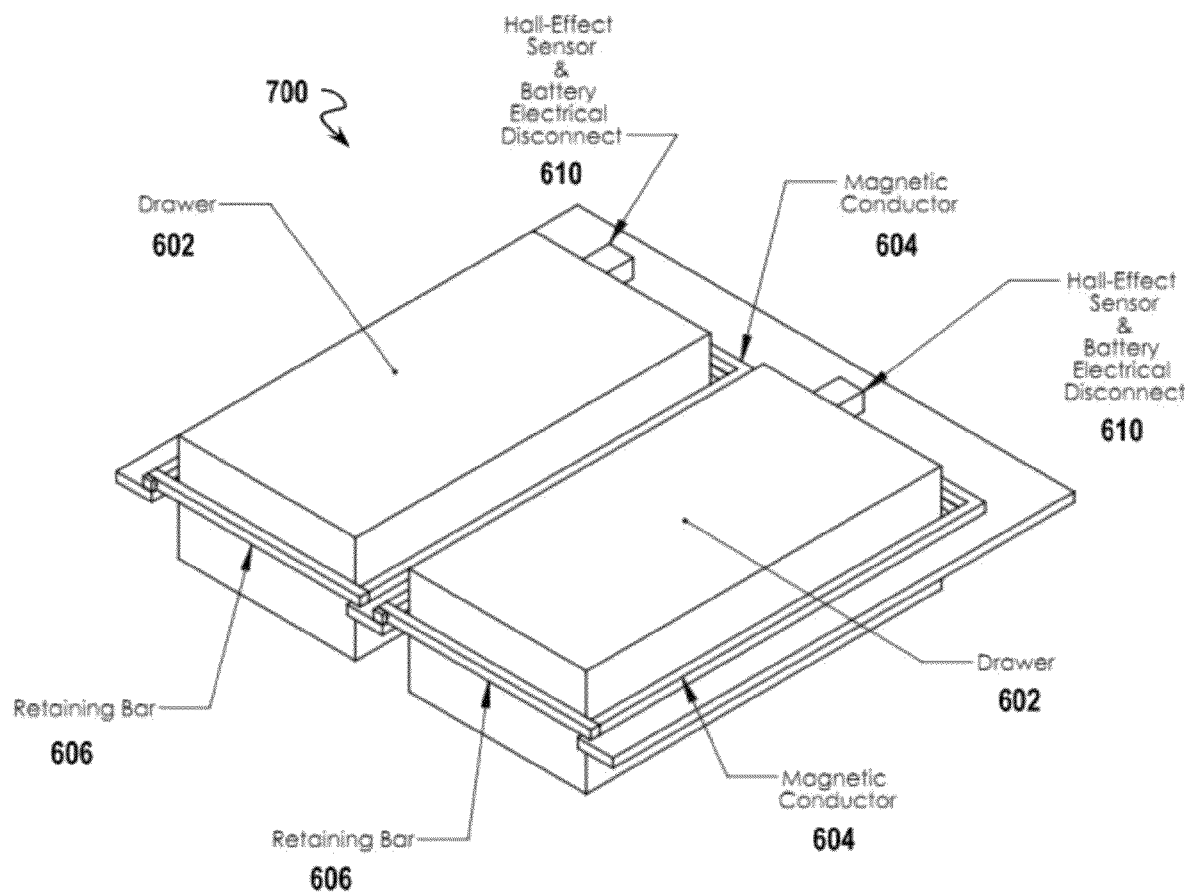
FIG. 7A is an isometric view of a quick-disconnect system with multiple battery module drawers installed and retaining bars closed according to an embodiment of the present invention.
Figure 7B:
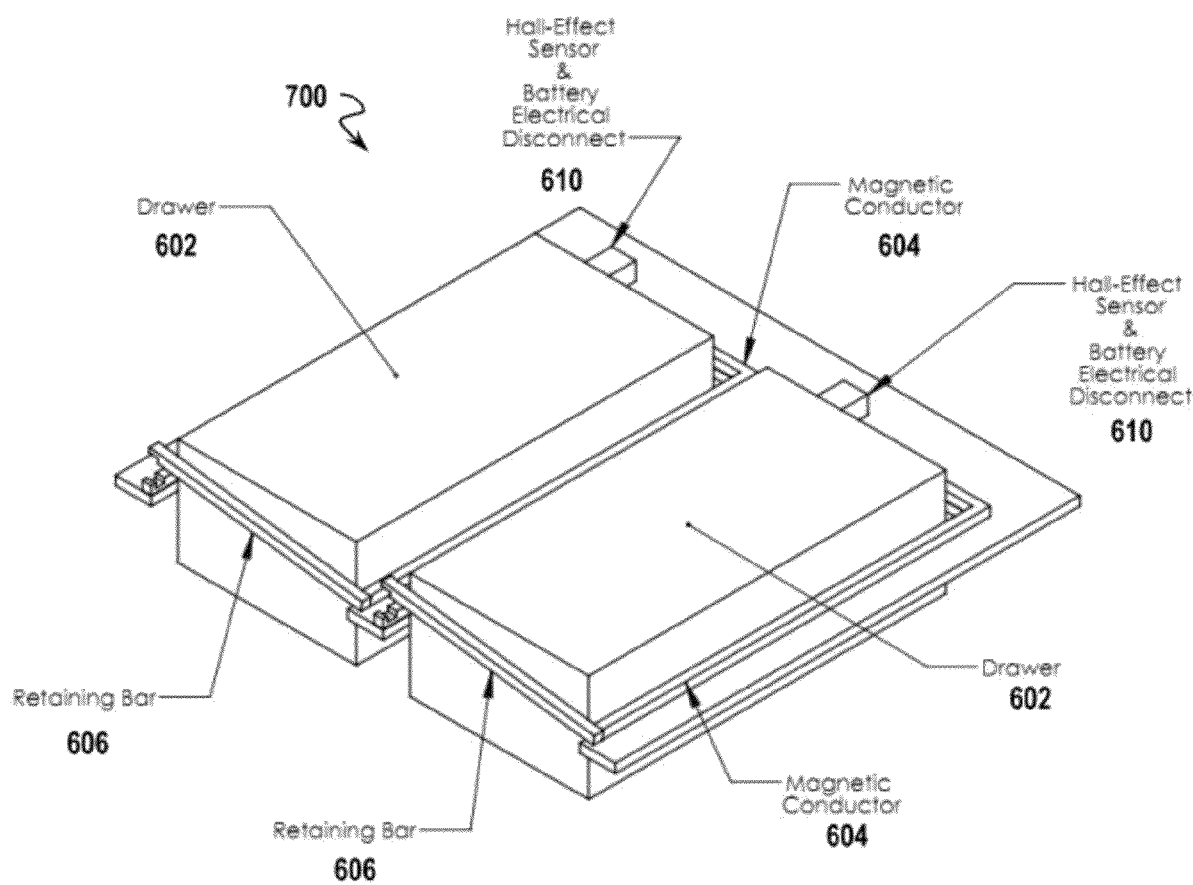
FIG. 7B is an isometric view of a quick-disconnect system with multiple battery module drawers installed and retaining bars open according to an embodiment of the present invention.

FIGS. 7A and 7B show an embodiment of the quick disconnect and battery module system with multiple drawers of modules 700 that can be quickly installed or removed. Each drawer 602 can be installed and removed independently, allowing uninterrupted power supplied by the apparatus if a battery module needs to be changed out. Also, if the charging system that the battery modules are powering needs additional storage capacity, the system is expandable to take on additional modules to meet those demands. These figures may represent a battery quick-disconnect system that is present on an apparatus that charges the battery modules when they are removed from a charging station on a rescue vehicle in addition to showing a rack in a vehicle-mounted charging system.

In another embodiment, a battery tray is de-energized by turning a handle (such as the latches 800 of FIGS. 8A and 8B) to disconnect a control signal pathway connected to a de-energization trigger. This embodiment minimizes the need to wait for the battery to be recharged either at a charging location or by using the onboard organic charging system, so the rescue vehicle can be more quickly redeployed with new battery modules.

In another embodiment, the quick-disconnectable energy storage battery (or ROBM) features an electrical disconnect and interlock that prevent removal and replacement of the battery unless the battery is electrically disconnected from the rest of the system, and it is connectable only after mechanical connections of the battery are complete and secure. One advantage provided by the electrical disconnect and interlock is the protection of the operator from electrical shock or burns associated with accidents common to the manipulation of electrical energy storage devices including shorts causing damage to equipment and electrocution causing personal harm. Another advantage of the electrical disconnect and interlock is the preservation of the delicate contacts used in electrical connections by transferring the function of making the initial electrical connection from the connector contacts themselves to a more suitable device such as a circuit breaker or electrical switch which is specifically designed with springs and vacuum chambered contacts in order to handle the sparks and surges associated with this function. This embodiment may also incorporate the interlocking electrical disconnect with a suitably-rated switch or circuit breaker attached to it such that it cannot be moved into the "ON" position unless and until the mechanical connections are complete and secure, and the electrodes of the connector are safely removed from access by human hands.

In some embodiments, the quick-disconnectable energy storage battery module uses a self-aligning connector at the back of the battery drawer for connecting a battery (e.g., ROBM) to a backplane of a battery connection point which employs extra conductors arranged to complete the connection of a relay coil which, in turn, energizes a larger contactor which completes the electrical connection. In this embodiment, oversized yet delicate contacts in the connector or a mechanical interlock are not needed to prevent the inrush of current through the delicate contacts before they are fully inserted and secure. This embodiment is advantageous because it is fully automated and has no moving parts other than the one necessary moving part inside the contactor that actually does the contacting. Full automation allows for adaptability in function, like a time delay or any other behavior that may be programmed into a processor for deciding if and when to complete the high-current connection. By closing the contactor the extra conductors in the self-aligning connector merely enable the main contactor, but do not necessarily immediately activate the main contactor.

In yet another embodiment, the extra electrical contacts in the self-aligning connector at the back of the battery (e.g., ROBM) tray are used to activate a fully electronic contactor such as a MOSFET or other solid-state switching device inside the battery tray and electrically positioned between the battery and the connector at the back of the tray. This embodiment deactivates the battery tray and makes the electrical contacts of the tray safe to touch with human hands without human intervention. Using the fully-electronic contactor confers benefits to the battery tray including but not limited to: (1) the extra reliability of no moving parts, (2) the gradual ramp-up of electrical current flow which reduces thermal shock on associated components and the EM pulse associated with sudden current flow, and (3) the option of computer checking of safety conditions before the final decision is made to complete the electrical connection.

In yet another embodiment, the battery modules are designed to permit expandability of the charging system by connecting to each other. The module housings may be designed much like building blocks that interlink until they are finally connected to the charging station at one end. In this embodiment, the battery modules indicate their present charge capacity and may be sequentially discharged to make a resupply action more fluid.

For example, if three out of five battery modules are used during the course of a day of use of the charging equipment on the rescue vehicle, the battery modules, arranged in a chain fashion, the modules on the outside end of the chain are discharged and the modules on the inside end of the chain are still charged, so when the operator changes out the discharged batteries for charged batteries, it is easier to see that three of the five need to be switched out and easier to access them as well. Then, because the modules are connected in a chain fashion, the three modules can be removed while they are still interlinked by releasing a quick disconnect latch 800 between the discharged and charged modules without having to disconnect modules one at a time. Likewise, when the battery modules are replaced, three replacement modules can be interlinked and reconnected at the point of the latch at the same time with only one quick-connect latch to reengage. Additional/supplemental battery modules can be added to this embodiment by latching a module to the end of the outermost connected module as many times as possible. See also FIGS. 8A and 8B which show a sample embodiment of an expandable battery module design arranged in a chain fashion. The chaining connection pattern allows depleted modules to be positioned at the most convenient (outermost) position in the chain and reduces complexity of adding new modules or the need for additional wiring and connection points that would be needed in another configuration such as a grid-like connection pattern.

Figure 8A:
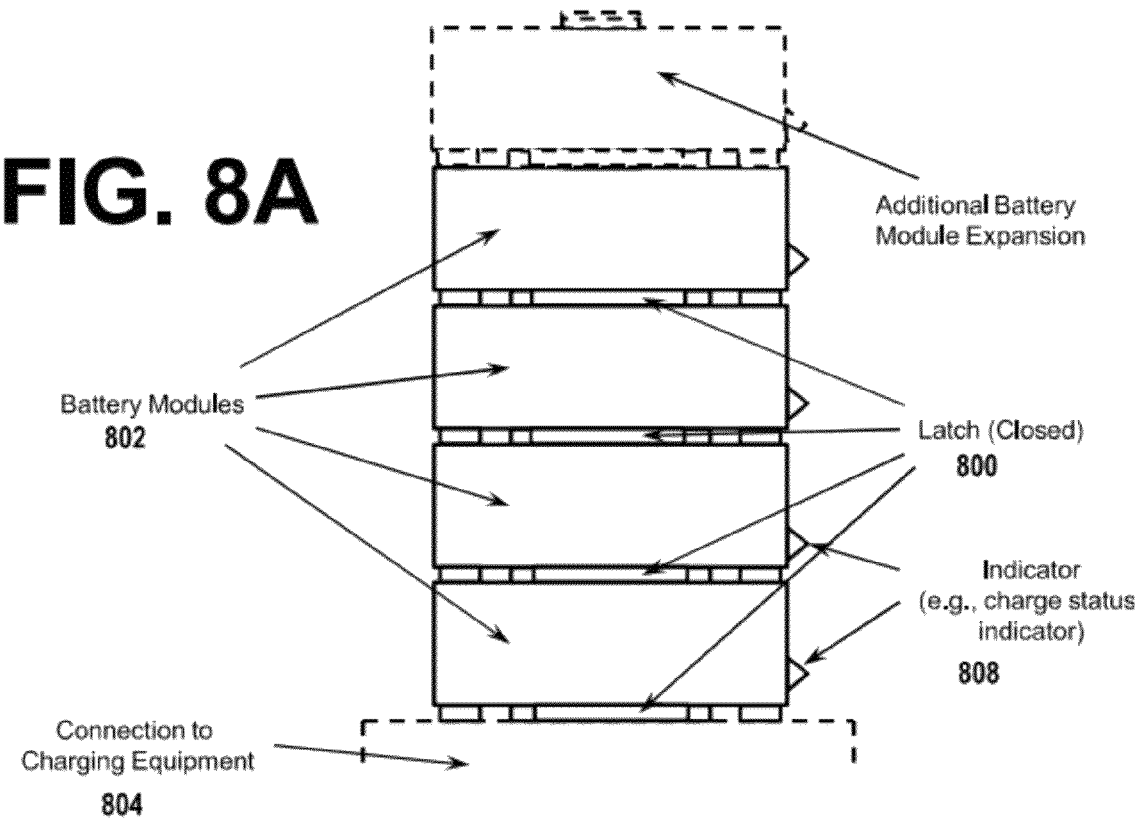
FIG. 8A is a side plan view of a modular battery system with quick-disconnect capability according to an embodiment of the present invention with stackable and/or chain-connecting characteristics.
Figure 8B:
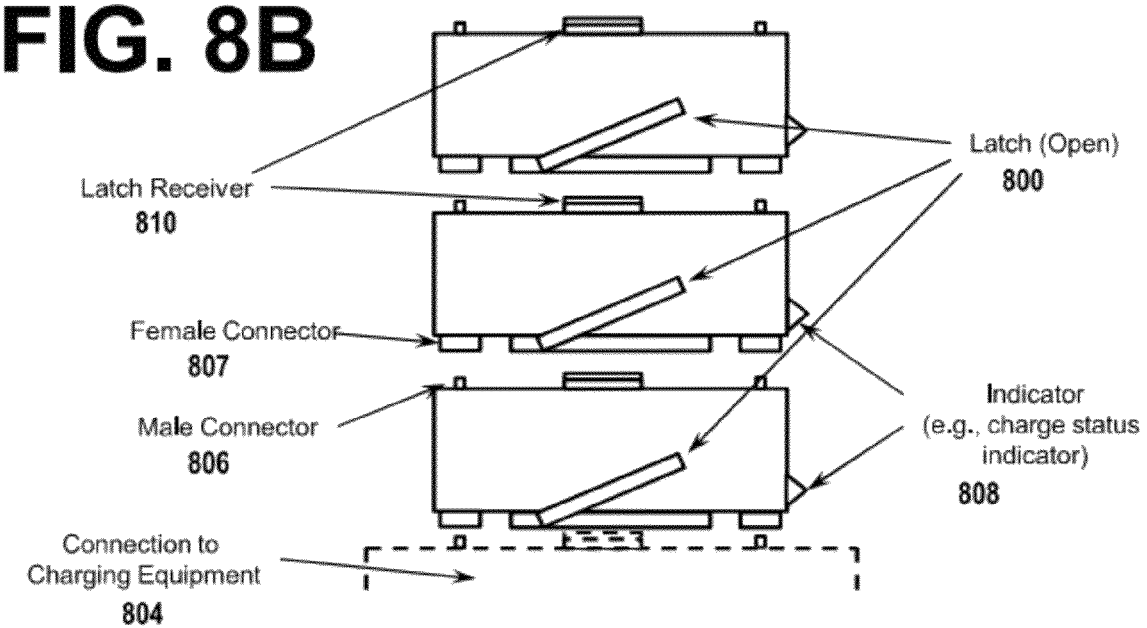
FIG. 8B is an exploded side plan view of the modular battery system with stackable and/or chain-connecting characteristics wherein battery modules are separated from one another according to an embodiment of the present invention.

FIG. 8A shows a number of battery modules 802 connected with closed latches 800 that keep the modules 802 from disconnecting from the connection to the charging equipment 804 or from other battery modules. FIG. 8B shows a number of disconnected battery modules with open latches to show the individual shape of the battery modules, their male and female electrical connectors 806 and 807, and indicators 808. The latches secure the battery modules together by engaging latch receivers 810 on the modules that keep them secured. In some embodiments, the latch receivers 810 have electrical connections that are closed when a latch 800 is closed on the receiver 810, and when the electrical connections are closed, the female connectors 807 are energized to provide energy to the charging equipment 804. The indicators 808 in these embodiments can be gauges, lights, output connections such as VGA ports, USB ports, simple electrical outputs (e.g., a voltage signal), and other like means of indicating charge or connection information.

Figure 9A:
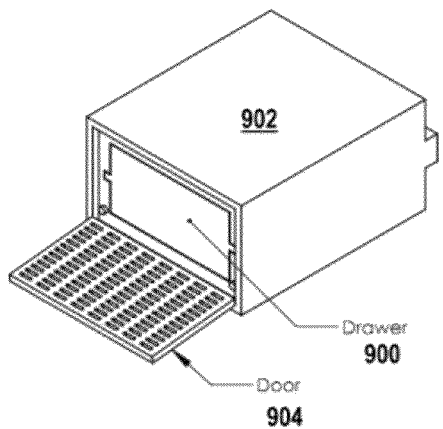
FIG. 9A is an isometric view of a quick-disconnect battery module drawer and receptacle embodiment with the door open.
Figure 9B:
FIG. 9B is a left side plan view of a quick-disconnect battery module receptacle embodiment.
Figure 9C:
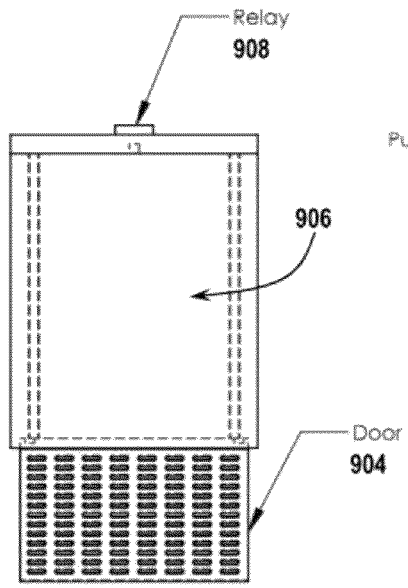
FIG. 9C is a top plan view of a quick-disconnect battery module receptacle embodiment.
Figure 9D:
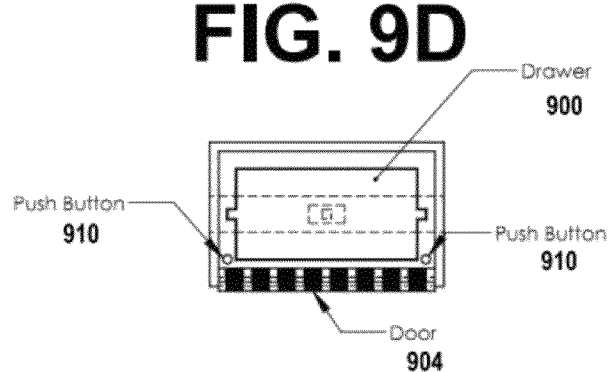
FIG. 9D is a front plan view of a quick-disconnect battery module drawer and receptacle embodiment.
Figure 9E:
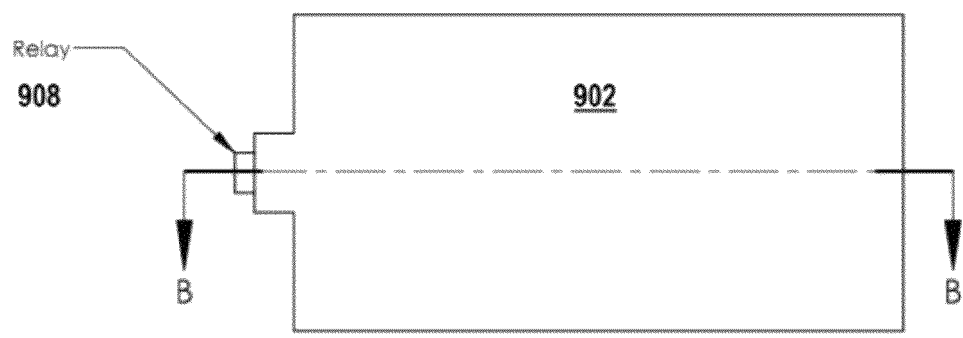
FIG. 9E is a left side plan view of a quick-disconnect battery module receptacle embodiment with section lines indicated.
Figure 9F:
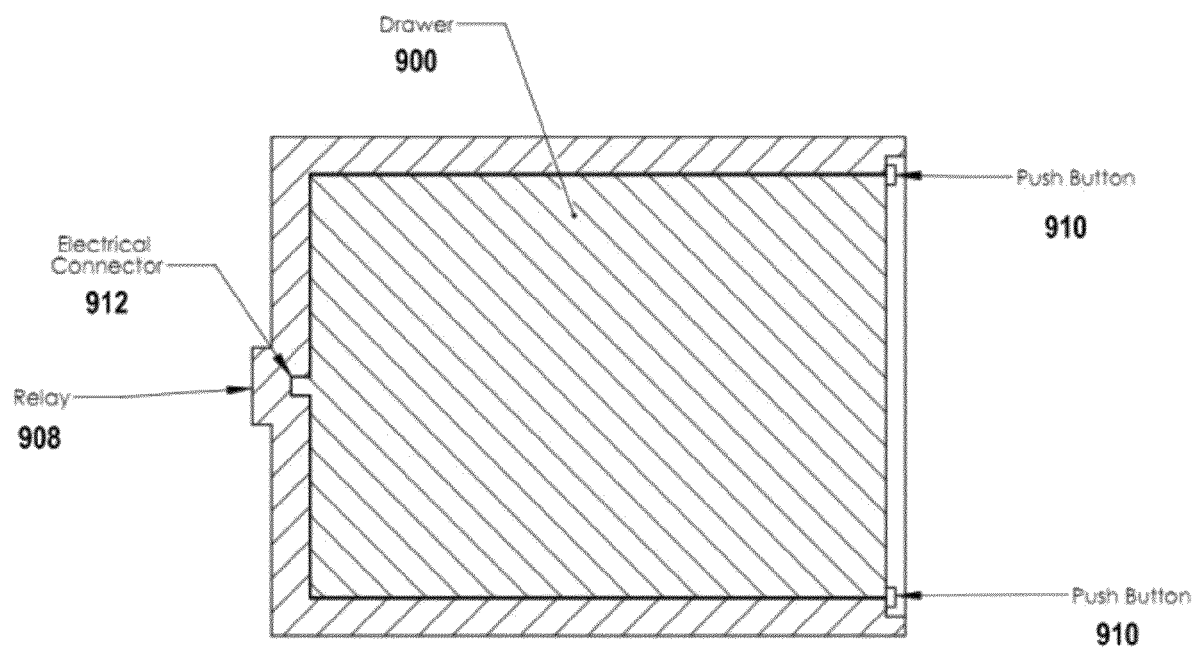
FIG. 9F is a section view of a quick-disconnect battery module drawer and receptacle embodiment according to section line B-B in FIG. 9E.

FIGS. 9A, 9B, 9C, 9D, 9E, and 9F show an alternative embodiment for a quick disconnect system for securing battery modules with a safety relay. FIG. 9A is a perspective view of a battery module drawer 900 loaded into an enclosure 902 that has an open door 904. FIG. 9B is a left side plan view of the battery module receptacle 906 indicating the door 904 and relay 908 portions. FIG. 9C is a top plan view of the battery module receptacle 906. FIG. 9D is a front plan view of the drawer 900 and door 904 with push buttons 910 indicated. FIG. 9E shows an embodiment of the battery module enclosure 902 indicating the relay 908. FIG. 9F is a section view across section line B-B of FIG. 9E showing the internal portions of the battery module drawer 900 and receptacle 906 within the enclosure 902, including the push buttons 910, electrical connector 912 on the rear side of the module drawer 900, and the corresponding relay 908 on the module enclosure 902. In this embodiment, the drawer 900 may be quickly disconnected from the receptacle 906 with no risk of electrical shock-related injury to the user. The relay 908 is not energized until the drawer 900 is fully inserted, with the electrical connector 912 in position, and the door is closed 904, thereby depressing the push buttons 910. Since there are two push buttons 910, there is less opportunity for a user to accidentally energize the relay 908 when the drawer 900 is removed by pressing a button inadvertently when the drawer 900 is open. Yet because the relay 908 is not energized unless the door 904 is closed, the battery module drawer 900 can be quickly replaced by another without risk of electrical shock while the drawer 900 is being or has been removed. Additionally, since the relay 908 is at the rear of the cavity in which the drawer is positioned in this embodiment, it is further removed from human interaction, since the user-operative end of the drawer 900 and receptacle 906 is the front end.

The principles embodied in the subparts of FIG. 9 may be extended to other embodiments as well. For example, the door 904 may be enlarged to cover multiple battery module drawers at once, and the push buttons may be configured to vary in size, position, and number. In such an embodiment, when the door is opened, multiple relays which are connected to the multiple battery module drawers are preferably disengaged simultaneously. This embodiment may be advantageous in reducing the complexity of the hardware used to secure the battery module drawers and to allow the user to quickly deactivate many modules at once. Additionally, the push buttons may instead send a signal to a microcontroller or computer controller of the battery module receptacles that uses other sensors to detect whether energization of the power relays is safe and appropriate.

Furthermore, combinations of the preceding embodiments are possible. Module drawers 900 may comprise battery modules themselves that are inserted into receptacles 906 and locked in by doors 904, and the entire enclosures 902 may be used as battery module drawers shown in embodiments having a retaining bar-activated magnetic conduction system such as the apparatus 600 seen in FIGS. 6A through 7B inclusive. Combining these embodiments allows the user to have an extra layer of protection against accidental energization of battery modules since a door (e.g., 904) and retaining bar (e.g., 606) must both be in the correct positions in order for the battery modules to discharge.

Connection Between Service Vehicle and EV

Rescue vehicles for EVs may need charge depleted batteries onboard distressed EVs using a charging cable that goes from the charging device on the rescue vehicle to a charging port on the EV. Some existing EV charging stations have charging cables that are permanently attached to the charger that connect the charging electronics to an EV charging port. The charging cables may be permanently attached to the charging station, resulting in limits on how far the cables can reach due to their positioning on the service vehicle and their fixed length. Long cables, especially those used in current standards for fast DC charging, are heavy and their transportation is difficult and dangerous by a single human operator. This danger is magnified in situations where the charging station is transported by a vehicle where a misstep by an operator may result in exposure to fast-moving traffic and other hazards. A single human operator such as a service vehicle driver is a person who moves and connects equipment manually, alone, and under his or her own power without use of mechanical devices or machinery.

An aspect of some embodiments of the present invention is a segmented EV charging cable that may be used to connect a service vehicle charging system to a stranded EV. The segmented EV charging cable system may include a port or output point on the service vehicle's charging system for attachment of one end of the segmented charging cable, but it may also include multiple ports or points that are on the charging system or that are at different parts or sides of the service vehicle but are wired as power outputs of the charging system components. In some embodiments the ports may be referred to as having multiple types. For example, a "first-type" connector may be a male plug and a "second-type" connector may be a female jack which is configured to receive the male plug. Likewise, a female receptacle port may be a "first-type" connector that can be mated with a male plug referred to as a "second-type" connector. Therefore, these labels may be interchangeable among ports and plugs that are compatible with the ports. Additional "types" of connectors, such as universal connectors that can attach to a connector of the same type, may be implemented in other embodiments.

A charging equipment system may provide multiple charging ports on the rescue vehicle, enabling the operator maximum convenience and safety while setting up charging equipment by allowing the user to choose the most convenient port to use. Having multiple ports is particularly useful in allowing the rescue vehicle operator to select a port that minimizes exposure to vehicle traffic and road-related hazards when operating near a roadway. Allowing the operator to select the outlet port most convenient to his operation also permits him to reduce the length of the cable required to support his operational need when connecting to EVs at various distances from the charging cable port on the charging system. Some embodiments of the invention use "electrically-secure" connectors such as a Risk Class 0 NFPA 70 E or equivalent connector having properties including enabling an operator who is not a certified electrician to assemble the segmented EV charging cable in the field without being exposed to live power-carrying wires and a power rating capable of bearing high-voltage and/or high-current EV charging. The charging ports of the service vehicle and/or charging equipment are preferably capable of performing level 2, level 2 "fast charge", level 3, or otherwise comparable fast EV charging rates and standards in order to minimize the time that the service vehicle is charging the stranded EV and exposing the users, service vehicle, stranded EV, and associated charging equipment to dangers.

The segmented charging cable system also permits the user to change overall length of the charging cable into user-manageable segments or lengths. The length of the charging cable required to service EV rescue operations depends on how close the rescue vehicle is to the charging port on the EV. In many cases a charging cable of 5 to 15 feet in length is sufficient to service a distressed EV, but in certain configurations the EV's charging port could be a full car length or more away from the rescue vehicle. Charging an EV from such a distance necessitates that the charging cable be longer than a standard length of 5 to 15 feet, and it could require 30 feet or more in length. Due to the bulk of the wiring and wire sheathing used in EV charging cables and their connectors, the cabling may weigh more than the Occupational Safety and Health Administration (OSHA) lifting recommendations set by the United States Department of Labor, and is typically too weighty and cumbersome to handle manually. Therefore, by segmenting the charging cable, a user can transport manageable lengths of extension cables without having to carry too much weight at once to connect to an EV. For example, instead of having a cumbersome and heavy 25 to 35 foot cable the cabling system may enable the operator to use multiple cable segments of approximately 6 to 15 feet and a charging connector to accommodate routine rescue missions. These shorter cable segments are therefore ideally 35 to 42 pounds in weight to fit within OSHA recommendations when the NIOSH lifting equation of 1991 is used, as discussed in connection with the battery module sizes in this document. When the charger operator is confronted with a rescue operation requiring a longer cable he may add a second and/or third cable segment to extend its effective range without having to reposition the service vehicle or charging system. These weight and size figures are not intended to define the absolute limits of the scope of the dimensions and weight of the cables, but as a preferred guideline for common embodiments of the invention.

In some embodiments a basic or standard cable segment includes a charging connector designed to mate with the EV at a charging port, and this basic cable segment can be augmented with other extension cable segments to increase its length. Connections between the segments may include NFPA 70 E compliant connectors (or equivalent) which do not require a certified electrician to make connections in the field. A second modular extension segment may be roughly 12 to 30 feet in length, one end of which having a connector shaped for attaching to a charging port on the service vehicle or another modular segment, and the other end having a connector shaped for attaching to an extension port on the basic cable segment or another end of another modular segment. One end of this cable segment attaches to the charger while the other end attaches to either another charging cable segment or the cable segment that contains the connector to the EV. Such component cable segments may be designed to stay within OSHA weight lifting recommendations.

Figure 10A:
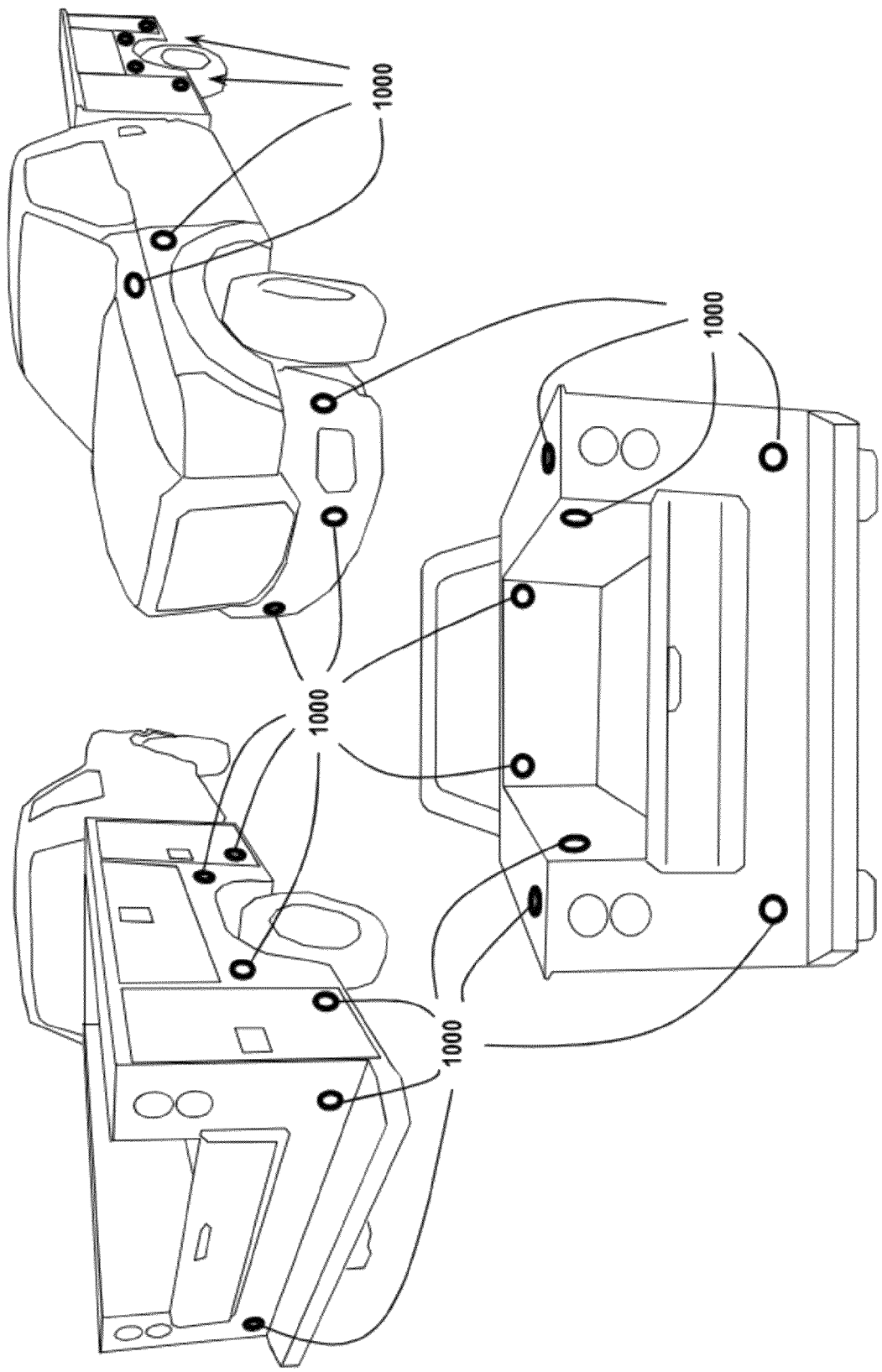
FIG. 10A shows various isometric perspective views of a rescue vehicle and identifies a number of potential sites on the vehicle where a charging cable connection port may be located.

FIG. 10A shows various isometric perspective views of a rescue vehicle and identifies a number of exemplary sites on the vehicle where a charging cable connection port 1000 may be located. The thickened ovals and circles show some advantageous positions for a charging cable connection port that may be installed to provide power from an onboard charging system to an EV. FIG. 10B shows a top perspective view of a rescue vehicle and also identifies a number of potential sites on the vehicle where a charging cable connection port 1000 may be located.

When two or more of these ports 1000 on the service vehicle are installed, the user may select an advantageous position to connect an EV charging cable, such as on the side of the service vehicle that is closest to the stranded EV's charging port or on the side of the service vehicle that is safest (e.g., farthest) from nearby roadway traffic. In some instances, the user may connect the charging cable to one of the ports because another port is blocked or inaccessible, such as, for example, if one side of the service vehicle is too close to a wall or a restricted police zone or roadside construction zone. In other cases, one port may be preferable because the surroundings near the other port would pose a danger to the charging cord or the user, such as if the ground near that port was covered in glass shards, thorny plants, deep mud, or water. In yet other embodiments, the port selected would be determined by whether the nearby surroundings could properly support the charging cable, such as when one side of the service vehicle is on a downward slope and the charging cable would have to hang down a long distance to reach the ground and cause strain in the charging cable and connectors.

By selecting one port over another, the user gains the benefit of safer conditions, easier access to the target stranded EV, and less risk to himself and the charging equipment used with the EV. Alternatively, the presence of multiple charging ports on the service vehicle may give rise to the benefit of connecting multiple target stranded EVs to the vehicle for simultaneous charging, with each EV being connected to the nearest or otherwise most appropriate charging port on the service vehicle. These ports are even more beneficial when they are capable of level 2 charging, level 2 fast charging, level 3 charging, or another fast charging standard, as they may allow the EV and service vehicle to return to the roadway in a short time, thereby minimizing exposure to dangerous conditions and maximizing the time that the service vehicle may be out servicing other stranded vehicles. In some embodiments, the charging electronics are capable of output of multiple different charging standards, such as J1772 and TEPCO® CHAdeMO®, and the charging electronics can route the charging output of either standard to the same port. The user then attaches the appropriate charging cable to the port, such as a J1772 cable with a J1772 connector when the charging electronics provide a J1772 level 2 output from the port. When another charging standard is set to output from that port, then the user replaces the charging cable or an attachment of the charging cable such as the charging connector with a cable or attachment that is compatible with the different charging standard.

The depictions of a rescue or service vehicle and EV in the figures are not intended to introduce limitation into the size, shape, and type of vehicles that may be compatible with the present invention, but are merely presented as exemplary embodiments of one potential application of the invention. For instance, a truck is seen as a rescue vehicle in these figures, but a car, van, bus, watercraft, motorcycle, or other vehicle may be selected as well without departing from the invention. Likewise, connection ports 1000 may be positioned on the vehicle at positions other than those illustrated in the figures.

FIG. 11A depicts a segmented charging cable with two segments. A first segment is a standard charging cable 1100 having at a first end an EV charging connector 1102 and at a second end a cable connector or receptacle 1104. In some embodiments, a TEPCO® CHAdeMO® connector is the EV charging connector 1102, but other EV connector types may be used. The other end 1104 of the first segment may be a NFPA 70 E compliant connector capable of being mated to either a charging equipment connector/receptacle on the rescue vehicle charger or on a cable extension 1106. FIGS. 11B and 11C show perspective views of an exemplary cable connector or receptacle that may be used for this purpose. FIG. 11B is a female connector, and FIG. 11C is a male connector. The male connector is inserted into the female connector, then turned to secure a locking edge and clipped into place by a retention clip.

Referring again to FIG. 11A, a second segment of the charging cable is a charging cable extension 1106 having a cable connector or receptacle 1104 on both ends that is NFPA 70 E compliant. A first end of the charging cable extension is a cable connector or receptacle 1104 capable of being mated to a cable connector or receptacle 1104 on the standard charging cable 1100. A second end of the charging cable extension is a cable connector or receptacle 1104 compatible with being mated to the charging equipment connector or receptacle 1108 on the service vehicle or the service vehicle charging station. All connectors of FIG. 11A may be NFPA 70 E compliant connectors capable of being field installed without the help of a certified electrician. This may allow a user to quickly set up and break down a charging cord in the field to minimize the exposure of the user, the charging equipment, the service vehicle, and the stranded EV to potentially hazardous roadside conditions.

FIG. 12A is a diagram of a rescue vehicle with a charging cable and connectors and an EV. The rescue vehicle in this diagram has multiple charging ports 1200, one of which has a standard charging cable 1202 used to charge an EV located near the rescue vehicle. By selecting the charging equipment connector or receptacle that is nearest to the stranded EV, the operator may use the standard cable 1202 without need for extensions, resulting in reduced tripping hazards and risk of damage to the cable from exposure to the roadway. A charging cable extension in this case may be stored in the rescue vehicle, allowing further reach for the charging station if necessary, but protecting the cable extension from potential wear and damage while stored.

Figure 12B:
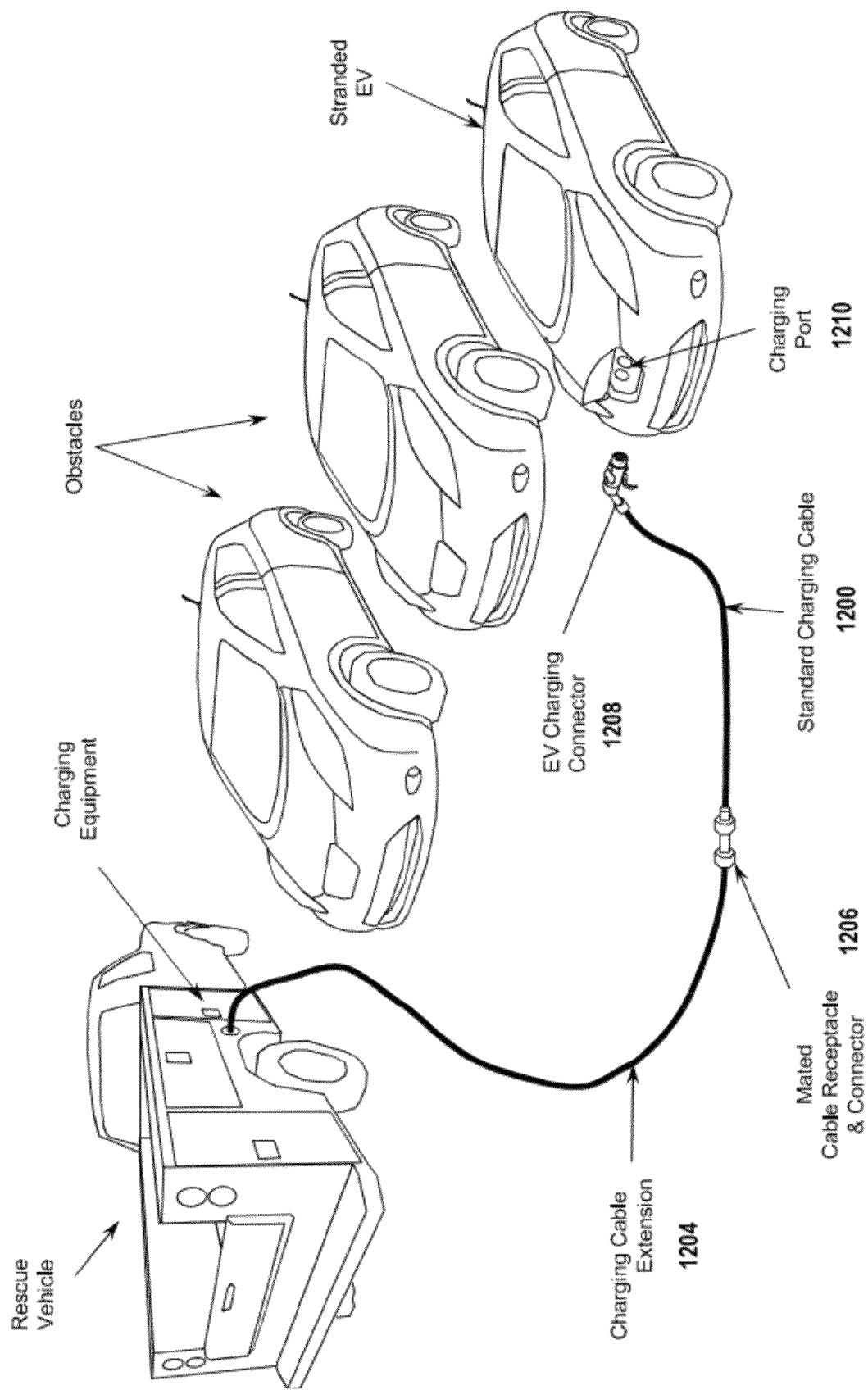
FIG. 12B is a diagram of a rescue vehicle with charging cables and connectors and an EV with a charging cable extension in use.

FIG. 12B is a diagram of a rescue vehicle and stranded EV with charging cables and connectors partially connected with the stranded EV beyond the range of a standard charging cable 1200. In a configuration such as this, the rescue vehicle requires a longer charging cable than is normally needed, so the operator elects to use a charging cable extension 1204 and combine the extended length with a selection of the most opportune charging equipment connector on the rescue vehicle. The standard charging cable 1200 is transported near to the stranded EV, the charging cable extension 1204 is moved and mated to the standard charging cable 1200, the charging cable extension 1204 is connected to the rescue vehicle, and the EV charging connector 1208 is connected to the EV charging port 1210. In this manner, the user is not forced to transport a single extra-long heavyweight charging cable to the stranded EV over a long distance, but only has to travel with two smaller and more manageable cables. This may help reduce the manual labor performed by the operator and keep the operation of the charging equipment within OSHA recommendation standards while helping the operator remain away from traffic and other hazards and providing a direct route from the rescue vehicle charging equipment to the EV charging port. In this figure additional vehicles are between the rescue vehicle and the stranded EV, resulting in the inability of the rescue vehicle to reach the stranded EV without a charging cable extension, but other obstacles or hazards may result in a need for connecting to a far-away stranded EV, such as, for example, terrain, structures, other emergency vehicles, fire, oversized stranded EVs, stranded EVs with irregularly-placed charging ports, or even just operator neglect in parking the rescue vehicle too far away from the stranded EV.

Use and Integration of Deliverable Automotive Service Batteries

In some embodiments, service vehicles are used to transport and transfer automotive batteries to and from disabled vehicles when their batteries fail. Generally, the deliverable batteries are 12-volt lead-acid batteries (which may also be referred to as starting, lighting, ignition batteries or SLI batteries) transported and used in internal combustion engine (ICE)-based vehicles to start the vehicles and provide electricity when the alternator is not providing electricity to the vehicle. Service vehicles bearing the batteries of these embodiments store them in compartments and bring them to vehicles in need for switching out, and in some embodiments, the service vehicles charge the SLI batteries or use them for supplying energy to EV charging equipment of the service vehicle.

In another embodiment, the batteries are connected to the alternator of the service vehicle but are not connected to charging equipment on the vehicle. This may allow the batteries to remain at maximum charge when self-discharge would otherwise slowly deplete the batteries. It may also allow the service vehicle to restore energy to a battery if it is placed in the service vehicle having less than full charge. Some more embodiments have connections to allow the batteries to provide power to vehicle electrical systems such as lighting, radio, an electric motor, a winch, or other electrical devices on the vehicle.

In some embodiments the service batteries may be enabled or disabled for charging/discharging to the charging equipment, such as would be desired if the service vehicle operator received a call for a reservation of a particular type of battery. He or she could then disable discharging of that battery to ensure that it was fully charged for the customer who made the reservation. In other embodiments, some of the batteries stored on the vehicle may be used to transfer charge to another battery on the vehicle. For example, if a certain battery type is needed for a service call, but it is not currently fully charged, the other batteries may transfer charge to that battery to ensure that it has maximum charge when it is provided to the customer.

In some embodiments a controller is provided that may switch charging and discharging of individual batteries on and off as desired, may control the operation of power converters of the batteries, monitor and control charging equipment, and perform other monitoring, recording, and controlling tasks. In some embodiments the power converters are DC-DC converters or AC-DC converters/inverters that are unidirectional or bidirectional, have manual or remote control features, and can be set to receive and output a variety of signals, voltages, and currents.

These embodiments of the invention may provide cost savings to service vehicle fleet operators that wish to provide charging services to EVs. The service batteries are put to multiple uses by assisting internal combustion engine customers with failed batteries, and may be additionally used to assist charging stranded EVs. Customer satisfaction is improved because the batteries they receive are more fully charged and the service vehicle may also serve their EVs. Providing charging services to EVs has lower barriers to entry for service vehicle fleet operators since the batteries purchased for EV charging may also be used in a battery replacement program using the same service vehicles and transporting structures.

Figure 13B:
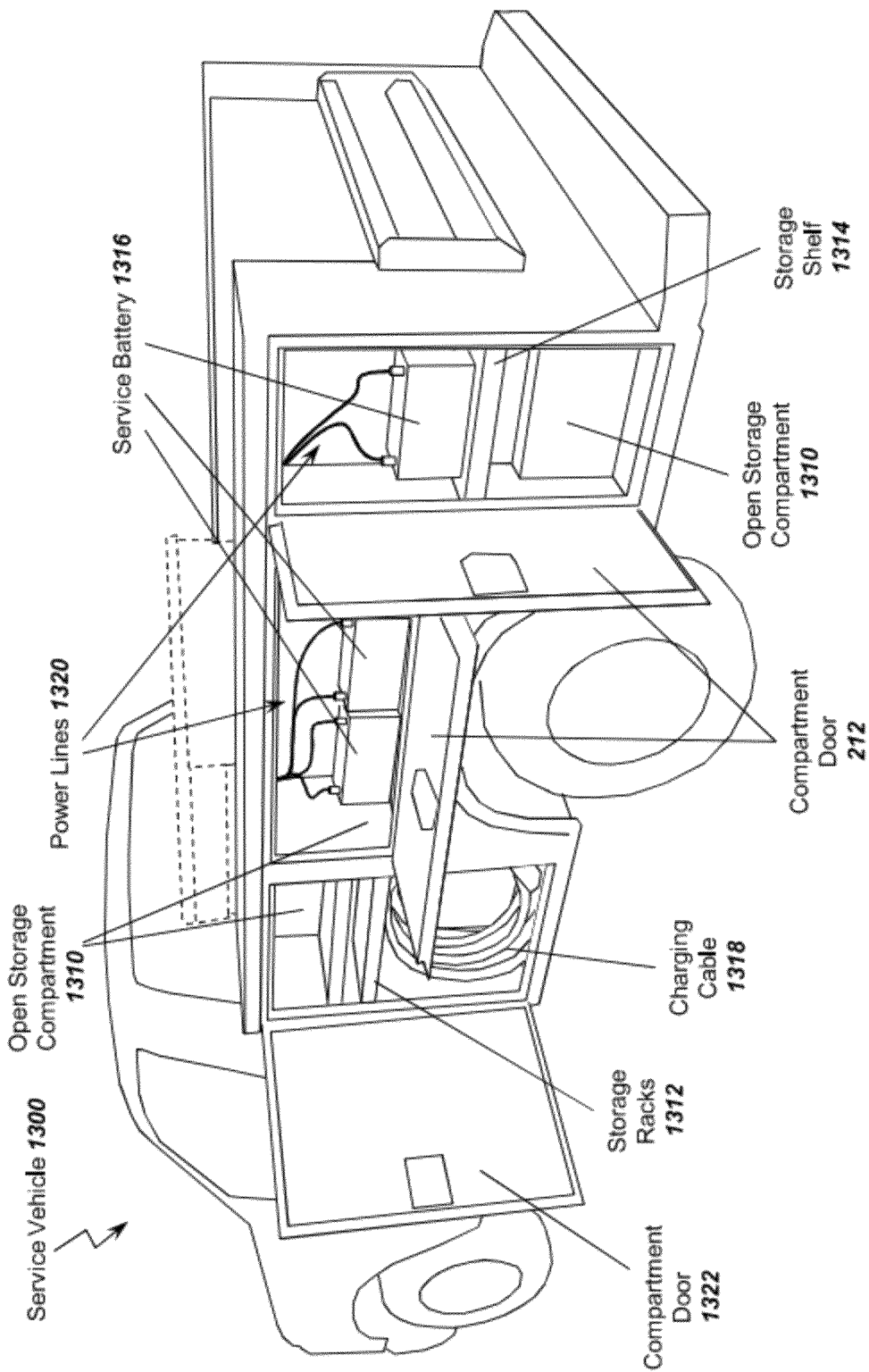
FIG. 13B shows a side perspective view of a service vehicle with open storage compartments according to an embodiment of the invention.

FIG. 13A shows a side perspective view of a service vehicle 1300 with storage capability according to an embodiment of the invention. Such a service vehicle 1300 may be dispatched with batteries in the closed storage compartments 1302, the cab 1304, the bed 1306, or a charger enclosure 1308 (if present) that may be given to stranded vehicles with failed or depleted batteries. The batteries in the service vehicle 1300 may also be electrically connected for charging electric vehicles (EVs). FIG. 13B shows a side perspective view of a service vehicle 1300 such as the one shown in FIG. 13A with open storage compartments 1310. The open storage compartments 1310 may contain storage racks 1312 or shelves 1314 and may contain service batteries 1316, charging cables 1318, and other electrical equipment. One or more of the service batteries 1316 is connected to other electrical equipment in the service vehicle 1300 by power lines 1320. The compartment doors 1322 may be closed to protect the sensitive electronics within the compartments 1310.

Figure 14A:
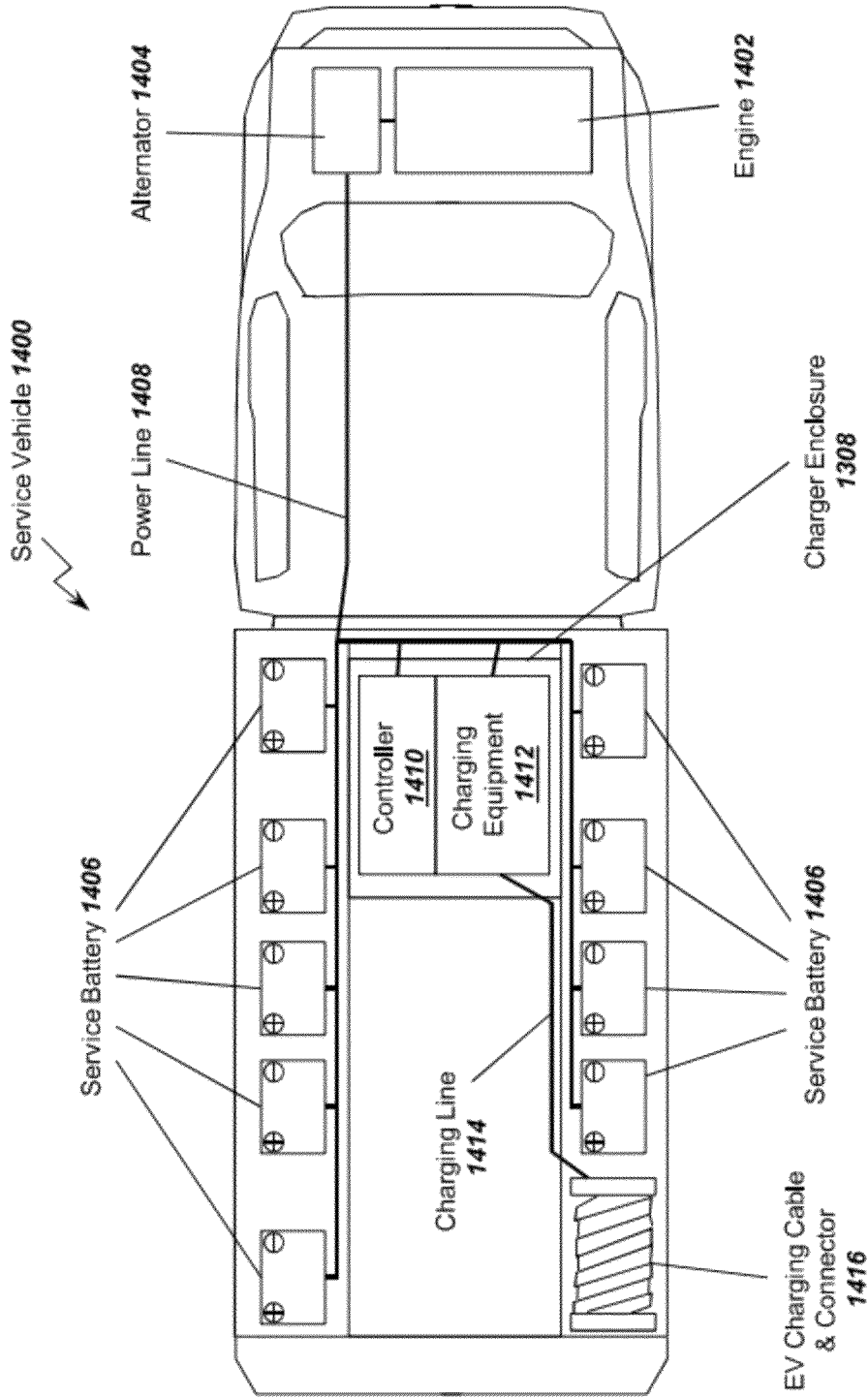
FIG. 14A shows a top view of a service vehicle with electrical lines indicated according to an embodiment of the invention.

FIG. 14A shows a top view of a service vehicle 1400 with electrical lines indicated according to an embodiment of the invention. The service vehicle 1400 has an engine 1402 that drives an alternator 1404. The alternator 1404 may include a standard vehicle alternator, an increased output capacity or heavy duty alternator, or other means of converting power from the engine 1402 into electrical power. Other means of electricity generation may also be implemented with the vehicle 1400, such as renewable energy generation from solar panels or windmills that are also directly or indirectly connected to the power line 1408 or other electrical systems of the vehicle 1400.

The alternator 1404 is linked to service batteries 1406 by a power line 1408 running through the vehicle. The service batteries 1406 may include electrochemical cells, arrays, or banks of lead-acid, lithium-ion, nickel metal hydride, nickel cadmium, zinc-based batteries, combinations thereof, and other similar rechargeable energy storage devices, such as, for example, capacitors, supercapacitors, and fuel cells. Preferably, the service batteries 1406 are comprised of models having standardized sizes, voltages, capacities, and other physical characteristics so that they may be more readily connected to disabled vehicles with standardized receptacles and electrical requirements, such as automotive SLI batteries. There may be one service battery 1406, two, three, four, five, ten, twenty, fifty, or more in the service vehicle 1400. Each battery 1406 has a positive and negative terminal that can provide a voltage difference when the battery 1406 is charged.

One or more of these batteries 1406 is connected to the power line 1408 in the vehicle 1400 to send and receive electricity to and from the alternator 1404, charging equipment 1412, controller 1410, and other batteries 1406. It may also be the case that there are no service batteries 1406 present in or on the service vehicle 1400, but provided that sufficient connectors exist on the vehicle to connect a service battery 1406 to the power line 1408 for the purposes mentioned in this document, a vehicle having this absence of batteries 1406 is still appraised to be within the scope of the invention. These connectors may include wires, plugs, clamps, clips, sockets, conducting racks, or other similar means for linking the electrical connections on the service batteries 1406 to the power line 1408.

A controller 1410 and charging equipment 1412 are also connected to the power line 1408. The controller 1410 may include a computer, processor with associated memory, control panel, or other means for monitoring, controlling, or recording the flow of electricity through the power line 1408 and charging line 1414, and possibly other electrical systems of the service vehicle 1400. Preferably the controller 1410 may be able to measure voltage, state of charge, current, temperature, and other factors related to the status and operation of the service batteries 1406, power line 1408, alternator 1404, charging equipment 1412, charging line 1414, and charging cables and connectors 1416. However, in some embodiments the controller 1410 may only be able to observe and control a subset of these portions of the systems on the vehicle. The controller 1410 may also be able to issue instructions to these portions of the systems of the vehicle, such as, for example, setting the charging equipment 1412 to a certain output voltage, or electrically disconnecting certain service batteries 1406 from the power line 1408 when appropriate. The controller 1410 may also be able to send and receive information from a remote controller or server via a wired or wireless connection means such as infrared or optical transmission, Wi-Fi, Bluetooth®, cellular, or other RF transmission.

A charging line 1414 comes from the charging equipment 1412 to EV charging cables and connectors 1416. In some embodiments, one structure comprises the charging line 1414 and the cables and connectors 1416. The charging equipment 1412 may include one or more DC-DC buck/boost converter, one or more single- or bi-directional inverters, signal conditioning circuitry such as filters and stabilizing capacitors, and combinations thereof. The selection of these elements is significant in relation to the electrical signal(s) required for charging an EV. In some embodiments the settings of the components of the charging equipment 1412 may be set and adjusted by the controller 1410. For example, in order to comply with the SAE J1772 AC charging standard, an inverter would be included in the charging equipment 1412 to convert the DC voltage of the service batteries 1406 into a single-phase 240-volt AC signal that would be supplied to the charging line 1414, and a boost converter may be required to upconvert the voltage of the batteries 1406 to a DC voltage suitable for conversion by the inverter. The charging equipment 1412 may be stored in a charger enclosure 1308, or may be integrated into other portions of the service vehicle 1422 including the cab, the bed, and the storage compartments in which the batteries 1406 are shown. Additionally, charging equipment 1412 may be removable from the vehicle and in that case it may have quick disconnecting connectors between the equipment 1412 and the power line 1408.

The charging cables and connectors 1416 may include wires, cords, and similar conductors to link the charging equipment 1412 to a nearby EV. The connectors may be standardized connectors such as the SAE J1772 connector or may be non-standardized, popular connectors such as the TEPCO® CHAdeMO® connector, or unpopular or customized connectors, as necessary for EV charging. The charging cables and connectors 1416 may be stored in compartments or other areas of the vehicle, and may be disconnectable from the charging line 1414 to be replaced with other charging cables and connectors 1416 or safety caps to prevent soiling or tampering with the vehicle.

In some embodiments, it may be advantageous to program the controller 1410 to allow one or more service batteries 1406 to discharge to another service battery 1406 or number of service batteries 1406. For example, if a customer needs a fully charged service battery 1406, but it has recently been used to supply energy to the charging equipment 1412, the controller 1410 may direct other batteries 1406 to discharge into the customer's needed battery in order to increase its state of charge prior to turning it over to the customer. The alternator 1404 may then be used to restore charge to the remaining service batteries 1406 and a battery collected from the customer, if any.

Figure 14B:
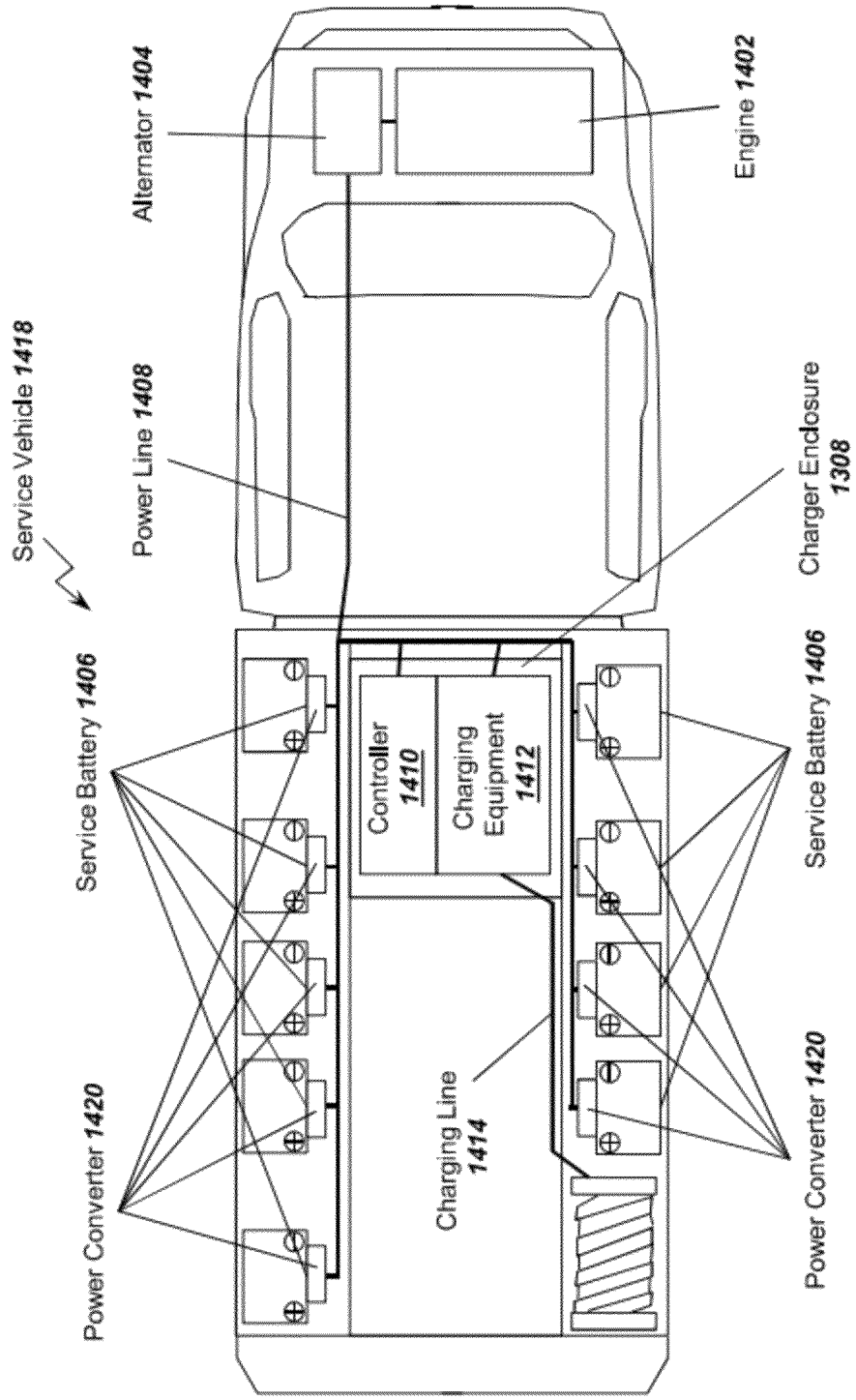
FIG. 14B shows a top view of a service vehicle with electrical lines and converters indicated according to an embodiment of the invention.

FIG. 14B shows top view of a service vehicle 1418 similar to FIG. 14A but with power converters 1420 disposed on the power line 1408 between the service batteries 1406 and the charging equipment 1412, controller 1410, and alternator 1404. The power converters 1420 may be useful to install on one or more battery 1406 or on a group of batteries to stabilize and standardize the electrical signals provided to the charging equipment 1412. It may also increase efficiency of charging differing batteries 1406 with the alternator 1404 by preventing circulating currents through the batteries 1406. It may also be advantageous to implement power converters according to the apparatuses described in U.S. patent application Ser. No. 13/100,152 (which is hereby incorporated by reference) that render the service batteries 1406 parallelable without regard to the voltage, capacity, or other characteristics of the batteries 1406 to enhance compatibility of the service vehicle 1418 with a wider range of batteries 1406. Another advantage of using converters 1420 with some or all of the batteries 1406 is realized when a controller 1410 is connected to the converters 1420 to enable or disable the converters 1420 to connect or disconnect batteries 1406 from the power line 1408.

Figure 14C:
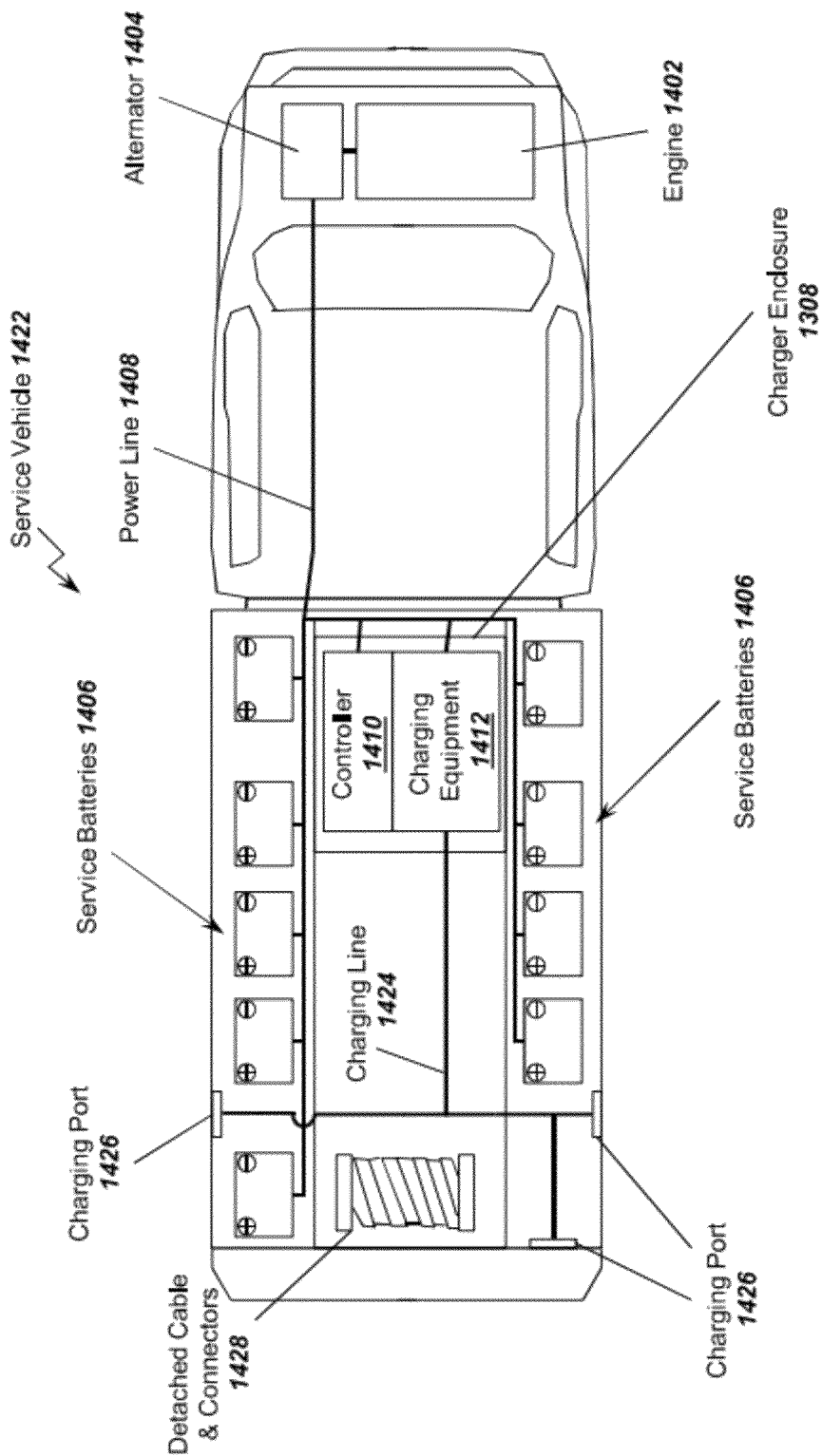
FIG. 14C shows a top view of a service vehicle with alternate charging lines indicated according to an embodiment of the invention.

FIG. 14C shows a top view of a service vehicle 1422 with alternate charging lines indicated according to an embodiment of the invention. In this embodiment the charging line 1424 extends to multiple charging ports 1426 that serve as connectors to a detachable charging cable and charging connectors 1428. The charging cable and connectors 1428 may be selectively connected to a charging port 1426 that is most convenient and/or safe for charging an EV to which the service vehicle 1422 is brought. For example, a detachable cable and connector 1428 may be connected to the left side of the vehicle if it is closer to the stranded EV than the right side, or if the right side of the service vehicle 1422 is more exposed to traffic or other hazards.

Figure 14D:
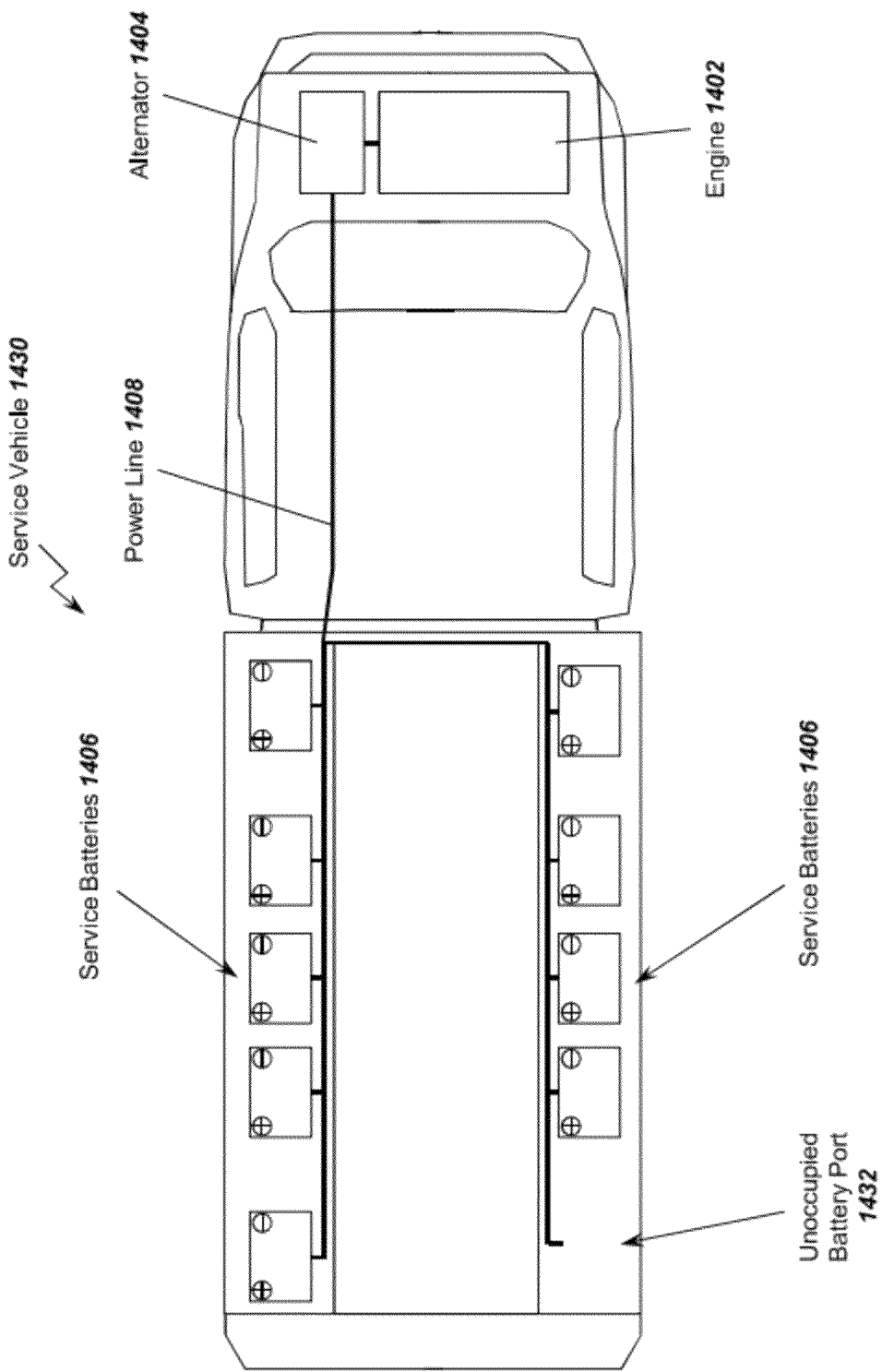
FIG. 14D shows a top view of a service vehicle with batteries that are connected to an alternator according to an embodiment of the invention.

FIG. 14D shows a top view of a service vehicle 1430 with batteries 1406 that are connected to an alternator 1404 without being connected to charging equipment. This alternate configuration shows that the batteries 1406 are not required to be used in charging EVs. This figure also shows that an unoccupied battery port 1432 may be present in the system without negatively affecting the operation of the service vehicle. Likewise, all of the battery ports may be unoccupied while still practicing the invention as long as when a service battery 1406 is electrically connected to the power line 1408 in one of the storage port areas of the vehicle 1430, the battery may be charged by the alternator 1404 or discharged to other batteries in the vehicle. A service vehicle 1430 of this embodiment may be routed to a disabled vehicle, exchange a service battery 1406 to the disabled vehicle and take its battery to be recharged via the alternator 1404 and power line 1408 when it is connected to an unoccupied battery port 1432.

Figure 14E:
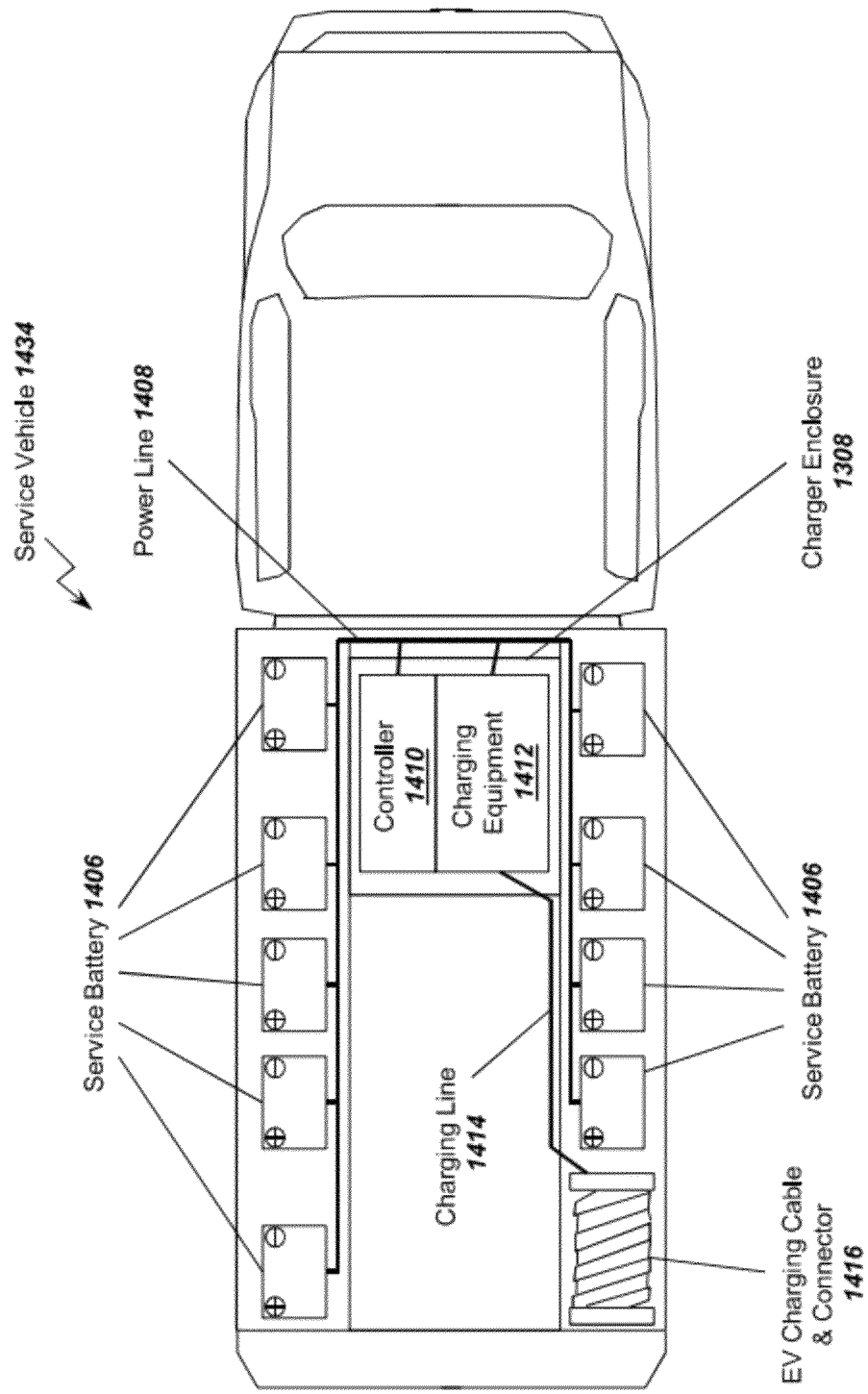
FIG. 14E shows a top view of a service vehicle with batteries that are connected to charging equipment according to an embodiment of the invention.

FIG. 14E shows a top view of a service vehicle 1434 with batteries 1406 that are connected to charging equipment 1412 and a controller 1410 without being connected to an alternator. In this embodiment, the batteries 1406 are not recharged while borne by the service vehicle 1434, but may still be leveraged as an energy source of the charging equipment 1412. This system would eventually exhaust its energy storage and would have to be connected to a charging station to restore charge to the batteries 1406 either by connecting directly to the batteries or by connecting the power line 1408 or charging line 1414 to a power source and charging the batteries 1406 indirectly through the power line 1408 and/or charging equipment 1412.

Figure 14F:
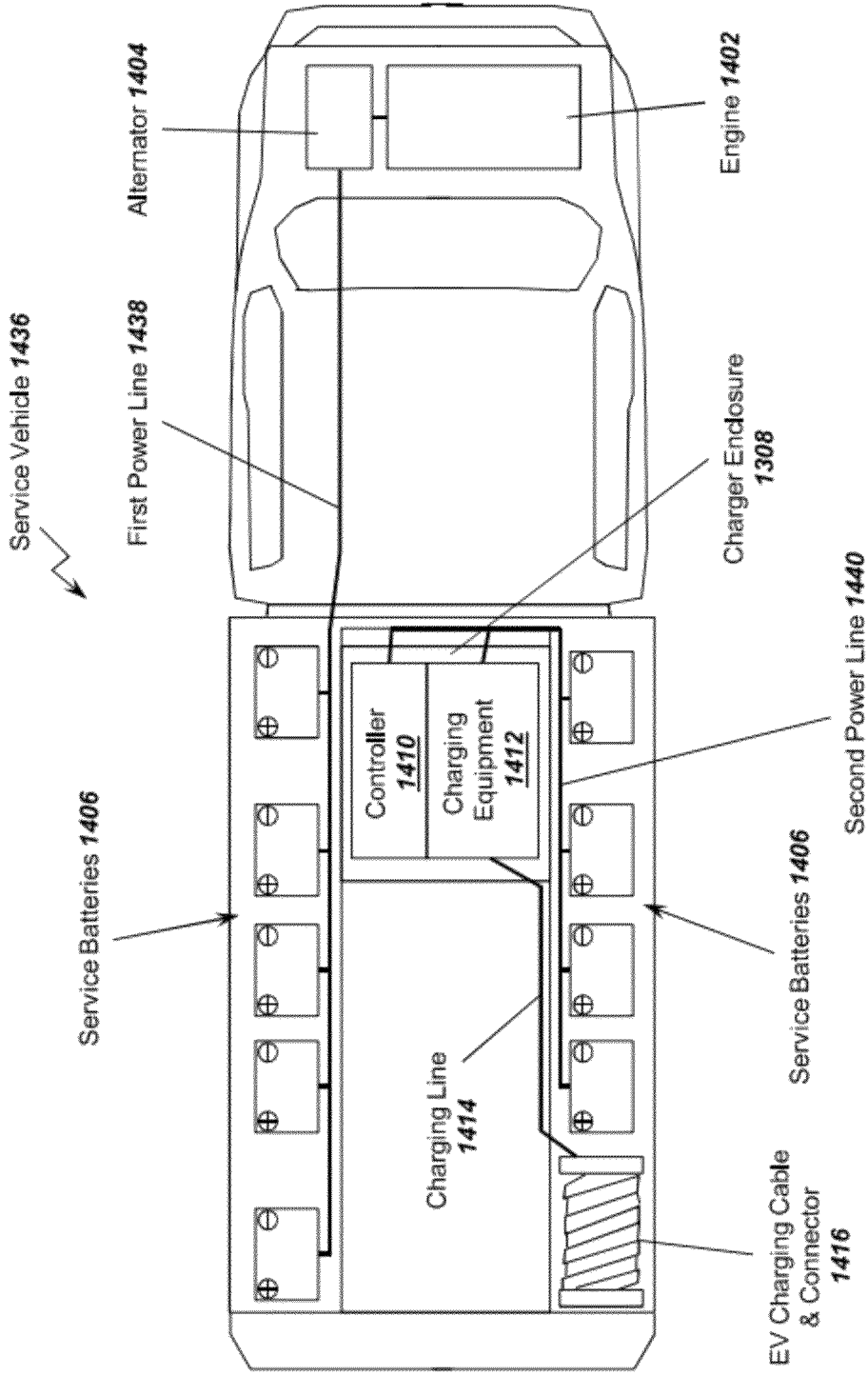
FIG. 14F shows a top view of a service vehicle with batteries that are connected to charging equipment and batteries that are connected to an alternator according to another embodiment of the invention.

FIG. 14F shows a top view of a service vehicle 1436 with service batteries 1406 that are connected to a first power line 1438 that is linked to an alternator 1404, and service batteries 1406 that are connected to a second power line 1440. In this configuration, the user may opt to use service batteries 1406 as a source of power for the charging equipment by connecting them to the second power line 1440, or may connect the batteries 1406 to the first power line 1438 for recharging (or maintenance of charge) via the alternator 1404. In this embodiment, the controller 1410 may be able to control the charging operations of the devices connected to the second power line 1440, and may also be able to monitor and control the charging of the service batteries 1406 in the first power line 1438. This embodiment allows the user to easily manage whether the batteries 1406 on the service vehicle 1436 will be charging or discharging by deciding which power line the batteries should be connected to. Thus it may be advantageous to arrange the power lines 1438 and 1440 in the vehicle so that it is clear to the user whether a battery receptacle is connected to a charging line or a discharging line, such as, for example, making all battery receptacles or connections on the left side of the vehicle charging connections and making all battery receptacles or connections on the right side of the vehicle discharging connections. This embodiment may also be advantageous in simplifying a battery reservation system, since if a battery is reserved on the service vehicle 1436, the vehicle operator can reserve that battery by simply connecting the battery to the first power line 1438 with an assurance that it will not discharge any more until the reserved battery is delivered to the entity that made the reservation. In an alternative embodiment, the first and second power lines 1438 and 1440 are connected to a switch at each service battery 1406 receptacle/connector such that the vehicle operator may selectively choose a preferred power line for each battery 1406 without having to move the battery to a new receptacle or connector.

Miscellaneous Definitions and Scope Information

Battery modules are described herein as a preferable means for storing and transporting electrical energy, but other equivalent means for storing energy may be used, such as, for example, electrochemical batteries, compressed gas storage, pumped hydro storage, flywheel energy storage, capacitive energy storage, superconductive magnetic energy storage, fuel cell energy storage, combinations thereof, and other similar devices for energy storage known in the art. If the modules are battery-based, the battery types may include rechargeable or non-rechargeable chemistries and compositions, such as, for example, lead-acid, alkaline, secondary lead acid, lithium-ion, sodium (zebra), nickel-metal hydride, nickel cadmium, combinations thereof, and other energy storage chemistries known in the art. Energy storage devices such as these may be comprised of small or large numbers of cells, capacities, voltages, amperages, and other battery properties. They may be configured in unitary or modular designs and may follow standardized guidelines or customized specifications.

Some methods and systems of the embodiments of the invention disclosed herein may also be embodied as a computer-readable medium containing instructions to complete those methods or implement those systems. The term "computer-readable medium" as used herein includes not only a single physical medium or single type of medium, but also a combination of one or more tangible physical media and/or types of media. Examples of a computer-readable medium include, but are not limited to, one or more memory chips, hard drives, optical discs (such as CDs or DVDs), magnetic discs, and magnetic tape drives. A computer-readable medium may be considered part of a larger device or it may be itself removable from the device. For example, a commonly-used computer-readable medium is a universal serial bus (USB) memory stick that interfaces with a USB port of a device. A computer-readable medium may store computer-readable instructions (e.g. software) and/or computer-readable data (i.e., information that may or may not be executable). In the present example, a computer-readable medium (such as memory) may be included to store instructions for the controller to operate the heating of the ESD and historical or forecasted temperature data for the ESD or its surroundings.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In addition, it should be understood that the figures described above, which highlight the functionality and advantages of the present invention, are presented for example purposes only and not for limitation. The exemplary architecture of the present invention is sufficiently flexible and configurable, such that it may be utilized in ways other than that shown in the figures. It will be apparent to one of skill in the art how alternative functional, logical or physical partitioning, and configurations can be implemented to implement the desired features of the present invention. Also, a multitude of different constituent module or step names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in multiple various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "typical," "conventional," "traditional," "normal," "standard," "known" and terms of similar meaning should not be construed as limiting the time described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated or context dictates otherwise. Similarly, a group of items linked with the conjunction "or" should not be read as requiring mutual exclusivity among that group, but rather should also be read as "and/or" unless expressly stated or context dictates otherwise. Furthermore, although items, elements or component of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A service vehicle comprising:
  a vehicle;
  electric vehicle (EV) charging equipment transported by the vehicle;
  at least one battery module connection point configured to receive a battery module, wherein the battery module can be removably mounted to the at least one battery module connection point, transported by the vehicle, and electrically connected to the EV charging equipment as a source of electrical energy for the EV charging equipment, and wherein the EV charging equipment is configured to provide charge to an EV from a battery module connected to the battery module connection point; and
  an alternator/generator transported by the vehicle, the alternator/generator configured to provide power to the battery module connection point.

2. The service vehicle of claim 1, further comprising:
  a battery module removably mounted to the battery module connection point.

3. The service vehicle of claim 2, wherein the battery module is quick-disconnectable such that power lines to the battery module are de-energized or disconnected when the battery module is prepared to be removed from the battery module connection point.

4. The service vehicle of claim 2, further comprising:
an onboard controller device configured to measure and monitor the EV charging equipment and the battery module.

5. The service vehicle of claim 4, wherein the onboard controller device is further configured to control operation of the EV charging equipment, a power connection to the battery module or the battery module connection point, and an output of the alternator/generator.

6. The service vehicle of claim 1, wherein the alternator/generator is configured to recharge a battery module while the battery module is mounted to the battery module connection point.

7. The service vehicle of claim 6, wherein the alternator/generator is powered by a motive engine or motor of the vehicle.

8. The service vehicle of claim 7, further comprising:
a battery module removably mounted to the battery module connection point, wherein the battery module is an automotive Starting/Lighting/Ignition (SLI) battery.

9. The service vehicle of claim 8, wherein the battery module is recharged by the alternator/generator through a power converter.

10. The service vehicle of claim 6, further comprising:
a battery module removably mounted to the battery module connection point, wherein the battery module is quick-disconnectable such that power lines to the battery module are de-energized or disconnected when the battery module is manually removable from the battery module connection point.

11. The service vehicle of claim 1, wherein the alternator/generator provides power to the EV charging equipment along a power line separate from a power line providing power from the alternator/generator to the battery module connection point.

12. The service vehicle of claim 1, further comprising:
a storage compartment configured to store additional battery modules, wherein the alternator/generator is configured to provide power to battery modules stored in the storage compartment.

13. The service vehicle of claim 1, wherein the EV charging equipment is integrated with or affixed to a body portion of the vehicle.

14. The service vehicle of claim 1, further comprising:
a grid connection port electrically connected to the battery module connection point such that a battery module connected to the battery module connection point is charged by an electrical utility distribution grid when an electrical connection is established between the grid connection port and the electrical utility distribution grid.

15. A service vehicle comprising:
a vehicle;
electric vehicle (EV) charging equipment transported by the vehicle;
at least one battery module removably mounted to and transported by the vehicle, the battery module electrically connected to the EV charging equipment as a source of electrical energy for the EV charging equipment such that the EV charging equipment can provide charge to an EV from the battery module; and
an alternator/generator transported by the vehicle, the alternator/generator configured to provide power to the EV charging equipment.

16. The service vehicle of claim 15, wherein the alternator/generator is powered by a motive engine of the vehicle.

17. The service vehicle of claim 15, wherein the battery module and the alternator/generator are configured to provide power to the EV charging equipment simultaneously.

18. The service vehicle of claim 15, wherein the battery module is an automotive Starting/Lighting/Ignition (SLI) battery.

19. A service vehicle comprising:
a vehicle;
a battery module connection point on the vehicle, the battery module connection point being selectively configurable as a charging connection point or a discharging connection point;
an alternator/generator transported by the vehicle, the alternator/generator configured to provide power to the battery module connection point if the connection point is configured as a charging connection point; and
electric vehicle (EV) charging equipment transported by the vehicle, the EV charging equipment configured to use the battery module connection point as an energy source to provide charge to an EV if the battery module connection point is configured as a discharging connection point.

20. The service vehicle of claim 19, further comprising a battery module removably mounted to the battery module connection point.

* * * * *